US006310154B1

(12) United States Patent
Babcock et al.

(10) Patent No.: US 6,310,154 B1
(45) Date of Patent: Oct. 30, 2001

(54) SOLID ACIDS AS CATALYSTS FOR THE PREPARATION OF HYDROCARBON RESINS

(75) Inventors: Laura M. Babcock; Dennis G. Morrell, both of Hockessin, DE (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/003,596

(22) Filed: Jan. 7, 1998

Related U.S. Application Data

(60) Provisional application No. 60/035,217, filed on Jan. 8, 1997, provisional application No. 60/034,579, filed on Jan. 9, 1997, and provisional application No. 60/035,797, filed on Jan. 10, 1997.

(51) Int. Cl.$^7$ .................................. C08F 4/18; C08F 4/12
(52) U.S. Cl. .......................... 526/194; 526/226; 526/233; 526/234; 526/236; 526/280; 526/283; 526/290; 526/308; 526/335; 526/336; 526/340.2; 526/346; 526/347.1; 526/348.2; 526/348.6; 526/348.7
(58) Field of Search ............................... 526/172, 348.7, 526/194, 226, 290, 335, 336, 340.2, 154, 233, 234, 236, 346, 347.1, 348.2, 348.6, 308, 280, 283

(56) References Cited

U.S. PATENT DOCUMENTS

| Re. 31,443 | 11/1983 | McDaniel et al. . | |
|---|---|---|---|
| 2,301,966 | 11/1942 | Michel et al. . | |
| 2,455,225 | * 11/1948 | Burroughs | 526/194 |
| 2,460,692 | * 2/1949 | Gould | 526/76 X |
| 2,507,864 | 5/1950 | Moore et al. . | |
| 2,559,576 | 7/1951 | Johnstone . | |
| 2,626,290 | 1/1953 | Fell et al. . | |
| 2,626,291 | 1/1953 | Betts . | |
| 2,632,777 | 3/1953 | Pines . | |
| 2,642,402 | 6/1953 | Corner et al. . | |
| 2,694,686 | 11/1954 | Reeves et al. . | |
| 2,721,889 | 10/1955 | Murphree et al. . | |
| 2,728,804 | 12/1955 | Mueller . | |
| 2,732,398 | 1/1956 | Brice et al. . | |
| 2,734,046 | 2/1956 | Nelson et al. . | |
| 2,739,143 | 3/1956 | Goering et al. . | |
| 2,744,084 | 5/1956 | Arey . | |
| 2,745,890 | 5/1956 | Chah . | |
| 2,748,090 | 5/1956 | Watkins . | |
| 2,751,331 | 6/1956 | Alpert et al. . | |

(List continued on next page.)

FOREIGN PATENT DOCUMENTS

| 1963684 | 8/1970 | (DE) . |
| 2836982 | 3/1979 | (DE) . |
| 0090569 | 10/1983 | (EP) . |
| 0101205 | 2/1984 | (EP) . |
| 0202965 | 11/1986 | (EP) . |

(List continued on next page.)

OTHER PUBLICATIONS

Copy of an International Search Report and Annex issued in connection with International Application No. PCT/US 98/00012.
Cal et al., "Study on the Oligomerization of Isobutene Using Heteropoly Acids and Their Salts as Catalysts", *Cuihua Xuebao (Journal of Catalysis)*, pp. 370–375 (1985).
Patent Abstracts of Japan, vol. 6, No. 250 (C–139) Dec. 9, 1982.
Patent Abstracts of Japan, vol. 96, No. 5, May 31, 1996.
Patent Abstracts of Japan, vol. 6, No. 191 (C–127), Sep. 30, 1982.
An International Search Report and Annex of PCT/US98/00009, dated May 22, 1998.
A Partial International Search Report and Annex of PCT/US 98/00012.
An International Search Report and Annex of PCT/US98/00010, dated May 14, 1998.
An International Search Report and Annex of PCT/US98/00011, dated May 22, 1998.
Bittles et al., "Clay–Catalyzed Reactions of Olefins. I. Polymerization of Styrene", *Journal of Polymer Science: Part A*, vol. 2, pp. 1221–1231 (1964).
Bittles et al., "Clay–Catalyzed Reactions of Olefins. II. Catalyst Acidity and Mechanism", *Journal of Polymer Science: Part A*, vol. 2, pp. 1847–1862 (1964).
Salt, "The Use of Activated Clays as Catalysts in Polymerization Processes, with Particular Reference to Polymers of Alpha Methyl Styrene", *Clay Minerals Bulletin*, vol. 2, pp. 55–58 (1948).
Peng et al., "Electrophilic Polymerization of 1,3–Pentadiene Initiated by Aluminum Triflate", *Eur. Polym. J.*, vol. 30, No. 1, pp. 69–77 (1994).
Gandini et al., "The Heterogeneous Cationic Polymerization of Aromatic Monomers by Aluminum Triflate", *Polymer Preprints*, American Chemical Society, pp. 359–360 (1996).
Okuhara et al., "Catalytic Chemistry of Heteropoly Compounds", *Advances in Catalysis*, vol. 41, pp. 113–252 (1996).

(List continued on next page.)

Primary Examiner—Fred Teskin
(74) Attorney, Agent, or Firm—B. J. Boshears; Bernie J. Graves, Jr.

(57) ABSTRACT

Solid acids are used as catalysts for the polymerization of a feed stream containing at least one of pure monomer, C5 monomers, and C9 monomers to produce hydrocarbon resins. Freely-associated water may be removed from the solid acid catalyst prior to use. Resins with softening points (Ring and Ball) in the range of about 5° C. to 170° C. can be prepared. These catalysts offer advantages over the traditional Friedel-Crafts polymerization catalysts since the acid sites are an integral part of the solid. The solid acid catalysts are relatively nonhazardous, reusable catalysts which eliminate or at least reduce contamination of the resulting resin products with acid residues or by-products.

71 Claims, 15 Drawing Sheets

U.S. PATENT DOCUMENTS

| | | |
|---|---|---|
| 2,753,325 | 7/1956 | Banes et al. . |
| 2,753,382 | 7/1956 | Hamner . |
| 2,758,143 | 8/1956 | Arundale et al. . |
| 2,766,311 | 10/1956 | Mayer et al. . |
| 2,766,312 | 10/1956 | Serniuk . |
| 2,767,234 | 10/1956 | Dauber et al. . |
| 2,772,317 | 11/1956 | Smith et al. . |
| 2,773,051 | 12/1956 | Leary . |
| 2,775,577 | 12/1956 | Schneider et al. . |
| 2,778,804 | 1/1957 | Corner et al. . |
| 2,779,753 | 1/1957 | Garabrant et al. . |
| 2,786,878 | 3/1957 | Arundale et al. . |
| 2,816,944 | 12/1957 | Muessig et al. . |
| 2,831,037 | 4/1958 | Schmerling . |
| 2,833,746 | 5/1958 | Haefner . |
| 2,849,428 | 8/1958 | Small et al. . |
| 2,852,580 | 9/1958 | Geiser . |
| 2,878,240 | 3/1959 | Schmerling . |
| 2,887,472 * | 5/1959 | Fotis, Jr. ............................ 585/9 X |
| 2,906,793 | 9/1959 | Rowe et al. . |
| 2,914,517 | 11/1959 | Schmerling . |
| 2,931,792 | 4/1960 | Aries . |
| 2,938,018 | 5/1960 | Schmerling . |
| 2,945,845 | 7/1960 | Schmerling . |
| 2,976,338 | 3/1961 | Thomas . |
| 2,987,511 | 6/1961 | Arrigo . |
| 3,000,868 | 9/1961 | Powers . |
| 3,006,905 | 10/1961 | Geiser . |
| 3,006,906 | 10/1961 | Geiser . |
| 3,017,400 | 1/1962 | Bloch . |
| 3,024,226 | 3/1962 | Nolan et al. . |
| 3,037,970 | 6/1962 | Geiser . |
| 3,054,787 | 9/1962 | D'Alelio . |
| 3,109,041 | 10/1963 | Child et al. . |
| 3,112,350 | 11/1963 | Bielawski et al. . |
| 3,113,165 | 12/1963 | Bloch . |
| 3,128,318 | 4/1964 | Meisinger et al. . |
| 3,133,127 | 5/1964 | Heisler et al. . |
| 3,136,729 * | 6/1964 | Clark ............................ 526/194 X |
| 3,154,595 | 10/1964 | Donaldson et al. . |
| 3,166,545 | 1/1965 | Pezdirtz . |
| 3,179,649 | 4/1965 | Feay et al. . |
| 3,190,936 | 6/1965 | Child et al. . |
| 3,190,938 | 6/1965 | Edwards . |
| 3,221,001 | 11/1965 | Kirshenbaum et al. . |
| 3,244,767 | 4/1966 | Nixon . |
| 3,244,768 | 4/1966 | Holt . |
| 3,248,341 | 4/1966 | Louvar . |
| 3,347,676 | 10/1967 | Cripps . |
| 3,364,191 | 1/1968 | Donaldson et al. . |
| 3,374,285 | 3/1968 | Henke et al. . |
| 3,383,378 | 5/1968 | Bloch et al. . |
| 3,418,304 | 12/1968 | Langer et al. . |
| 3,420,809 | 1/1969 | Tornqvist . |
| 3,426,007 | 2/1969 | Kennedy . |
| 3,426,089 | 2/1969 | De Rosset . |
| 3,427,275 | 2/1969 | Davis et al. . |
| 3,457,189 | 7/1969 | De Rosset . |
| 3,463,744 | 8/1969 | Mitsche . |
| 3,464,929 | 9/1969 | Mitsche . |
| 3,472,791 | 10/1969 | Vesely . |
| 3,497,568 | 2/1970 | Stepanek et al. . |
| 3,499,877 | 3/1970 | Arnold . |
| 3,515,769 | 6/1970 | Fishel . |
| 3,555,107 | 1/1971 | Estes . |
| 3,577,400 | 5/1971 | Judy . |
| 3,586,616 | 6/1971 | Kropp . |
| 3,597,403 | 8/1971 | Ofstead . |
| 3,597,406 | 8/1971 | Calderon . |
| 3,607,959 | 9/1971 | Estes et al. . |
| 3,609,098 | 9/1971 | Brown . |
| 3,624,060 | 11/1971 | Judy . |
| 3,630,981 | 12/1971 | Finfinger et al. . |
| 3,631,212 | 12/1971 | Schmerling . |
| 3,640,981 | 2/1972 | Davis . |
| 3,644,220 | 2/1972 | Kearby . |
| 3,652,487 | 3/1972 | Ward . |
| 3,652,706 | 3/1972 | Saines et al. . |
| 3,652,707 | 3/1972 | Saines et al. . |
| 3,657,205 | 4/1972 | Throckmorton . |
| 3,657,208 | 4/1972 | Judy . |
| 3,661,870 | 5/1972 | Bullard . |
| 3,669,947 | 6/1972 | Kahn et al. . |
| 3,689,434 | 9/1972 | Suggitt et al. . |
| 3,689,471 | 9/1972 | Judy . |
| 3,692,694 | 9/1972 | Kravitz et al. . |
| 3,692,695 | 9/1972 | Suggitt et al. . |
| 3,692,696 | 9/1972 | Kravitz et al. . |
| 3,692,697 | 9/1972 | Kravitz et al. . |
| 3,692,872 | 9/1972 | Calderon et al. . |
| 3,711,425 | 1/1973 | Suggitt et al. . |
| 3,717,586 | 2/1973 | Suggitt et al. . |
| 3,734,866 | 5/1973 | Aylies et al. . |
| 3,746,696 | 7/1973 | Judy . |
| 3,753,961 | 8/1973 | St. Cyr . |
| 3,753,962 | 8/1973 | Restaino . |
| 3,772,255 | 11/1973 | Bell . |
| 3,772,401 | 11/1973 | Stepanek . |
| 3,799,913 | 3/1974 | Wheeler et al. . |
| 3,801,559 | 4/1974 | Ofstead et al. . |
| 3,842,019 | 10/1974 | Kropp . |
| 3,867,361 | 2/1975 | Calderon et al. . |
| 3,888,789 | 6/1975 | Dombro et al. . |
| 3,926,882 | 12/1975 | Henk et al. . |
| 3,929,737 | 12/1975 | Tazuma et al. . |
| 3,932,332 | 1/1976 | Douglas et al. . |
| 3,932,553 | 1/1976 | Robert . |
| 3,935,179 | 1/1976 | Ofstead . |
| 3,943,116 | 3/1976 | Bell . |
| 3,945,986 | 3/1976 | Ofstead . |
| 3,956,180 | 5/1976 | Cavitt . |
| 3,956,250 | 5/1976 | Campbell et al. . |
| 3,975,336 | 8/1976 | Lal et al. . |
| 3,980,577 | 9/1976 | Hotta . |
| 3,987,109 | 10/1976 | Brennan et al. . |
| 3,992,322 | 11/1976 | Dombro et al. . |
| 3,997,471 | 12/1976 | Ofstead . |
| 4,009,228 | 2/1977 | Tazuma et al. . |
| 4,010,113 | 3/1977 | Ofstead . |
| 4,013,736 | 3/1977 | Woo . |
| 4,020,254 | 4/1977 | Ofstead . |
| 4,028,272 | 6/1977 | Throckmorton . |
| 4,038,471 | 7/1977 | Castner . |
| 4,048,262 | 9/1977 | Haag et al. . |
| 4,062,801 | 12/1977 | Burton et al. . |
| 4,063,011 | 12/1977 | Campbell et al. . |
| 4,064,335 | 12/1977 | Lal et al. . |
| 4,068,062 | 1/1978 | Lepert et al. . |
| 4,075,404 | 2/1978 | Douglas et al. . |
| 4,105,843 | 8/1978 | Iwase et al. . |
| 4,108,944 | 8/1978 | Tazuma et al. . |
| 4,127,710 | 11/1978 | Hsieh . |
| 4,130,701 | 12/1978 | Lepert . |
| 4,133,801 | 1/1979 | Morimatsu et al. . |
| 4,137,390 | 1/1979 | Ofstead . |
| 4,153,771 | 5/1979 | Bullard et al. . |
| 4,168,357 | 9/1979 | Throckmorton et al. . |
| 4,171,414 | 10/1979 | Wagensommer et al. . |
| 4,172,932 | 10/1979 | Ofstead et al. . |
| 4,205,160 | 5/1980 | Gloth et al. . |
| 4,217,409 | 8/1980 | Inoue et al. . |

| | | | | | |
|---|---|---|---|---|---|
| 4,230,840 | 10/1980 | Katayama et al. . | 4,711,866 | 12/1987 | Kuntz . |
| 4,233,139 | 11/1980 | Murrell et al. . | 4,719,190 | 1/1988 | Drago et al. . |
| 4,239,874 | 12/1980 | Ofstead et al. . | 4,719,271 | 1/1988 | Dietz . |
| 4,245,075 | 1/1981 | Lepert . | 4,721,559 | 1/1988 | Olah . |
| 4,248,735 | 2/1981 | McDaniel et al. . | 4,732,936 | 3/1988 | Holohan, Jr. . |
| 4,294,724 | 10/1981 | McDaniel . | 4,744,970 | 5/1988 | Lok et al. . |
| 4,296,001 | 10/1981 | Hawley . | 4,757,044 | 7/1988 | Cooper et al. . |
| 4,299,731 | 11/1981 | McDaniel et al. . | 4,780,513 | 10/1988 | Powers et al. . |
| 4,301,034 | 11/1981 | McDaniel . | 4,788,171 | 11/1988 | Klendworth . |
| 4,301,227 | 11/1981 | Hotta et al. . | 4,791,086 | 12/1988 | Yeh et al. . |
| 4,328,090 | 5/1982 | Stuckey, Jr. et al. . | 4,793,833 | 12/1988 | Lok et al. . |
| 4,339,559 | 7/1982 | McDaniel . | 4,801,364 | 1/1989 | Wilson et al. . |
| 4,345,055 | 8/1982 | Hawley . | 4,814,308 | 3/1989 | Konrad et al. . |
| 4,347,158 | 8/1982 | Kaus et al. . | 4,822,707 | 4/1989 | Inoue et al. . |
| 4,359,406 | 11/1982 | Fung . | 4,824,554 | 4/1989 | Lok et al. . |
| 4,363,746 | 12/1982 | Capshew . | 4,824,921 | 4/1989 | Luvinh . |
| 4,364,840 | 12/1982 | McDaniel et al. . | 4,843,133 | 6/1989 | Short et al. . |
| 4,364,841 | 12/1982 | McDaniel et al. . | 4,846,066 | 7/1989 | Fahey et al. . |
| 4,364,854 | 12/1982 | McDaniel et al. . | 4,846,956 | 7/1989 | Lok et al. . |
| 4,367,352 | 1/1983 | Watts, Jr. et al. . | 4,849,572 | 7/1989 | Chen et al. . |
| 4,368,303 | 1/1983 | McDaniel . | 4,868,343 | 9/1989 | King et al. . |
| 4,378,306 | 3/1983 | Welch et al. . | 4,879,425 | 11/1989 | Kukes et al. . |
| 4,382,022 | 5/1983 | McDaniel . | 4,894,213 | 1/1990 | Flanigen et al. . |
| 4,384,086 | 5/1983 | McDaniel et al. . | 4,900,704 | 2/1990 | McDaniel et al. . |
| 4,391,737 | 7/1983 | Bell . | 4,912,279 | 3/1990 | Wilcher et al. . |
| 4,395,578 | 7/1983 | Larkin . | 4,929,800 | 5/1990 | Drago et al. . |
| 4,397,765 | 8/1983 | McDaniel . | 4,935,576 | 6/1990 | Chen . |
| 4,403,088 | 9/1983 | Smith et al. . | 4,948,768 | 8/1990 | Kukes et al. . |
| 4,415,715 | 11/1983 | Bell . | 4,952,544 | 8/1990 | McCauley . |
| 4,419,268 | 12/1983 | McDaniel . | 4,952,739 | 8/1990 | Chen . |
| 4,422,957 | 12/1983 | Kaus et al. . | 4,954,562 | 9/1990 | Anderson . |
| 4,424,139 | 1/1984 | McDaniel et al. . | 4,956,420 | 9/1990 | White et al. . |
| 4,424,320 | 1/1984 | McDaniel . | 4,957,889 | 9/1990 | McCauley . |
| 4,425,226 | 1/1984 | Reusser et al. . | 4,982,045 | 1/1991 | Chen et al. . |
| 4,425,257 | 1/1984 | Miro et al. . | 4,987,200 | 1/1991 | Datta et al. . |
| 4,434,243 | 2/1984 | Martin . | 5,008,468 | 4/1991 | King et al. . |
| 4,434,280 | 2/1984 | McDaniel et al. . | 5,017,662 | 5/1991 | White . |
| 4,436,948 | 3/1984 | Bobsein . | 5,064,802 | 11/1991 | Stevens et al. . |
| 4,439,543 | 3/1984 | McDaniel et al. . | 5,073,531 | 12/1991 | Witt . |
| 4,442,274 | 4/1984 | McDaniel et al. . | 5,075,394 | 12/1991 | McDaniel et al. . |
| 4,442,275 | 4/1984 | Martin . | 5,081,086 | 1/1992 | Wilcher et al. . |
| 4,444,904 | 4/1984 | Ryu . | 5,110,778 | 5/1992 | Olah . |
| 4,444,962 | 4/1984 | McDaniel et al. . | 5,113,034 | 5/1992 | Soled et al. . |
| 4,444,966 | 4/1984 | McDaniel . | 5,139,761 | 8/1992 | Nair et al. . |
| 4,444,968 | 4/1984 | McDaniel et al. . | 5,171,791 | 12/1992 | Marchand et al. . |
| 4,454,367 | 6/1984 | Sakurada et al. . | 5,177,288 | 1/1993 | Chen . |
| 4,513,166 | 4/1985 | Sakurada et al. . | 5,190,844 | 3/1993 | Yabuuchi et al. . |
| 4,520,121 | 5/1985 | Inkrott et al. . | 5,191,132 | 3/1993 | Patsidis et al. . |
| 4,520,222 | 5/1985 | Reusser et al. . | 5,191,140 | 3/1993 | Akatsu et al. . |
| 4,536,358 | 8/1985 | Welsh et al. . | 5,198,512 | 3/1993 | Jackson et al. . |
| 4,547,474 | 10/1985 | Olah . | 5,198,563 | 3/1993 | Reagen et al. . |
| 4,547,479 | 10/1985 | Johnson et al. . | 5,200,379 | 4/1993 | McDaniel et al. . |
| 4,555,496 | 11/1985 | Agapiou et al. . | 5,206,314 | 4/1993 | Mitchell et al. . |
| 4,558,170 | 12/1985 | Chen et al. . | 5,225,493 | 7/1993 | Marchand et al. . |
| 4,565,795 | 1/1986 | Short et al. . | 5,272,124 | 12/1993 | Wu . |
| 4,567,153 | 1/1986 | Graves . | 5,283,301 | 2/1994 | McDaniel et al. . |
| 4,575,538 | 3/1986 | Hsieh et al. . | 5,284,811 | 2/1994 | Witt et al. . |
| 4,588,703 | 5/1986 | Cowan et al. . | 5,286,823 | 2/1994 | Rath . |
| 4,596,862 | 6/1986 | McDaniel et al. . | 5,288,677 | 2/1994 | Chung et al. . |
| 4,604,438 | 8/1986 | Beuhler et al. . | 5,321,106 | 6/1994 | Lapointe . |
| 4,618,595 | 10/1986 | Dietz . | 5,322,910 | 6/1994 | Wu . |
| 4,618,661 | 10/1986 | Kaus et al. . | 5,324,881 | 6/1994 | Kresge et al. . |
| 4,619,980 | 10/1986 | McDaniel et al. . | 5,326,921 | 7/1994 | Chen . |
| 4,626,519 | 12/1986 | Miro et al. . | 5,326,923 | 7/1994 | Cooper et al. . |
| 4,677,174 | 6/1987 | Alexander et al. . | 5,328,881 | 7/1994 | Jackson et al . |
| 4,680,351 | 7/1987 | Miro et al. . | 5,328,956 | 7/1994 | Hasebe et al. . |
| 4,681,866 | 7/1987 | McDaniel et al. . | 5,330,949 | 7/1994 | Funabahsi et al. . |
| 4,684,707 | 8/1987 | Evans . | 5,331,104 | 7/1994 | Reagen et al. . |
| 4,686,092 | 8/1987 | Lok et al. . | 5,332,708 | 7/1994 | Knudsen et al. . |
| 4,689,436 | 8/1987 | Minokani et al. . | 5,338,812 | 8/1994 | Knudsen et al. . |
| 4,699,962 | 10/1987 | Hsieh et al. . | 5,347,026 | 9/1994 | Patsidis et al. . |

| | | |
|---|---|---|
| 5,350,723 | 9/1994 | Niethamer et al. |
| 5,350,726 | 9/1994 | Shaffer. |
| 5,350,819 | 9/1994 | Shaffer. |
| 5,354,721 | 10/1994 | Geerts. |
| 5,362,825 | 11/1994 | Hawley et al. |
| 5,365,010 | 11/1994 | Rao et al. |
| 5,366,945 | 11/1994 | Kresge et al. |
| 5,371,154 | 12/1994 | Brandvold et al. |
| 5,382,420 | 1/1995 | Vaughan. |
| 5,384,299 | 1/1995 | Turner et al. |
| 5,393,911 | 2/1995 | Patsidis et al. |
| 5,399,635 | 3/1995 | Neithamer et al. |
| 5,399,636 | 3/1995 | Alt et al. |
| 5,401,817 | 3/1995 | Palackal et al. |
| 5,403,803 | 4/1995 | Shaffer et al. |
| 5,409,873 | 4/1995 | Chung et al. |
| 5,412,024 | 5/1995 | Okada et al. |
| 5,414,177 | 5/1995 | Chung et al. |
| 5,414,180 | 5/1995 | Geerts et al. |
| 5,414,187 | 5/1995 | King et al. |
| 5,418,303 | 5/1995 | Shaffer. |
| 5,426,080 | 6/1995 | Kundsen et al. |
| 5,436,305 | 7/1995 | Alt et al. |
| 5,444,132 | 8/1995 | Witt et al. |
| 5,446,102 | 8/1995 | Oziomek et al. |
| 5,453,410 | 9/1995 | Kolthammer et al. |
| 5,459,218 | 10/1995 | Palackal et al. |
| 5,461,127 | 10/1995 | Naganuma et al. |
| 5,466,766 | 11/1995 | Patsidis et al. |
| 5,475,162 | 12/1995 | Branvold et al. |
| 5,491,214 | 2/1996 | Daughenbaugh et al. |
| 5,561,095 | 10/1996 | Chen et al. |
| 5,633,419 | 5/1997 | Spencer et al. |
| 5,648,580 | 7/1997 | Chen et al. |
| 5,710,225 | 1/1998 | Johnson et al. |

FOREIGN PATENT DOCUMENTS

| | | |
|---|---|---|
| 0273627 | 7/1988 | (EP). |
| 0352856A1 | 1/1990 | (EP). |
| 0352856B1 | 1/1990 | (EP). |
| 0367385 | 5/1990 | (EP). |
| 0367386 | 5/1990 | (EP). |
| 0391697 | 10/1990 | (EP). |
| 0575866 | 12/1993 | (EP). |
| 859391 | 9/1981 | (SU). |
| 91/14719 | 10/1991 | (WO). |
| 92/04115 | 3/1992 | (WO). |
| 93/02110 | 2/1993 | (WO). |
| 93/19103 | 9/1993 | (WO). |
| 94/13714 | 6/1994 | (WO). |
| 94/28036 | 12/1994 | (WO). |
| 94/28037 | 12/1994 | (WO). |
| 95/26814 | 10/1995 | (WO). |
| 95/26815 | 10/1995 | (WO). |
| 95/26816 | 10/1995 | (WO). |
| 95/26818 | 10/1995 | (WO). |
| 96/05236 | 2/1996 | (WO). |

OTHER PUBLICATIONS

Misono et al., "Solid Superacid Catalysts", *Chemtech*, pp. 23–29 (Nov. 1993).

Deno et al., "Acid Catalysis in $O_2$ Oxidations and the Possible Role of the Hydroperoxy Cation, $HO_2^{+}$", *Journal of the American Chemical Society*, 91:19, pp. 5237–5238 (Sep. 10, 1969).

Stevens, "Insite™ Catalysts Structure/Activity Relationships for Olefin Polymerization", *Stud. Surf. Sci. Catal.*, vol. 89, pp. 277–284 (1994).

Habimana et al., "Synthesis of Polymers Containing Pseudohalide Groups by Cationic Polymerization. 5. Study of Various Aspects of the 2–Methylpropene Polymerization Coinitiated by Hydrazoic Acid", *Macromolecules*, vol. 26, No. 9, pp. 2297–2302 (1993).

Cheradame et al., "Synthesis of Polymers Containing Pseudohalide Groups by Cationic Polymerization, $7^{a)}$, Thiocyanato and Isothiocyanato–functionalized Poly(2–methylpropene)", *Makromol. Chem., Rapid. Commun.*, 13, pp. 433–439 (1992).

Cheradame et al., "Synthesis of Polymers Containing Pseudohalide Groups by Cationic Polymerization, $4^{a)}$, Cocatalysis as a Direct Route to End–capped Poly(2–methylpropene) with Pseudohalide Groups", *Makromol. Chem.*, 193, pp. 2647–2658 (1992).

Cheradame et al., "Synthesis of Polymers Containing Pseudohalide Groups by Cationic Polymerization, $3^{a)}$, Preliminary Study of the Polymerization and Copolymerization of Alkenyl Monomers Containing Azide Groups", *Makromol. Chem.*, 192, pp. 2777–2789 (1991).

Hlatky et al., "Ionic, Base–Free Zirconocene Catalysts for Ethylene Polymerization", *J. Am. Chem. Soc.*, 111, pp. 2728–2729 (1989), accompanied by 48 pages of Supplementary Material.

Hlatky et al., "Metallocarboranes as Labile Anions for Ionic Zirconocene Olefin Polymerization Catalysts", *Organometallics*, 11, pp. 1413–1416 (1992), accompanied by 7 pages of Supplementary Material.

Cheradame et al., "Heterogeneous Cationic Polymerization Initiators I: Polymerization of 2–methylpropene in a Non Polar Medium", *C. R. Acad. Sci. Paris*, t. 318, Série II, pp. 329–334 (1994), including an English language abstract.

Schmid et al., "Unbridged Cyclopentadienyl–Fluorenyl Complexes of Zirconium as Catalysts for Homogeneous Olefin Polymerization", *Journal of Organometallic Chemistry*, 501, pp. 101–106 (1995).

Alt et al., "Verbrückte Bis(fluorenyl)komplexe des Zirconiums und Hafniums als hochreaktive Katalysatoren bei der homogenen Olefinpolymerisation. Die Molekülstrukturen von $(C_{13}H_9-C_2H_4-C_{13}H_9)$ und $(\eta^5:\eta^5-C_{13}H_8-C_2H_4-C_{13}H_8)ZrCl_2$", *Journal of Organometallic Chemistry*, 472, pp. 113–118 (1994).

Smith et al., "Bimetallic Halides. Crystal Structure of and Ethylene Polymerization by $VCi_2 \cdot ZnCl_2 \cdot 4THF$", *Inorganic Chemistry*, vol. 24, No. 19, pp. 2997–3002 (1985), accompanied by 19 pages of Supplementary Material.

Martin, "Titanium and Rare Earth Chloride Catalysts for Ethylene Polymerization", *Journal of Polymer Science: Polymer Chemistry Edition*, vol. 22, pp. 3843–3850 (1984).

Freeman et al., "Ethylene Polymerization Over Organochromium Catalysis: A Comparison Between Closed and Open Pentadienyl Ligands", *Journal of Polymer Chemistry: Part A: Polymer Chemistry*, vol. 25, pp. 2063–2075 (1987).

Clark et al., "Heats of Polymerization of 1–Butene over Silica–Alumina", *Journal of Catalysis*, 21, pp. 179–185 (1971).

McDaniel, "Controlling Polymer Properties with the Phillips Chromium Catalysts", *Ind. Eng. Chem. Res.*, 27, pp. 1559–1564 (1988).

Patsidis et al., "The Preparation and Characterization of 9–Substituted Bis(fluorenyl) Zirconium Dichloride Complexes", *Journal of Organometallic Chemistry*, 501, pp. 31–35 (1995).

Alt et al., "Formation and Reactivity of the Ethylene Complex $Cp_2TiC_2H_4$. The Crystal Structure of $(Cp_2TiEt)_2O$", *Journal of Organometallic Chemistry*, 349, pp. C7–C10 (1988).

Smith et al., "Synthesis of Copolymers of m–Diisopropylbenzene and m–Dimethoxybenzene", *Polymer Sci Technol.(Plenum)*, 25, pp. 415–429 (1984).

Kennedy et al., "New Telechelic Polymers and Sequential Copolymers by Polyfunctional Initiator–Transfer Agents (Inifers I. Synthesis and Characterization of $\alpha$, $\omega$–Di–(t–chloro)polyisobutylene", *Polym. Prepr.*, 20(2), pp. 316–319 (1979).

Izumi, "Silica–Included Heteropoly Compounds as Insoluble, Readily Separable Solid Acid Catalysts", Slides Presented at the 1995 International Chemical Congress of Pacific Basin Societies in Honolulu, Hawaii (Dec. 17–22, 1995).

Cai et al., "Study on the Oligomerization of Isobutene Using Heteropoly Acids and Their Salts as Catalysts", *Cuihua Xuebao*, pp. 370, 371 and 375 (1985).

Corma, "Inorganic Solid Acids and Their Use in Acid–Catalyzed Hydrocarbon Reactions", *Chem. Rev.*, 95, pp. 559–614 (1995).

Okuhara et al., "Acid Strength of Heteropolyacids and Its Correlation with Catalytic Activity", *Bull. Chem. Soc. Jpn.*, 67, pp. 1186–1188 (1994).

Vaughn et al., "High–Pressure Oligomerization of Propene over Heteropoly Acids", *Journal of Catalysis*, 147, pp. 441–454 (1994).

Okuhara et al., "Alkylation of Isobutene with Butenes Catalyzed by a Cesium Hydrogen Salt of 12–Tungstophosphoric Acid", *Chemistry Letters*, pp. 1451–1454 (1994).

Kamada et al., "Dispersion and Fixation of 12–Tungstophosphate Anion on a Silica Surface Modified with Silane Agents Having an Amine Group and Their Catalytic Properties", *Bull. Chem. Soc. Jpn.*, 66, pp. 3565–3570 (1993).

Na et al., "Skeletal Isomerization of n–Butane Catalyzed by an Acidic Cesium Salt of 12–Tungstophosphoric Acid", *Chemistry Letters*, pp. 1141–1144 (1993).

Izumi et al., "Acidic Cesium Salts of Keggin–type Heteropolytungstic Acids as Insoluble Solid Acid Catalysts for Esterification and Hydrolysis Reactions", *Chemistry Letters*, pp. 825–828 (1993).

Hu et al., "Catalysis by Heteropoly Compounds XXII. Reactions of Esters and Esterification Catalyzed by Heteropolyacids in a Homogeneous Liquid Phase—Effects of the Central Atom of Heteropolyanions Having Tungsten as the Addenda Atom", *Journal of Catalysis*, 143, pp. 437–438 (1993).

Lee et al., "Catalysis by Heteropoly Compounds. 20. An NMR Study of Ethanol Dehydration in the Pseudoliquid Phase of 12–Tungstophosphoric Acid", *J. Am. Chem. Soc.*, 114, pp. 2836–2842 (1992).

Izumi et al., "Acidic Alkali Metal Salts and Ammonium Salts of Kreggin–type Heteropolyacids as Efficient Solid Acid Catalysts for Liquid–phase Friedel–Crafts Reactions", *Chemistry Letters*, pp. 1987–1990 (1992).

Kozhevnikov et al., "De–t–Butylation of the Phenols Catalyzed by Bulk and Supported Heteropoly Acid", *Journal of Molecular Catalysis*, 75, pp. 179–186 (1992).

Nishimura et al., "High Catalytic Activities of Pseudoliquid Phase of Dodecatungstophosphoric Acid for Reactions of Polar Molecules", *Chemistry Letters*, pp. 1695–1698 (1991).

Lee et al., "NMR Evidence for Ethyl Cation and Protonated Ethanol in the Pseudoliquid Phase of $H_3PW_{12}O_{40}$", *Chemistry Letters*, pp. 1175–1178 (1988).

Baba et al., "Heteropolyacids and their Salts Supported on Acidic Ion–Exchange Resin as Highly Acitve Solid–Acid Catalysts", *Applied Catalysis*, 22, pp. 321–324 (1986).

Hibi et al., "Catalysis by Heteropoly Compounds X. Synthesis of Lower Olefins by Conversion of Dimethyl Ether Over 12–Tungstophosphates", *Applied Catalysis*, 24, pp. 69–83 (1986).

Tatematsu et al., "Preparation Process and Catalytic Activity of $Cs_xH_{3-x}O_{40}PW_{12}$", *Chemistry Letters*, pp. 865–868 (1984).

Hayashi et al., "Methanol Conversion over Metal Salts of 12–Tungstophosphoric Acid", *Journal of Catalysis*, 81, pp. 61–66 (1983).

Izumi et al., "Catalysis by Heterogeneous Supported Heteropoly Acid", *Journal of Catalysis* 84, pp. 402–409 (1983).

Izumi et al., "Efficient Homogeneous Acid Catalysis of Heteropoly Acid and its Characterization Through Ether Cleavage Reactions", *Journal of Molecular Catalysis*, 18, pp. 299–314 (1983).

Okuhara et al., "Catalysis by Heteropoly Compounds. VI. The Role of the Bulk Acid Sites in Catalytic Reactions over $Na_xH_{3-x}PW_{12}O_{40}$", *Journal of Catalysis*, 83, pp. 121–130 (1983).

Baba et al., "The Conversion of Methanol into Hydrocarbons over Metal Salts of Heteerpolyacids", *Bull. Chem. Soc. Jpn.*, 55, pp. 2657–2658 (1982).

Sebulsky et al., "Alkylation of Benzene with Dodecene–1 Catalyzed by Supported Silicotungstic Acid", *Ind. Eng. Chem. Process Des. Develop.*, vol. 10, No. 2, pp. 272–279 (1971).

Pillai et al., "Oligomerization of Vinylic Compounds on Montmorillonite Clay Catalysts", *React. Kinet. Catal. Lett.*, vol. 55, No. 2, pp. 251–257 (1995).

Okuhara et al., "Insoluble Heteropoly Compounds as Highly Active Catalysts for Liquid–phase Reactions", *J. Mol. Cat.*, 75, pp. 247–256 (1992).

Mizuno et al., "Heteropolyanions in Catalysis", *Journal of Molecular Catalysis*, 86, pp. 319–342 (1994).

Izumi et al., "Heteropoly Acid as Multifunctional Catalyst", *Zeolite, Clay, and Heteropoly Acid in Organic Reactions*, Chap. 3, pp. 99–161 (1992).

Ono, "Heteropoly Acid Catalysis—a Unique Blend of Acid–Base and Redox Properties", *Properties in Catalysis*, pp. 431–464 (1992).

Misono, "Heterogeneous Catalysis by Heteropoly Compounds of Molybdenum and Tungsten", *Catal. Rev.–Sci. Eng.*, 29(2&3), pp. 269–321 (1987).

Fu et al., "Perfluorooctanesulfonic Acid Catalyzed Friedel–Crafts Alkylation with Alkyl Halides", *Synthetic Communications*, 21(10&11), pp. 1273–1279 (1991).

Waller et al., "Catalysis with Nafion", *Chemtech*, 17, pp. 438–441 (Jul. 1987).

Harmer et al., "Unique Silane Modified Perfluorosulfonic Acids as Versatile Reagents for New Solid Acid Catalysts", *Chem. Commun.*, pp. 1803–1804 (1997).

Harmer et al., "High Surface Area Nafion Resin/Silica Nanocomposites: A New Class of Solid Acid Catalyst", *J. Am. Chem. Soc.*, vol. 118, No. 33, pp. 7708–7715 (1996).

Kawada et al., "Lanthanide Trifluoromethanesulfonates as Reusable Catalysts: Catalytic Friedel–Crafts Acylation", *J. Chem. Soc., Chem. Commun.*, pp. 1157–1158 (1993).

Kobayashi et al., "The Aldol Reaction of Silyl Enol Ethers with Aldehydes in Aqueous Media", *Tetrahedron Letters*, vol. 33, No. 12, pp. 1625–1628 (1992).

Thomas et al., "Chemistry of Weakly Solvated Lanthanide–Metal Cations. Synthesis, Characterization, and Catalytic Chemistry of $[Eu(CH_3CN)_3(BF_4)_3]_x$", *J. Am. Chem. Soc.*, 108, 4096–4103 (1986).

Holohan et al., "Hydrocarbon Resins", reprinted from *Kirk–Othmer: Encyclopedia of Chemical Technology*, vol. 12, pp. 852–869 (1980).

Chemical Abstract No. 84:73847a (1976).

Olah et al., "Boron, Aluminum, and Gallium Tris(trifluoromethanesulfonate) (Triflate): Effective New Friedel–Crafts Catalysts", *J. Am. Chem. Soc.*, 110, pp. 2560–2565 (1988).

Collomb et al., "Cationic Polymerisation and Electrophilic Reactions Promoted by Metal Salts of Strong Acids", *Cationic Polymerization and Related Processes*, pp. 49–67 (1984).

Collomb et al., "Cationic Polymerization Induced by Metal Salts—I", *European Polymer Journal*, vol. 16, pp. 1135–1144 (1980).

Collomb et al., "Cationic Polymerisation Induced by Metal Salts of Strong Acids: Kinetics and Mechanisms", *Proc. IUPAC, I.U.P.A.C., Macromol. Symp., 28th*, p. 136 (1982).

Lowery, "Hydrocarbon Resins", *Kirk–Othmer: Encyclopedia of Chemical Technology*, vol. 13, pp. 717–743 (1995).

Derwent Abstract No. 001575902 WPI Acc No. 76–10285X/06 (Mar. 17, 1976).

* cited by examiner

SOLID ACIDS AS CATALYSTS FOR THE PREPARATION OF HYDROCARBON RESINS

CROSS-REFERENCE TO RELATED APPLICATIONS

The present application claims the priority under 35 U.S.C. §119(e) of U.S. Provisional Application No. 60/035,217, filed Jan. 8, 1997; U.S. Provisional Application No. 60/034,579, filed Jan. 9, 1997; and U.S. Provisional Application No. 60/035,797, filed Jan. 10, 1997; the disclosures of which are expressly incorporated by reference herein in their entirety. The present application expressly incorporates by reference herein the entire disclosures of U.S. application Ser. No. 09/003,879, entitled "Metal Halide Solid Acids and Supported Metal Halides as Catalysts for the Preparation of Hydrocarbon Resins"; U.S. application Ser. No. 09/003,888 U.S. Pat. No. 6,133,386, entitled "Metal Oxide Solid Acids as Catalysts for the Preparation of Hydrocarbon Resins"; and U.S. Application Ser. No. 09/003,594, entitled "Fluorinated Solid Acids as Catalysts for the Preparation of Hydrocarbon Resins"; which are concurrently filed with the present application.

BACKGROUND OF THE INVENTION

1. Field of the Invention

This invention relates to solid acids useful as catalysts for the polymerization of a feed stream containing at least one of pure monomer, C5 monomers, and C9 monomers to produce a hydrocarbon resin, to processes of preparing hydrocarbon resins using solid acid catalysts, and to hydrocarbon resins produced by such processes.

2. Discussion of Background

Hydrocarbon resins are low molecular weight, thermoplastic materials prepared via thermal or catalytic polymerization. The resins may be derived from several different sources of monomers. The monomer sources include cracked petroleum distillate from oil refining, turpentine fractions (e.g., terpenes from natural product distillation), paper mill by-product streams, coal tar, and a variety of pure olefinic monomers.

The resulting hydrocarbon resins can range from viscous liquids to hard, brittle solids with colors ranging from water white to pale yellow, amber, or dark brown depending on the monomers used and the specific reaction conditions. Typically, pure monomer resins tend to be water white, C9 monomer resins tend to be brown, and C5 monomer resins tend to be yellow.

Hydrocarbon resins are used extensively as modifiers in adhesives, rubber, hot-melt coatings, printing inks, paint, flooring, and other applications. The resins are usually used to modify other materials.

Pure monomer hydrocarbon resins can be prepared by cationic polymerization of styrene-based monomers such as styrene, alpha-methyl styrene, vinyl toluene, and other alkyl substituted styrenes using Friedel-Crafts polymerization catalysts such as Lewis acids (e.g., boron trifluoride ($BF_3$), complexes of boron trifluoride, aluminum trichloride ($AlCl_3$), alkyl aluminum chlorides).

Similarly, aliphatic C5 hydrocarbon resins can be prepared by cationic polymerization of a cracked petroleum feed containing C5 and C6 paraffins, olefins, and diolefins also referred to as "C5 monomers". These monomer streams are comprised of cationically polymerizable monomers such as 1,3-pentadiene which is the primary reactive component along with cyclopentene, pentene, 2-methyl-2-butene, 2-methyl-2-pentene, cyclopentadiene, and dicyclopentadiene. The polymerizations are catalyzed using Friedel-Crafts polymerization catalysts such as Lewis acids (e.g., boron trifluoride ($BF_3$), complexes of boron trifluoride, aluminum trichloride ($AlCl_3$), or alkyl aluminum chlorides). In addition to the reactive components, nonpolymerizable components in the feed include saturated hydrocarbons which can be codistilled with the unsaturated components such as pentane, cyclopentane, or 2-methylpentane. This monomer feed can be copolymerized with C4 or C5 olefins or dimers as chain transfer agents.

Also, aromatic C9 hydrocarbon resins can be prepared by cationic polymerization of aromatic C8, C9, and/or C10 unsaturated monomers derived from petroleum distillates resulting from naphtha cracking and are referred to as "C9 monomers". These monomer streams are comprised of cationically polymerizable monomers such as styrene, alpha-methyl styrene, beta-methyl styrene, vinyl toluene, indene, dicyclopentadiene, divinylbenzene, and other alkyl substituted derivatives of these components. The polymerizations are catalyzed using Friedel-Crafts polymerization catalysts such as Lewis acids (e.g., boron trifluoride ($BF_3$), complexes of boron trifluoride, aluminum trichloride ($AlCl_3$), alkyl aluminum chlorides). In addition to the reactive components, nonpolymerizable components include aromatic hydrocarbons such as xylene, ethyl benzene, cumene, ethyl toluene, indane, methylindane, naphthalene and other similar species. These nonpolymerizable components of the feed stream can be incorporated into the resins via alkylation reactions.

Although Lewis acids are effective catalysts for the cationic polymerization reactions to produce hydrocarbon resins, they have several disadvantages. Conventional Lewis acids are single use catalysts which require processing steps to quench the reactions and neutralize the acids.

Further, conventional Lewis acids also require removal of catalyst salt residues from the resulting resin products. Once the salt residues generated from the catalyst neutralization are removed, the disposal of these residues presents an additional cost. Therefore, it is of particular interest to reduce the amount of catalyst residues, particularly halogen-containing species generated in these reactions.

Another problem involved in using conventional Lewis acid catalysts, such as $AlCl_3$ and $BF_3$, is that they are hazardous materials. These conventional Lewis acid catalysts generate highly corrosive acid gases on exposure to moisture, (e.g., HF, HCl).

In addition to the traditional Lewis acids, work has been done with certain solid acid catalysts. BITTLES et al., "Clay-Catalyzed Reactions of Olefins. I. Polymerization of Styrene", *Journal of Polymer Science: Part A*, Vol. 2, pp. 1221–31 (1964) and BITTLES et al., "Clay-Catalyzed Reactions of Olefins. II. Catalyst Acidity and Measurement", *Journal of Polymer Science: Part A*. Vol. 2, pp. 1847–62 (1964), the disclosures of which are herein incorporated by reference in their entireties, together disclose polymerization of styrene with acid clay catalysts to obtain polymers having molecular weights between 440 and 2000 as determined by freezing point depression of benzene solutions. These documents disclose that the catalyst was prepared for polymerization by heating under vacuum, and that if the catalyst adsorbed moisture, the activity of the catalyst could be restored by reheating under vacuum.

SALT, "The Use of Activated Clays as Catalysts in Polymerisation Processes, with Particular Reference to Polymers of Alpha Methyl Styrene", *Clay Minerals Bulletin*, Vol. 2, pp. 55–58 (1948), the disclosure of which is herein incorporated by reference in its entirety, discloses polymerization of styrene and/or alpha-methyl styrene by using a clay catalyst to obtain polymers that range from dimers to molecular weights of about 3000.

U.S. Pat. No. 5,561,095 to CHEN et al., the disclosure of which is herein incorporated by reference in its entirety, discloses a supported Lewis acid catalyst for polymerization of olefins, including C3–C23 alpha-olefins, to obtain polymers having number average molecular weights (Mn) ranging from about 300 to 300,000. Exemplary Lewis acid supports include silica, silica-alumina, zeolites, and clays. Example 1 of CHEN et al. discloses that a Lewis acid supported on silica is heated under vacuum.

U.S. Pat. No. 3,799,913 to WHEELER et al., the disclosure of which is herein incorporated by reference in its entirety, discloses Friedel-Crafts catalysts for polymerization of polymerizable constituents, including alpha-methyl styrene, indene, vinyl toluene and styrene, to obtain polymers having a number average molecular weight (Mn) ranging from about 350 to 1200. Zinc chloride is disclosed as one of the Friedel-Crafts catalysts.

U.S. Pat. No. 3,652,707 to SAINES, the disclosure of which is herein incorporated by reference in its entirety, discloses Friedel-Crafts metal halide catalysts for polymerization of olefin hydrocarbons, including pentene, styrene and methylstyrene, to obtain polymers; having a molecular weight of from about 700 to about 2500. Zinc chloride is disclosed as one of the Friedel-Crafts metal halide catalysts.

PENG et al., "Electrophilic Polymerization of 1,3-Pentadiene Initiated by Aluminum Triflate", *Eur. Polym. J.* Vol. 30, No. 1, pp. 69–77 (1994), the disclosure of which is herein incorporated by reference in its entirety, discloses aluminum triflate for polymerization of piperylene to obtain polymers having varying number average molecular weights.

European Patent Application 0 352 856 A1, the disclosure of which is herein incorporated by reference in its entirety, discloses use of aluminum triflate, cerium triflate, e.g., for oligomerization of C3 to C6 olefins to obtain oligomers having 6 to 24 carbon atoms.

GANDINI et al., "The Heterogeneous Cationic Polymerization of Aromatic Monomers by Aluminum Triflate", *Polymer Preprints*, American Chemical Society, pp. 359–360 (1996), the disclosure of which is herein incorporated by reference in its entirety, discloses use of aluminum triflate for polymerization of C9 related monomers to obtain a polymer having a number average molecular weight (Mn) around 3000. This document also discloses that aluminum triflate could be useful for the direct "resinification" of mixtures of aromatic monomers and solvents arising from specific petroleum cuts.

Other documents, the disclosures of which are incorporated by reference in their entireties, which generally disclose the use of solid acid catalysts to polymerize monomers for the preparation of resins include U.S. Pat. No. 4,068,062 to LEPERT, U.S. Pat. No. 4,130,701 to LEPERT, U.S. Pat. No. 4,245,075 to LEPERT, and U.S. Pat. No. 4,824,921 to LUVINH.

SUMMARY OF THE INVENTION

The present invention involves the preparation of hydrocarbon resins. More particularly, the present invention involves the use of solid acid catalysts to polymerize a feed of hydrocarbon monomers.

Hydrocarbon resins are prepared from at least one of pure styrene-based monomers, C5 monomers, and aromatic C9 monomers using relatively environmentally benign, recyclable, solid acid catalysts in which freely-associated water has been removed. In the present invention, hydrocarbon resins are prepared by cationic polymerization (e.g., Friedel-Crafts) wherein a feed stream containing at least one of pure monomer, C5 monomers, and C9 monomers is preferably treated with a solid acid catalyst.

Before use, the solid acid catalysts are treated to remove freely-associated water associated with the solids to maximize catalyst acidity and activity toward the polymerization. For example, prior to use, the catalyst may be calcined for a sufficient time to remove freely-associated water and/or the catalyst can be exposed to reduced atmospheric pressure. As an example of calcination, the calcining is at a temperature up to about 700° C., preferably at a temperature between about 50° C. and 500° C. The calcining may be under reduced atmospheric pressure for up to about 8 hours, preferably between about 1 hour to 4 hours.

In accordance with one aspect, the present invention is directed to a process for making a hydrocarbon resin which includes polymerizing a feed stream including at least one member selected from the group consisting of C5 monomers and C9 monomers in the presence of a solid acid catalyst to produce a hydrocarbon resin, wherein substantially all freely-associated water has been removed from the solid acid catalyst, and wherein the solid acid catalyst includes at least one member selected from the group consisting of acid activated clays, silica-alumina, amorphous silica-alumina, Brønsted acid on silica, Brønsted acid on silica-alumina, zeolites, mesoporous silica-alumina, Brønsted acid on mesoporous silica, and Brønsted acid on mesoporous silica-alumina.

In accordance with one aspect, the present invention is directed to a process for making a hydrocarbon resin which includes polymerizing a feed stream including pure monomer in the presence of a solid acid catalyst to produce a hydrocarbon resin, wherein substantially all freely-associated water has been removed from the solid acid catalyst, and wherein the solid acid catalyst includes at least one member selected from the group consisting of modified clays, Brønsted acid on clay, amorphous silica-alumina, Brønsted acid on silica, Brønsted acid on silica-alumna, zeolites, mesoporous silica-alumina, Brønsted acid on mesoporous silica, and Brønsted acid on mesoporous silica-alumina The acid activated clay may include naturally occurring clay mineral such as kaolinite, bentonite, attapulgite, montmorillonite, clarit, Fuller's earth, hectorite, or beidellite. The montmorillonite can be treated with at least one member selected from the group consisting of sulfuric acid and hydrochloric acid. The acid activated clay may include synthetic clay. The synthetic clay may include at least one member selected from the group consisting of saponite and hydrotalcite. The acid activated clay may include modified clay such as pillared clay. The pillared clay may include at least one member selected from the group consisting of aluminum oxide pillared clay, cerium modified alumina pillared clay, and metal oxide pillared clay. The acid activated clay may include Brønsted acid on clay, wherein the Brønsted acid includes at least one member selected from the group consisting of hydrofluoric acid, sulfuinc acid, nitric acid, phosphoric acid, and hydrochloric acid.

For the supported Brønsted acid solid acids, the Brønsted acid may be at least one member selected from the group consisting of hydrofluoric acid, sulfuric acid, nitric acid, phosphoric acid, and hydrochloric acid.

The zeolite may include at least one member selected from the group consisting of zeolite Y, zeolite β, MFI, MEL, NaX, NaY, faujasite, and mordenite.

In accordance with another feature of the invention, the feed stream includes between about 20 wt % and 80 wt % monomers and about 80 wt % to 20 wt % of solvent. Preferably, the feed stream includes about 30 wt % to 70 wt % monomers and about 70 wt % to 30 wt % of solvent. More preferably, the feed stream includes about 50 wt % to 70 wt % monomers and about 50 wt % to 30 wt % of solvent. The solvent may include an aromatic solvent. The aromatic solvent may include at least one member selected from the group consisting of toluene, xylenes, and aromatic petroleum solvents. The solvent may include an aliphatic solvent. The invention may furler include recycling the solvent.

In accordance with a feature of the invention, the feed stream includes at least C5 monomers. The feed stream may include at least C5 monomers, wherein cyclopentadiene and methylcyclopentadiene components are removed from the feed stream by heating at a temperature between about 100° C. and 160° C. and fractionating by distillation. The C5 monomers may include at least one member selected from the group consisting of isobutylene, 2-methyl-2-butene, 1-pentene, 2-methyl-1-pentene, 2-methyl-2-pentene, 2-pentene, cyclopentene, cyclohexene, 1,3-pentadiene, 1,4-pentadiene, isoprene, 1,3-hexadiene, 1,4-hexadiene, cyclopentadiene, and dicyclopentadiene. The feed stream may include at least C5 monomers, wherein the feed stream includes at least about 70 wt % of polymerizable monomers with at least about 50 wt % 1,3-pentadiene. The C5 feed stream may contain low levels of isoprene, generally contains a portion of 2-methyl-2-butene, and may contain one or more cyclodiolefins.

The feed stream may include at least C5 monomers, wherein the feed stream further includes up to about 40 wt % of chain transfer agent, preferably up to about 20 wt % of chain transfer agent. The chain transfer agent may include at least one member selected from the group consisting of C4 olefins, C5 olefins, dimers of C4 olefins, and dimers of C5 olefins. The chain transfer agent may include at least one member selected from the group consisting of isobutylene, 2-methyl-1-butene, 2-methyl-2-butene, dimers thereof, and oligomers thereof.

In accordance with a feature of the invention, the feed stream includes about 30 wt % to 95 wt % of C5 monomers and about 70 wt % to 5 wt % of a cofeed including at least one member selected from the group consisting of pure monomer, C9 monomers, and terpenes. Preferably, the feed stream includes about 50 wt % to 85 wt % of C5 monomers and about 50 wt % to 15 wt % of a cofeed including at least one member selected from the group consisting of pure monomer, C9 monomers, and texpenes.

In accordance with another feature of the invention, the feed stream includes at least C9 monomers. The C9 monomers may include at least one member selected from the group consisting of styrene, vinyl toluene, indene, dicyclopentadiene, and alkylated derivatives thereof. The C9 monomers may include at least about 20 wt % polymerizable unsaturated hydrocarbons. The C9 monomers may include about 30 wt % to 75 wt % polymerizable unsaturated hydrocarbons. The C9 monomers may include about 35 wt % to 70 wt % polymerizable unsaturated hydrocarbons.

In accordance with a feature of the invention, the feed stream includes about 30 wt % to 95 wt % of the C9 monomers and about 70 wt % to 5 wt % of a cofeed including at least one member selected from the group consisting of pure monomer, C5 monomers, and terpenes. Preferably, the feed stream includes about 50 wt % to 85 wt % of the C9 monomers and about 50 wt % to 15 wt % of a cofeed including at least one member selected from the group consisting of pure monomer, C5 monomers, and terpenes.

Many of the solid acid catalysts function most effectively in the presence of a controlled amount of water in the monomer feed stream. In accordance with this feature of the invention, the feed stream should include less than about 500 ppm water, preferably less than about 200 ppm water, more preferably less than about 100 ppm water, and most preferably less than about 50 ppm water.

In accordance with yet another feature of the invention, the feed stream is contacted with about 0.5 wt % to 30 wt %, preferably about 1 wt % to 20 wt %, more preferably about 3 wt % to 15 wt %, and most preferably 0.5 wt % to 5 wt % of the solid acid catalyst based or monomer weight in a batch reactor.

In accordance with a feature of the invention, the solid acid catalyst is added to the feed stream.

In accordance with another feature of the invention, the feed stream is added to a slurry of the solid acid catalyst in solvent. The feed stream may be passed over a fixed bed of the solid acid catalyst.

In accordance with yet another feature of the invention, the feed stream is cofed with a slurry of the solid acid catalyst into a reactor.

In accordance with a feature of the invention, the polymerization is carried out as a continuous process or as a batch process. A reaction time in the batch process is about 30 minutes to 8 hours, preferably about 1 hour to 4 hours at reaction temperature.

In accordance with a feature of the invention, the feed stream is polymerized at a reaction temperature between about −50° C. and 150° C., preferably between about −20° C. and 100° C., and more preferably between about 0° C. and 70° C.

In accordance with another feature of the invention, the polymerization is stopped by removing the solid acid catalyst from the hydrocarbon resin. The solid acid catalyst may be removed from the hydrocarbon resin by filtration. The hydrocarbon resin may be removed from a fixed bed reactor which includes the solid acid catalyst.

In accordance with a feature of the invention, the hydrocarbon resin is stripped to remove unreacted monomers, solvents, and low molecular weight oligomers. The unreacted monomers, solvents, and low molecular weight oligomers may be recycled.

In accordance with a feature of the invention, the hydrocarbon resin is separated from a hydrocarbon resin solution.

In accordance with a feature of the invention, the feed stream includes at least pure monomer and the resulting hydrocarbon resin has a softening point as measured by ASTM-E28 "Standard Test Method for Softening Point by Ring and Ball Apparatus", between about 5° C. and 170° C. The feed stream may include at least C5 monomers, wherein the softening point of the resulting hydrocarbon resin is between about 50° C. and 150° C. The feed stream may include at least C9 monomers, wherein the softening point of the resulting hydrocarbon resin is between about 70° C. and 160° C.

In accordance with a feature of the invention, the feed stream includes at least pure monomer, wherein the hydrocarbon resin has a number average molecular weight (Mn)

ranging from about 400 to 2000, a weight average molecular weight (Mw) ranging from about 500 to 5000, a Z average molecular weight (Mz) ranging from about 500 to 10,000, and a polydispersity (PD) as measured by Mw/Mn between about 1.2 and 3.5, where Mn, Mw, and Mz are determined by size exclusion chromatography (SEC).

In accordance with a feature of the invention, the feed stream includes at least C5 monomers, wherein the hydroaron resin has a number average molecular weight (Mn) of about 400 to 2000, a weight average molecular weight (Mw) of about 500 to 3500, a Z average molecular weight (Mz) of about 700 to 15,000, and a polydispersity (PD) as measured by Mw/Mn between about 1.2 and 5, where Mn, Mw, and Mz are determined by size exclusion chromatography (SEC).

In accordance with another feature of the invention, the feed stream includes at least C9 monomers, wherein the hydrocarbon resin has a number average molecular weight (Mn) of about 400 to 1200, a weight average molecular weight (Mw) of about 500 to 2000, a Z average molecular weight (Mz) of about 700 to 6000, and a polydispersity (PD) as measured by Mw/Mn between about 1.2 and 3.5, preferably 1.2 and 2.5, where Mn, Mw, and Mz are determined by size exclusion chromatography (SEC).

In accordance with another feature of the invention, the hydrocarbon resin is hydrogenated.

BRIEF DESCRIPTION OF THE DRAWINGS

The present invention is filrrer described in the detailed description which follows, in reference to the noted plurality of non-limiting drawings, and wherein:

FIGS. 1–5 depict contour plots generated from regression analysis of various pure; monomer resin polymerizations.

DETAILED DESCRIPTION OF THE INVENTION

Figure 1:
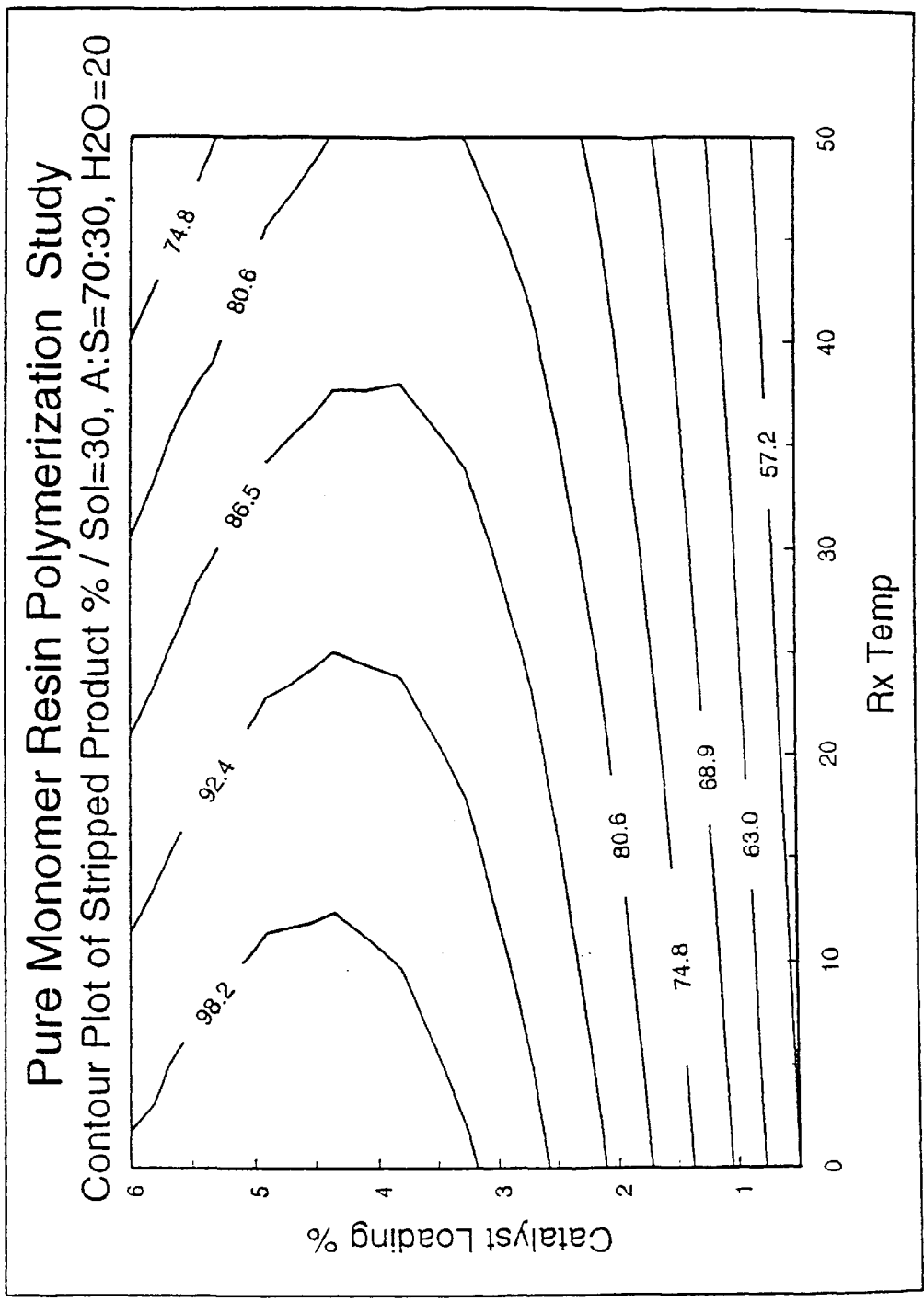

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description taken with the drawings making apparent to those skilled in the art how the several forms of the invention may be embodied in practice.

All percent measurements in this application, unless otherwise stated, are measured by weight based upon 100% of a given sample weight. Thus, for example, 30% represents 30 weight parts out of every 100 weight parts of the sample.

Unless otherwise stated, a reference to a compound or component, includes the compound or component by itself, as well as in combination with other compounds or components, such as mixtures of compounds.

Before further discussion, a definition of the following terms will aid in the understanding of the present invention.

SOLID ACID: a solid which changes the color of a basic Hammett indicator with a $pKI_a<0$.

HYDROCARBON RESIN: a low molecular weight (i.e., a number average molecular weight of about 200 to less than about 3000 as determined by size exclusion chromatography (SEC)) thermoplastic polymer synthesized via thermal or catalytic polymerization of cracked petroleum distillates, terpenes, coal tar fractions, or pure olefinic monomers, wherein one of the monomers is at least a C5 or higher.

PURE MONOMER: a composition comprising synthetically generated or highly purified monomer species, e.g., styrene from ethyl benzene or alpha methyl styrene from cumene.

PURE MONOMER FEED STREAM: a composition comprising any number of pure monomer species.

C5 MONOMERS: a composition derived from petroleum processing, e.g., cracking, containing unsaturated hydrocarbons comprising C5 and/or C6 olefin species boiling in the range from about 20° C. to 100° C. at atmospheric pressure.

C9 MONOMERS: a composition derived from petroleum processing, e.g., cracking, containing unsaturated aromatic C8, C9, and/or C10 olefin species with a boiling range of about 100° C. to 300° C. at atmospheric pressure.

FREELY-ASSOCIATED WATER: water associated with a solid acid catalyst where the water is chemisorbed and/or physisorbed.

As a general overview of the present invention, hydrocarbon resins are produced by using solid acids as catalysts for the cationic polymerization of a feed stream containing at least one of pure monomer (e.g., styrene based monomers), C5 monomers, and C9 monomers. Resins with softening points (Ring and Ball) preferably in the range of about 5° C. to 170° C., more preferably about 30° C. to 150° C., can be prepared. These catalysts offer advantages over the traditional Lewis acid polymerization catalysts since the acid sites are an integral part of the solid.

Looking at the present invention in more detail, hydrocarbon resins are prepared through a polymerization reaction wherein a feed stream containing at least one of pure monomer, C5 monomers, and C9 monomers are contacted with a solid acid catalyst. Solid acid catalysts which are useful in the current invention include, but are not limited to, the following.

Clay minerals, naturally occurring
    Kaolinite
    Bentonite
    Attapulgite
    Montmorillonite
    Clarit
    Fuller's Earth
    Hectorite
    Beidellite
Synthetic Clays, for example
    Saponite
    Hydrotalcite
Montmorillonite Clays treated with sulfuiric or hydrochloric acid
Modified clays (i.e., clays modified by backbone element replacement), for example
    Aluminum oxide pillared clays
    Cerium modified alumina pillared clays
    Metal oxide pillared clays
Brønsted acids on clay, for example
    Hydrofluoric acid
    Sulfuric acid
    Nitric acid
    Phosphoric acid
    Hydrochloric acid Silica-Aluminas, $SiO_2 \cdot Al_2O_3$
Amorphous silica-aluminas
Brønsted acids on silica or silica-alumina, for example
   Hydrofluoric acid
   Sulfuric acid
   Nitric acid
   Phosphoric acid
   Hydrochloric acid
Zeolites, natural or synthetic, for example
   Zeolite Y
   Zeolite β (i.e., BEA)
   MFI (e.g., "Zeolite Sacony Mobil-5" ("ZSM-5"))
   MEL (e.g., "Zeolite Sacony Mobil-11" ("ZSM-11"))
   NaX
   NaY
   Faujasite (i.e., FAU)
   Mordenite (i.e., MOR)
Mesoporous silica-aluminas
Brønsted acids on mesoporous silica or mesoporous silica-alumina, for example
   Hydrofluoric acid
   Sulfuric acid
   Nitric acid
   Phosphoric acid
   Hydrochloric acid As mentioned previously, the above list of solid acid catalysts is not intended to be an exhaustive list. In selecting other solid acid catalysts which may be useful in the present invention, it is generally true that the solid acid catalyst should be more acidic than about −3 on the Hammett scale.

Concerning the zeolites, the names BEA, MFI, MEL, FAU, and MOR are the framework structure type IUPAC definitions of the listed species.

Before use, the solid acid catalysts are treated to remove freely-associated water to maximize the catalyst acidity and activity toward the polymerization. The freely-associated water may be removed by various techniques, including thermal treatment, reduced pressure treatment, dry atmosphere treatment such as nitrogen or air, or a combination thereof. While not wishing to be bound by theory, removing freely-associated water maximizes the acid strength of Brønsted solid acid catalysts and makes the polymerizations more reproducible. The activity of acid-treated clay and silica-alumina is especially enhanced by removing the freely-associated water.

The freely-associated water may be removed from the solid acid catalyst by calcining which generally means heating the solid acid catalyst to high temperature without fusing the catalyst. The solid acid catalyst may be calcined under an inert atmosphere, such as nitrogen or dry air, or under reduced pressure. The calcimng is performed for preferably up to about 8 hours or more, more preferably about 1 hour to 4 hours, preferably at temperatures up to about 700° C., more preferably about 100° C. to 400° C.

The freely-associated water removed from the solid acid catalyst may have been derived from water (physisabed water) or hydroxyl groups (chemisorbed water) associated with the solid acid catalyst By removal of substantially all freely-associated water is meant removing all or essentially all physisorbed water and removing at least a majority of chemisorbed water.

It has been discovered that by controlling the conditions under which the solid acid catalyst is calcined, such as controlling the temperature or time under which the calcination step takes place, tailoring of the physical properties of the resultant resin, such as its softening point or its molecular weight, may be achieved.

Many of the solid acid catalysts of the present invention are most effective in the presence of a controlled amount of water in the feed stream. For instance, the feed stream should include less than about 500 ppm water, preferably less than about 200 ppm water, more preferably less than about 100 ppm water, and most preferably less than about 50 ppm water.

Pure monomer feed streams may contain relatively pure styrene-based monomers such as styrene, alpha-methyl styrene, beta-methyl styrene, 4-methyl styrene, and vinyl toluene fractions. The monomers can be used as pure components or as blends of two or more monomer feeds to give desired resin properties. Preferred blends include about 20 wt % to 90 wt % alpha-methyl styrene with about 80 wt % to 10 wt % of one or more comonomers, preferably styrene, vinyl toluene, 4-methyl styrene or blends of these components. In addition, other alkylated styrenes can be used as monomers in this invention such as t-butyl styrene or phenyl styrene. Feed streams can be dried, if desired, and preferably contain less than about 200 ppm water, more preferably less than about 100 ppm water, and most preferably less than about 50 ppm water.

In the case of C5 resins, the petroleum feed streams contain unsaturated C5 and/or C6 olefins and diolefins boiling in the range from about 20° C. to 100° C., preferably about 30° C. to 70° C. In some cases, cyclopentadiene and methylcyclopentadiene components are removed from the feed by heat soaking at temperatures between preferably about 100° C. and 160° C., and fractionating by distillation. Monomers found in these feedstocks may include but are not limited to olefins such as isobutylene, 2-methyl-2-butene, 1-pentene, 2-methyl-1-pentene, 2-methyl-2-pentene, as well as 2-pentene, cycloolefins such as cyclopentene, and cyclohexene, diolefins such as 1,3-pentadiene, 1,4-pentadiene, isoprene, 1,3-hexadiene, and 1,4-hexadiene, cyclodiolefins such as cyclopentadiene, dicyclopentadiene, and alkyl substituted derivatives and codimers of these cyclodiolefins. Commercial samples of this type of feed include, but are not limited to "Naphtha Petroleum 3 Piperylenes" from Lyondell Petrochemical Company, Houston, Tex., regular "Piperylene Concentrate" or "Super Piperylene Concentrate" both from Shell Nederland Chemie B.V., Hoogvilet, the Netherlands. The C5 feed streams generally contain at least about 70 wt % polymerizable monomers with at least about 50 wt % 1,3-pentadiene. The C5 feed stream may contain low levels of isoprene, generally contains a portion of 2-methyl-2-butene, and may contain one or more cyclodiolefins.

Also concerning C5 monomer feed streams, in addition to the reactive components, nonpolymerizable components in the feed may include saturated hydrocarbons which can be codistilled with the unsaturated components such as pentane, cyclopentane, or 2-methylpentane. This monomer feed can be copolymerized with C4 or C5 olefins or dimers as chain transfer agents. Chain transfer agents may be added to obtain resins with lower and narrower molecular weight distributions than can be prepared from using monomers alone. Chain transfer agents stop the propagation of a growing polymer chain by terminating the chain in a way which regenerates a polymer initiation site. Components which behave as chain transfer agents in these reactions include but are not limited to isobutylene, 2-methyl-1-butene, 2-methyl-2-butene or dimers or oligomers of these species. The chain transfer agent can be added to the reaction in pure form or diluted in a solvent. Feed streams can be dried if desired and preferably contain less than about 500 ppm water, more preferably less than about 200 ppm water, and most preferably less than about 50 ppm water.

In the case of C9 monomer resins, the feed streams contain unsaturated aromatic C8, C9, and/or C10 monomers with a boiling range of about 100° C. to 300° C. at atmospheric pressure. Aromatic C8–C10 feed streams (also referred to as C9 feed streams) can be derived from steam cracking of petroleum distillates. Monomers found in these feed stocks may include but are not limited to styrene, vinyl toluene, indene, dicyclopentadiene, and alkylated derivatives of these components. Commercial samples of this type of feed include but are not limited to "LRO-90" from Lyondell Petrochemical Company, Houston, Tex., "DSM C9 Resinfeed Classic" from DSM, Geleen, the Netherlands, "RO-60" and "RO-80" from Dow Chemical Company of Midland, Mich., and "Dow Resin Oil 60-L" from the Dow Chemical Company of Terneuzen, the Netherlands. The C9 feed stream generally contains at least about 20% by weight, preferably about 30% to 75% by weight, and most preferably about 35% to 70% by weight polymerizable unsaturated hydrocarbons. The remainder is generally alkyl substituted aromatics which can be incorporated into the resins by alkylation reactions. Feed streams can be dried if desired and preferably contain less than about 500 ppm water, more preferably less than about 200 ppm water, and most preferably less than about 50 ppm water.

The feed streams may be limited to pure monomer, C5 monomers, or C9 monomers. Alternatively, cofeed streams can be used in combination with main feed streams of pure monomer, C5 monomers, or C9 monomers. Depending upon the main feed stream, pure monomer, C5 monomers, C9 monomers, or even terpenes, and any combination thereof, may serve as a cofeed stream. Terpene feed stocks include but are not limited to d-limonene, alpha- and beta-pinene, as well as dipentene. Resins from blends of main feed streams with cofeed streams may be prepared in the range of about 30 wt % to 95 wt % main feed with about 70 wt % to 5 wt % of a cofeed, preferably about 50–85 wt % main feed and about 50 wt % to 15 wt % cofeed.

The polymerization feed stream preferably contains between about 20 wt % and 80 wt % monomers, more preferably about 30 wt % to 70 wt %, and most preferably about 40 wt % to 70 wt %. In the case of C5 resins, the feed may contain up to about 40 wt % of a chain transfer agent, more preferably up to about 20 wt %, chain transfer agents as discussed above. The feed stream also contains about 80 wt % to 20 wt % of a solvent such as toluene, octane, higher boiling aromatic solvent, aliphatic solvent, or solvent blend.

Regarding the solvents, for pure monomer polymerization, the preferred solvents are aromatic solvents. Typically toluene, xylenes, or light aromatic petroleum solvents such as "Aromatic 100" from Exxon Chemical Company, Houston, Tex., "HiSol 10" from Ashland Chemical Incorporated, Columbus, Ohio, and "Cyclosol 53" from Shell Chemical Company, Houston, Tex. can be used. These solvents can be used fresh or recycled from the process. The solvents generally contain less than about 200 ppm water, preferably less than about 100 ppm water, and most preferably less than about 50 ppm water.

For C5 polymerization, the preferred solvents are aromatic solvents. Generally, unreacted resin oil components are recycled through the process as solvent. In addition to the recycled solvents, toluene, xylenes, or aromatic petroleum solvents such as "Solvesso 100" from Exxon Chemical Company, Houston, Tex. and "Shellsol A" from Shell Chemical Company, Houston, Tex. can be used. These solvents can be used fresh or recycled from the process. The solvents generally contain less than about 500 ppm water, preferably less than about 200 ppm water, and most preferably less than about 50 ppm water.

For C9 polymerization, the preferred solvents are aromatic solvents. Generally, unreacted resin oil components are recycled through the process as solvent. In addition to the recycled solvents, toluene, xylenes, or aromatic petroleum solvents such as "Solvesso 100" from Exxon Chemical Company, Houston, Tex. and "Shellsol A" from Shell Chemical Company, Houston, Tex. can be used. These solvents can be used fresh or recycled from the process. The solvents generally contain less than about 200 ppm water, preferably less than about 100 ppm water, and most preferably less than about 50 ppm water.

Concerning the polymerization reaction conditions, a first important variable is the amount of solid acid catalyst which is used. The solid acids are preferably used at a level of about 0.1 wt % to 30 wt % based on the weight of the monomer. For pure monomer resins, the solid acid concentration is preferably about 0.1 to 15 wt %, more preferably about 0.5 wt % to 10 wt %, and most preferably about 0.5 wt % to 8 wt %. For C5 monomers, the solid acid concentration is preferably about 0.5 wt % to 30 wt %, more preferably about 1 wt % to 20 wt %, and most preferably about 3 wt % to 15 wt %. For C9 monomers, the solid acid concentration is preferably about 0.5 wt % to 30 wt %, more preferably about 1 wt % to 20 wt %, and most preferably about 3 wt % to 15 wt %. For acid-treated clays, the preferred concentration is about 0.5 to 5 wt % based on the weight of the monomer.

A second important variable in the reaction is the reaction sequence, i.e., the order and manner in which reactants are combined. In one reaction sequence, the catalyst can be added to a solution of the monomers incrementally while controlling the reaction temperature. Alternatively, in another reaction sequence, the monomer can be added incrementally to a slurry of the solid acid catalyst in a solvent. For a set catalyst level and reaction temperature, substantially lower softening point resins are obtained when the monomer is added to a catalyst slurry. As discussed in more detail in the following paragraphs, lower molecular weights and narrow polydispersity, i.e., Mw/Mn, as measured by size exclusion chromatography, are obtained when the monomer is added to the catalyst solution compared with resins where the catalyst is added to the monomer.

The molecular weight averages of the resins were measured using size exclusion chromatography, SEC. The column set for the analysis consisted of four Waters "Ultrastyragel" columns of 500, 500, 1000, and 100 Å pore size, in series, (Part Nos. WAT 010571, 010571, 010572, 010570 respectively) available from Waters Corporation, Milford, Mass. The molecular weight calibration was calculated from the peak elution times of a standard set of narrow molecular weight distribution polystyrene polymers. The calibration set encompassed 18 standards ranging in peak molecular weight from 162 to 43,900. The peak molecular weight of a narrow molecular weight standard is defined as equal to $(MwMn)^{1/2}$ (ASTM test method D3536-76). The calibration curve is defined by a third degree polynomial curve fit of a plot of log MW vs. $V_e/V_r$, where $V_e$ is the elution volume of the standard and $V_r$ is the elution volume of the reference peak, oxygen, present as dissolved air in the injected solution. The columns and detector cell (Hewlett-Packard Differential Refractometer) are maintained at 40° C. The solvent (mobile phase) is tetrahydrofuran containing 250 ppm butylated hydroxytoluene (BHT, 2,6-di-tert-butyl-4-methylphenol) as a stabilizer (the tetrahydrofuran with BHT being available from Burdick and Jackson, Muskegon, Mich.). The mobile phase reservoir is purged with helium and is maintained at a flow rate of 1 milliliter per minute. Under these conditions, BHT eluted at 35.86 minutes. Samples are dissolved in THF, 0.25% wt/vol, and filtered through a 0.45 micron pore size "TEFLON" (polytetrafluoroethylene) membrane filter prior to injection (200 microliters) into the chromatograph. The reported molecular weights are the "polystyrene equivalent" molecular weights as calculated from the calibration curve.

For the pure monomer resins, the resins produced using the current invention have number average molecular weights (Mn) ranging from about 400 to 2000, weight average molecular weights (Mw) ranging from about 500 to 5000, Z average molecular weights (Mz) ranging from about 500 to 10,000, and polydispersities (PD) as measured by Mw/Mn between about 1.2 and 3.5, typically between about 1.2 and 2.5. For the C5 hydrocarbon resins, the resins produced using the current invention have number average molecular weights (Mn) ranging from about 400 to 2000, weight average molecular weights (Mw) ranging from about 500 to 3500, Z average molecular weights (Mz) ranging from about 700 to 15,000, and polydispersities (PD) as measured by Mw/Mn between about 1.2 and 5, typically between about 1.2 and 3.5. For the C9 hydrocarbon resins, the resins produced using the current invention have number average molecular weights (Mn) ranging from about 400 to 1200, weight average molecular weights (Mw) ranging from about 500 to 2000, Z average molecular weights (Mz) ranging from about 700 to 6000, and polydispersities (PD) as measured by Mw/Mn between about 1.2 and 3.5, typically between about 1.2 and 2.5.

As mentioned previously, narrower polydispersities PAD and lower molecular weights are obtained when the monomer is added to the catalyst solution than when the catalyst is added to the monomer. Taking into consideration the effect of the reaction sequence, polydispersities (PD) more narrow than those obtained using traditional Lewis acid Friedel-Crafts catalysts can be obtained using solid acids if desired. For instance, when pure monomer is added to 3 wt % "F-22" clay catalyst (Engelhard Corporation, Iselin, N.J.) at a temperature of 0° C. over 15 minutes, the hydrocarbon resin product has an Mw of 810, an Mn of 580, an Mz of 1230, and a polydispersity (PD) of 1.40. In comparison, when 3 wt % of the "F-22" clay catalyst is added to pure monomer at a temperature of 0° C. over 15 minutes, the hydrocarbon resin product has an Mw of 3310, an Mn of 1290, an Mz of 8310, and a polydispersity (PD) of 2.56.

In view of the above, polydispersities (PD) more narrow than those obtained using traditional Lewis acid Friedel-Crafts catalysts can be obtained using solid acids if desired. Narrow polydispersity is important to ensure compatibility of resin with polymers in end use applications.

A third important reaction variable is the reaction temperature. Polymerization temperatures between about –50° C. and 150° C. can be used in these reactions, however, more preferred reaction temperatures are between about –20° C. and 100° C., most preferred temperatures are between about 0° C. and 70° C. For pure monomer, the reaction temperature is preferably between about –50° C. and 100° C., more preferably between about –200° C. and 75° C., and most preferably between about –10° C. and 60° C. For C5 monomers, the reaction temperature is preferably between about –50° C. and 100° C., more preferably between about –20° C. and 75° C., and most preferably between about –10° C. and 70° C. For C9 monomers, the reaction temperature is preferably between about 0° C. and 15° C., more preferably between about 10° C. and 120° C., and most preferably between about 20° C. and 110° C. Temperature is found to have a significant effect on the properties of the resulting resins. Higher molecular weight and high softening point resins are prepared at lower reaction temperatures. The reaction time at reaction temperature is preferably between about 30 minutes and 8 hours, and more preferably between about 1 hour and 4 hours.

The polymerization process can be carried out as a continuous, semi-batch, or batch process in such diverse reactors as continuous, batch, semi-batch, fixed bed, fluidized bed, and plug flow. For instance, in continuous processes, a solution of the monomers can be passed over the catalyst in a fixed bed, or the monomers can be cofed with a catalyst slurry into a continuous reactor.

The reaction may be stopped by physically separating the solid catalysts from the products. Physical separation may render the reaction solution neutral. Furthermore, physical separation can be performed by simple filtration or by separation of the resin solutions from a fixed catalyst bed. As a result, physical separation is easy and complete such that, for many solid acid catalysts, acid functionality and catalyst residue are not left in the resin product.

If leaching of acid is possible, then acid neutralization is required. This step is commonly known in the art as "quenching". For the solid acid catalysts which require quenching, less salt is generated than by traditional Lewis acid catalysts.

Thus, use of solid acid catalysts minimizes or eliminates the need for extra processing steps to quench the reactions, neutralize the catalyst, and filter the catalyst salt residues from the resulting products.

Once the solid acid catalyst and resin solution are separated, the resin solution can be strpped to remove unreacted hydrocarbons, solvents, and low molecular weight oligomers which can be recycled through the process. When pure monomer is reacted, water white resins can be obtained from this invention in yields of up to about 99% based on starting monomer. As shown by the data of the Examples with particular reference to the Tables, the present invention may result in yields greater than about 10%, 20%, 30%, 40%, 50%, 60%, 70%, 80%, 90%, or even 95%, based on monomer. More specifically, Examples 18–30, 102, 128–133, 135, 139, 148, 150–154, 156–160, 165, 167–171, and 173–177 show that use of amorphous silica-alumina results in yields of greater than about 10%, 20%, 30%, 40%, 50%, 60%, 70%, or even 80%, based on monomer.

Resins obtained from this invention typically have softening points as measured by ASTM-E28 "Standard Test Method for Softening Point by Ring and Ball Apparatus" (revised 1996), varying from preferably about 5° C. to 170° C., more preferably from about 30° C. to 150° C. For pure monomer resins, removing the freely-associated water from the catalyst results in higher softening point, higher molecular weight resins than previously observed for clay catalysts. For pure monomer, the softening points preferably range from about 5° C. to 170° C., more preferably from about 5° C. to 150° C. For C5 hydrocarbon resins, the softening point preferably ranges from about 5° C. to 170° C., more preferably from about 50° C. to 150° C., and most preferably about 70° C. to 130° C. For C9 hydrocarbon resins, the softening point is preferably up to about 170° C., and the softening point range is most preferably from about 70° C. to 160° C. Flowable resin or those that are liquids at room temperature can also be prepared if desired using proper reaction conditions.

After the resin is produced, it may be subsequently subjected to hydrogenation to reduce coloration and improve color stability. Hydrogenation of resins is well known in the art. For a discussion of hydrogenation, reference is made to U.S. Pat. No. 5,491,214 to DAUGHENBAUGH et al., which is herein incorporated by reference in its entirety.

The resins of the current invention can be used as modifiers in adhesives, sealants, printing inks, protective coatings, plastics, road markings, flooring, and as dry cleaning retexturizing agents.

The solid acid catalysts of the present invention offer several advantages over Lewis acids (e.g., $AlCl_3$, $AlBr_3$, $BF_3$, complexes of $BF_3$, $TiCl_4$, and others which are traditionally used for Friedel-Crafts polymerizations). Many of these advantages are a result of the acid sites being an integral part of the solid catalysts.

Because the acid sites are an integral part of the solid catalyst, contamination of the resin products or solvents with catalyst residues is minimal. As a result, the solid acid catalysts do not impart color to the hydrocarbon resins due to catalyst residues. If pure styrene-based monomers are used, the resulting resins can be water white.

The solid acid catalysts of the present invention can generally be regenerated and recycled to thereby minimize waste disposal of spent catalyst. In contrast, the Lewis acids are generally single use catalysts.

Further, the solid acid catalysts of the present invention are nonhazardous when compared with traditional Lewis acid catalysts such as $BF_3$ and $AlCl_3$. The catalysts of the present invention generally do not generate corrosive or hazardous liquid or gaseous acids on exposure to moisture.

The present invention will be further illustrated by way of the following Examples. Examples 1–102 involve pure monomer resins, Examples 103–121 involve C5 resins, and Examples 122–181 involve C9 resins. Example 182 involves a pure monomer resin which is hydrogenated. These examples are non-limiting and do not restrict the scope of the invention.

Unless stated otherwise, all percentages, parts, etc. presented in the examples are by weight.

EXAMPLES 1–10

These examples illustrate the use of acid-treated clays as solid acid catalysts for the preparation of high softening point, water white, pure monomer hydrocarbon resins.

A 500 milliliter three neck flask was equipped with an overhead stirrer, reflux condenser, gas inlet and outlet ports, thermometer, and a dropping addition funnel. The flask was charged with 86.6 grams of alpha-methyl styrene (reagent grade, Aldrich, Milwaukee, Wis.), 36.6 grams of styrene (reagent grade, Aldrich, Milwaukee, Wis.), and 36.6 grams of toluene (reagent grade, Aldrich, Milwaukee, Wis.). The monomers and solvent were dried as follows: the monomers were dried by passing through a column of activated alumina (Fischer 8–16 mesh, 0.3 grams alumina to 1 milliliter monomer) immediately prior to use, the toluene was dried over 3 angstrom molecular sieves prior to use. Acid-treated clay "F-1", "F-2", "F-6", "F-13", "F-20X", "F-22", "F-24", "F-105", "F-160" (Engelhard Corporation, Iselin, N.J.) and "XP-100" (W. R. Grace, Davison Division, Baltimore, Md.) were treated at 200° C. at 2–5 mm Hg for 4–6 hours prior to use. The catalysts were transferred to the dropping addition funnel in a moisture free atmosphere of nitrogen. The reaction solution was cooled to −10° C. Three (3) wt % of acid-treated clay catalyst was added to the reaction from the dropping addition funnel at a rate to maintain the reaction temperature at 0° C. while externally cooling the reaction flask in a −50° C. bath. Catalyst addition times ranged from 15 to 45 minutes. The reaction solution was stirred at 0° C. for a total reaction time of 3 hours.

After completion of the reaction time, the resin solutions were vacuum filtered from the acid-treated clay catalyst at room temperature. The reaction flask and catalyst filter cake were rinsed with approximately 100 milliliters of toluene. After catalyst filtration, the resin was stripped of solvent and volatile products at 2–5 mm Hg by gradually heating the solution to 185° C. and maintaining this strip temperature for 15 minutes upon complete removal of volatiles.

The resins produced had the properties listed in Table 1.

TABLE 1

| Example | Catalyst | Yield | Softening Point (R&B) | Molecular Weight | | |
|---|---|---|---|---|---|---|
| | | | | Mn | Mw | Mz |
| 1 | F-1 | 97% | 128° C. | 980 | 3470 | 9070 |
| 2 | F-2 | 78% | 150° C. | 1830 | 4620 | 9930 |
| 3 | F-6 | 99% | 127° C. | 1000 | 3220 | 8480 |
| 4 | F-13 | 99% | 132° C. | 1060 | 3610 | 9900 |
| 5 | F-20X | 99% | 129° C. | 1020 | 3360 | 8870 |
| 6 | F-22 | 99% | 131° C. | 1070 | 3210 | 8010 |
| 7 | F-24 | 87% | 156° C. | 1560 | 4210 | 9710 |
| 8 | F-105 | 99% | 133° C. | 1070 | 3390 | 9840 |
| 9 | F-160 | 99% | 138° C. | 1130 | 3640 | 9870 |
| 10 | XP-100 | 9% | — | 690 | 2100 | 5980 |

Comparative Example 11

This comparative example illustrates the effect of omitting calcining of the acid-treated clay catalyst prior to reaction of pure monomer.

Reaction apparatus and procedures were essentially the same as those outlined in Examples 1–10, except where noted. The catalyst used was "F-22" from Engelhard, Iselin, N.J. The catalyst was used as received with no thermal pretreatment.

The resin produced had the following properties.

| Catalyst | F-22 |
|---|---|
| Yield | 8% |
| Softening Point (R&B) | 108° C. |
| Molecular Weight | |
| Mn | 880 |
| Mw | 1480 |
| Mz | 3660 |

Comparing the above results of Comparative Example 11 with those of Example 6, it is clear that calcining the solid acid catalyst increased the yield and produced a resin with higher molecular weights and a higher softening point.

EXAMPLES 12–14

These examples illustrate the addition of the catalyst to a pure monomer solution and the effects of reaction temperature and catalyst loading on the resulting softening point and molecular weight of pure monomer hydrocarbon resins prepared with acid-treated clay catalysts. Resin properties can be controlled through the use of alternate reaction conditions.

The reaction apparatus and procedures were essentially the same as those outlined in Examples 1–10, except where noted. Catalyst loading, and reaction temperature are summarized in the Table 2. Catalyst loading was based on total monomer charge. The catalyst used was "F-22" from Engelhard, Iselin, N.J. The catalyst was treated at 200° C. at 2–5 mm Hg for 4–6 hours prior to use. The monomer solutions were cooled to 5–10° C. below the target reaction temperature prior to catalyst addition and the reaction was allowed to warm to the target reaction temperature as the catalyst was added. Catalyst addition time was typically 15 minutes and the reaction was held at the desired temperature to give a total reaction time of 1 hour.

After catalyst filtration, the solvent was removed from the resin solution at 100° C. at 2–5 mm Hg. Light oils were removed from the resin products by steam distillation as follows: a single neck flask containing the resin was fitted with a distillation head with an adaptor for an inlet tube and a thermometer, and attached to a condenser and receiving flask. The resin oil was heated to 235° C. with a nitrogen purge followed by a steam purge at 235–245° C. to remove light oil products. The steam purge was continued until less than 1 ml of resin was collected per 100 ml of steam condensate or until 1000 ml of steam condensate was collected. The steam purge was followed by a nitrogen purge at 235° C. to remove water from the remaining resin.

The resins produced had the properties listed in Table 2.

TABLE 2

| Ex. | Catalyst Loading | Reaction Temp. | Yield | Softening Point (R&B) | Molecular Weight | | | |
|---|---|---|---|---|---|---|---|---|
| | | | | | Mn | Mw | Mz | PD |
| 12 | 3 wt % | 0° C. | 92% | 143° C. | 1290 | 3310 | 8310 | 2.56 |
| 13 | 1.5 wt % | 0° C. | 68% | 129° C. | 1080 | 2050 | 3960 | 1.90 |
| 14 | 1 wt % | 20° C. | 84% | 130° C. | 1050 | 2020 | 4130 | 1.92 |

EXAMPLES 15–17

These examples illustrate the addition of pure monomer to a slurry of the catalyst in solvent and the effects of reaction temperature and catalyst loading on the resulting softening point and molecular weight of pure monomer hydrocarbon resins prepared with acid-treated clay catalysts. Resin properties can be controlled through the use of alternate reaction conditions.

A 500 milliliter three neck flask was equipped with an overhead stirrer, reflux condenser, gas inlet and outlet ports, thermometer, and a dropping addition funnel. The flask was charged with 36.6 grams of toluene (reagent grade, Aldrich, Milwaukee, Wis.) which had been dried over 3 angstrom molecular sieves and the desired level of acid-treated clay catalyst, "F-22" (Engelhard Corporation, Iselin, N.J.). The clay was treated at 200° C. at 2–5 mm Hg for 4–6 hours prior to use. The monomers, 86.6 grams of alpha-methyl styrene (reagent grade, Aldrich, Milwaukee, Wis.), 36.6 grams of styrene (reagent grade, Aldrich, Milwaukee, Wis.), and 36.6 grams of toluene (reagent grade, Aldrich, Milwaukee, Wis.) were added to the dropping addition funnel. The monomers and solvent were dried as follows: the monomers were dried by passing through a column of activated alumina (Fischer 8–16 mesh, 0.3 grams alumina to 1 milliliter monomer) immediately prior to use, the toluene was dried over 3 angstrom molecular sieves prior to use. The reaction solution was cooled to 10° C. below the desired reaction temperature. The monomer solution was added to the reaction flask from the dropping addition funnel at a rate to maintain the desired reaction temperature while externally cooling the reaction flask in a −50° C. bath. Monomer addition time ranged from 10 to 15 minutes. The reaction solution was stirred at the desired reaction temperature for a total reaction time of 1 hour.

After completion of the reaction time, the resin solution was vacuum filtered from the acid-treated clay catalyst at room temperature. The reaction flask and catalyst filter cake were rinsed with approximately 100 milliliters of toluene.

After catalyst filtration, the solvent was removed from the resin solution at 100° C. at 2–5 mm Hg. Light oils were removed from the resin products by steam distillation as follows: a single neck flask containing the resin was fitted with a distillation head with an adaptor for an inlet tube and a thermometer, and attached to a condenser and receiving flask. The resin was heated to 235° C. with a nitrogen purge followed by a steam purge at 235–245° C. to remove light oil products. The steam purge was continued until less than 1 ml of resin was collected per 100 ml of steam condensate or until 1000 ml of steam condensate was collected. The steam purge was followed by a nitrogen purge at 235° C. to remove water from the remaining resin.

The resins produced had the properties listed in Table 3.

TABLE 3

| Ex. | Catalyst Loading | Reaction Temp. | Yield | Softening Point (R&B) | Molecular Weight | | | |
|---|---|---|---|---|---|---|---|---|
| | | | | | Mn | Mw | Mz | PD |
| 15 | 3 wt % | 0° C. | 89% | 85° C. | 580 | 810 | 1230 | 1.40 |
| 16 | 1.5 wt % | 0° C. | 62% | 75° C. | 550 | 700 | 930 | 1.27 |
| 17 | 1 wt % | 20° C. | 54% | 70° C. | 530 | 650 | 800 | 1.23 |

Examples 12 through 17 illustrate the substantial differences in resin products which can be obtained by changing the order of catalyst and monomer addition. For a set catalyst level and reaction temperature, substantially lower softening point resins are obtained when the monomer is added to the catalyst slurry. Lower molecular weights and narrow polydispersity (Mw/Mn), as measured by size exclusion chromatography, are obtained when the monomer is added to the catalyst solution compared with resins where the catalyst is added to the monomer.

EXAMPLES 18 AND 19

These examples illustrate the use of amorphous silica-alumina as solid acid catalysts for the preparation of water white, pure monomer hydrocarbon resins.

A 500 milliliter three neck flask was equipped with an overhead stirrer, reflux condenser, gas inlet and outlet ports, thermometer, and a dropping addition funnel. The flask was charged with 86.6 grams of alpha-methyl styrene (reagent grade, Aldrich, Milwaukee, Wis.), 36.6 grams of styrene (reagent grade, Aldrich, Milwaukee, Wis.), and 36.6 grams of toluene (reagent grade, Aldrich, Milwaukee, Wis.). The monomers and solvent were dried as follows: the monomers were dried by passing through a column of activated alumina (Fischer 8–16 mesh, 0.3 grams alumina to 1 milliliter monomer) immediately prior to use, the toluene was dried over 3 angstrom molecular sieves prior to use. Amorphous silica-aluminas, "SAB-10" and "SAB-30" from UOP, DesPlaines, Ill., were crushed using a mortar and pestle to a coarse powder and were treated at 400° C. at 2–5 mm Hg for 4–6 hours prior to use. The catalysts were transferred to the dropping addition funnel in a moisture free atmosphere of nitrogen. The reaction solution was cooled to −10° C. The silica-alumina catalyst was added to the reaction solution from the dropping addition funnel at a rate to maintain the reaction temperature at 0° C. while externally cooling the reaction flask in a −50° C. bath. Catalyst addition times ranged from 20 to 30 minutes. The reaction solution was stirred at 0° C. for a total reaction time of 3 hours.

After completion of the reaction time, the resin solution was vacuum filtered from the silica-alumina catalyst at room temperature. The reaction flask and catalyst filter cake were rinsed with approximately 100 milliliters of toluene. After catalyst filtration, the resin was stripped of solvent and volatile products at 2–5 mm Hg by gradually heating the solution to 185° C. and maintaining this strip temperature for 15 minutes upon complete removal of volatiles.

The resins produced had the properties listed in Table 4.

TABLE 4

| Ex. | Catalyst | Catalyst Loading | Yield | Softening Point (R&B) | Molecular Weight Mn | Mw | Mz |
|---|---|---|---|---|---|---|---|
| 18 | SAB-10 | 5 wt % | 83% | — | 400 | 1080 | 5310 |
| 19 | SAB-30 | 5 wt % | 88% | 69° C. | 560 | 1540 | 3990 |

EXAMPLES 20–23

These examples illustrate the addition of the catalyst to a pure monomer solution and the effects of reaction temperature and catalyst loading on the resulting softening point and molecular weight of pure monomer hydrocarbon resins prepared with silica-alumina catalysts. Resin properties can be controlled through the use of alternate reaction conditions.

The reaction apparatus and procedures were essentially the same as those outlined in Examples 18 and 19, except where noted. Catalyst loading, and reaction temperature are summarized in the Table 5. Catalyst loading is based on total monomer charge. The catalyst used was "SAB-30" from UOP, DesPlaines, Ill. The catalyst was ground using a mortar and pestle to a coarse powder and treated at 400° C. at 2–5 nmn Hg for 4–6 hours prior to use. The monomer solutions were cooled to 5–10° C. below the target reaction temperature prior to catalyst addition and the reaction was allowed to warm to the target reaction as the catalyst was added. Catalyst addition time was typically 15 minutes and the total reaction time was 1 hour.

After catalyst filtration, the solvent was removed from the resin solution at 100° C. at 2–mm Hg. Light oils were removed from the resin products by steam distillation as follows: a single neck flask containing the resin was fitted with a distillation head with an adaptor for an inlet tube and a thermometer, and attached to a condenser and receiving flask. The resin oil was heated to 235° C. with a nitrogen purge followed by a steam purge at 235–245° C. to remove light oil products. The steam purge was continued until less than 1 ml of resin was collected per 100 ml of steam condensate or until 1000 ml of steam condensate was collected. The steam purge was followed by a nitrogen purge at 235° C. to remove water from the remaining resin.

The resins produced had the properties listed in Table 5.

TABLE 5

| Ex. | Catalyst Loading | Reaction Temperature | Yield | Softening Point (R&B) | Molecular Weight Mn | Mw | Mz |
|---|---|---|---|---|---|---|---|
| 20 | 1 wt % | 0° C. | 38% | 120° C. | 900 | 1620 | 3430 |
| 21 | 2 wt % | 0° C. | 62% | 114° C. | 870 | 1580 | 3360 |
| 22 | 3 wt % | 0° C. | 80% | 109° C. | 830 | 1620 | 3560 |
| 23 | 2 wt % | 10° C. | 72% | 93° C. | 730 | 1220 | 2320 |

EXAMPLES 24–27

These examples illustrate addition of pure monomer to a slurry of catalyst in solvent and the effects of reaction temperature and catalyst loading on the resulting softening point and molecular weight of pure monomer hydrocarbon resins prepared with silica-alumina catalysts. Resin properties can be controlled through the use of alternate reaction conditions.

The reaction apparatus and procedures were essentially the same as those outlined in Examples 15–17, except where noted. Catalyst loading, and reaction temperature are summarized in the Table 6. Catalyst loading is based on total monomer charge. The catalyst used was "SAB-30" from UOP, DesPlaines, Ill. The catalyst was ground using a mortar and pestle to a coarse powder and treated at 400° C. at 2–5 mm Hg for 4–6 hours prior to use. The monomer solutions were cooled to 5–10° C. below the target reaction temperature prior to catalyst addition and the reaction was allowed to warm to the target reaction temperature as the catalyst was added Monomer addition time was typically 10 to 15 minutes and the total reaction time was 1 hour.

After catalyst filtration, the solvent was removed from the resin solution at 100° C. at 2–5 mm Hg. Light oils were removed from the resin products by steam distillation as follows: a single neck flask containing the resin was fitted with a distillation head with an adaptor for an inlet tube and a thermometer, and attached to a condenser and receiving flask. The resin oil was heated to 235° C. with a nitrogen purge followed by a steam purge at 235–245° C. to remove light oil products. The steam purge was continued until less than 1 ml of resin was collected per 100 ml of steam condensate or until 1000 ml of steam condensate was collected. The steam purge was followed by a nitrogen purge at 235° C. to remove water from the remaining resin.

The resins produced had the properties listed in Table6.

TABLE 6

| Ex. | Catalyst Loading | Reaction Temperature | Yield | Softening Point (R&B) | Molecular Weight Mn | Mw | Mz |
|---|---|---|---|---|---|---|---|
| 24 | 1 wt % | 0° C. | 24% | 118° C. | 870 | 1400 | 2480 |
| 25 | 2 wt % | 0° C. | 58% | 97° C. | 700 | 1120 | 2020 |
| 26 | 3 wt % | 0° C. | 60% | 89° C. | 650 | 1010 | 1770 |
| 27 | 1 wt % | 10° C. | 55% | 81° C. | 590 | 830 | 1260 |

EXAMPLES 28–30

These examples illustrate the effect of the silica-alumina catalyst pretreatment prior to reaction of pure monomer.

Reaction apparatus and procedures were essentially the same as those outlined in Examples 15 through 17, except where noted. The catalyst used was "SAB-30" from UOP, DesPlaines, Ill. The catalysts were crushed using a mortar and pestle to a coarse powder and used without pretreatment or with a thermal treatment at either 200° C. or 400° C. at 2–5 mm Hg for 4–6 hours.

The resin produced had the properties listed in Table 7. Examples 29 and 30 are in accordance with the present invention, whereas Comparative Example 28 is for comparison purposes.

TABLE 7

| Ex. | Catalyst Pretreat | Catalyst Loading | Yield | Softening Point (R&B) | Molecular Weight | | |
|---|---|---|---|---|---|---|---|
| | | | | | Mn | Mw | Mz |
| 28 | None | 3 wt % | 15% | 98° C. | 890 | 1560 | 2730 |
| 29 | 200° C. | 3 wt % | 86% | 86° C. | 630 | 910 | 1480 |
| 30 | 400° C. | 3 wt % | 60% | 89° C. | 650 | 1010 | 1770 |

These examples demonstrate the effect calcining the catalyst has upon the final yield.

EXAMPLE 31

This example illustrates the use of a supported phosphoric acid as a catalyst for the polymerization of styrene based pure monomer to prepare hydrocarbon resins.

A 500 milliliter three neck flask was equipped with an overhead stirrer, reflux condenser, gas inlet and outlet ports, thermometer, and a dropping addition funnel. The flask was charged with 86.6 grams of alpha-methyl styrene (reagent grade, Aldrich, Milwaukee, Wis.), 36.6 grams of styrene (reagent grade, Aldrich, Milwaukee, Wis.), and 36.6 grams of toluene (reagent grade, Aldrich, Milwaukee, Wis.). The monomers and solvent were dried over 3 angstrom molecular sieves prior to use. Supported phosphoric acid, "CAT-17" from UOP, DesPlaines, Ill., was ground to a powder and heated to 120° C. at 2–5 mm Hg for 5 hours prior to use. The catalyst was transferred to the dropping addition funnel in a moisture free atmosphere of nitrogen. The reaction solution was cooled to –10° C. The acid-treated clay catalyst was added from the dropping addition fiunel at a rate to maintain the reaction temperature at 0° C. while cooling the reaction flask in a–50° C. bath. Catalyst addition time was 5 minutes. The reaction solution was stirred at 0° C. for a total reaction time of 3 hours.

After completion of the reaction time, the resin solution was vacuum filtered from the supported phosphoric acid catalyst at room temperature. The reaction flask and catalyst filter cake was rinsed with approximately 100 milliliters of toluene. After catalyst filtration, the resin was stripped of solvent and volatile products at 2–5 mm Hg by gradually heating the solution to 185° C. and maintaining this strip temperature for 15 minutes upon complete removal of volatiles.

The resin produced had the following properties.

| Catalyst | CAT-17 |
|---|---|
| Catalyst Level | 5 wt % |
| Yield | 42% |
| Softening Point (R&B) | Flowable |
| Molecular Weight | |
| Mn | 320 |
| Mw | 730 |
| Mz | 4760 |

EXAMLES 32–47

These examples illustrate the reusability and recyclability of solid acid catalysts in the polymerization of pure monomer to prepare hydrocarbon resins. A clay catalyst is reused 15 times for a total of 16 uses.

The catalyst recycle tests were done in a jacketed one gallon reactor with a flat-bed turbine agitator, coiling coil, sample line, thermowell, bottom valve, and sintered metal filters. The filters were located on the end of the sample line and in the bottom valve seat of the reactor and had a nominal rating of 7 microns. The jacket of the reactor was controlled at 0° C.±5° C.

Thirty-five (35) grams of an acid treated clay and 1000 grams of toluene were added to a 1 gallon reactor. The acid-treated clay catalyst was "F-22" (Engelhard Corporation, Iselin, N.J.), which had been calcined in a tube furnace at 200° C. for 2 hours. Dry nitrogen was flowed over the clay bed during the calcining process. The clay/toluene mixture was cooled to 0° C. A mixture of 866 grams of alpha-methyl styrene and 366 grams of styrene was pumped into the 1 gallon reactor at a rate such that the temperature was controlled to 0° C.±5° C. by flowing –20° C. fluid through the cooling coil. The time for pumping in the monomer was 100 minutes. The reactor was held at 0° C. for an additional 3 hours. The catalyst was retained in the reactor by using the two in situ filters. One gram of catalyst was removed and one gram of fresh catalyst was added between each of the catalyst recycle tests. An aliquot of the filtered reaction mixture was rotary evaporated, with an end condition of 3 mm Hg and 190° C. to produce a resin product.

Subsequent reactions using the same catalyst were done in essentially the same manner. The yield and properties of the resins are listed in Table 8.

TABLE 8

| Example | Run | Yield (%) | Softening Point (R&B) | Molecular Weight | | | |
|---|---|---|---|---|---|---|---|
| | | | | Mn | Mw | Mz | PD |
| 32 | 1 | 99 | 47° C. | 445 | 658 | 2504 | 1.48 |
| 33 | 2 | 97 | 94° C. | 700 | 1060 | 2485 | 1.51 |
| 34 | 3 | 97 | 94° C. | 721 | 1066 | 1620 | 1.48 |
| 35 | 4 | 97 | 87° C. | 647 | 932 | 1439 | 1.44 |
| 36 | 5 | 97 | 86° C. | 573 | 854 | 1341 | 1.49 |
| 37 | 6 | 97 | 82° C. | 554 | 822 | 1336 | 1.48 |
| 38 | 7 | 96 | 97° C. | 656 | 1086 | 2314 | 1.66 |
| 39 | 8 | 97 | 92° C. | 618 | 951 | 1508 | 1.54 |
| 40 | 9 | 95 | 114° C. | 818 | 1373 | 2221 | 1.68 |
| 41 | 10 | 96 | 115° C. | 869 | 1370 | 2233 | 1.58 |
| 42 | 11 | 95 | 96° C. | 650 | 1065 | 1835 | 1.64 |
| 43 | 12 | 97 | 86° C. | 576 | 889 | 1414 | 1.54 |
| 44 | 13 | 93 | 99° C. | 682 | 1059 | 1638 | 1.55 |
| 45 | 14 | 94 | 106° C. | 738 | 1218 | 1977 | 1.65 |
| 46 | 15 | 99 | 92° C. | 639 | 1046 | 1790 | 1.64 |
| 47 | 16 | 98 | 111° C. | 838 | 1399 | 2269 | 1.67 |

EXAMPLES 48–51

These examples illustrate the reusability and recyclability of solid acid catalysts in polymerization of pure monomer to prepare hydrocarbon resins.

The reaction apparatus and procedures were essentially the same as those outlined in Examples 15–17, except where noted. Three weight percent "F-22" acid-treated clay (Fngelhard Corporation, Iselin, N.J.) was used as the catalyst charge at a reaction temperature of 0° C. At the end of the reaction time, the catalyst was allowed to settle and the resin solution decanted from the solid catalyst. Additional monomer and solvent was added to the reaction flask from a dropping addition funnel. The reaction was run four times, A through D. After the fourth reaction the catalyst was collected by vacuum filtration through paper, extracted with toluene to remove organic residues, and recalcined at 150° C. This regenerated catalyst was reused for an additional six runs, E through J.

The average yield of resin for runs A through D was 77% while the average yield for runs E through J was 57%. The resins produced had the properties listed in Table 9.

TABLE 9

| Example | Catalyst Recycle | Softening Point (R&B) | Mn | Mw | Mz |
|---|---|---|---|---|---|
| 48 | Initial Use | 81° C. | 560 | 760 | 1120 |
| 49 | Fourth Reuse | 85° C. | 580 | 790 | 1140 |
| 50 | Fifth Reuse, First after Regeneration | 104° C. | 740 | 1110 | 1780 |
| 51 | Tenth Reuse, Sixth after Regeneration | 127° C. | 1030 | 1880 | 3740 |

EXAMPLES 52–59

These examples illustrate the use of supported Brønsted acids on solid acid catalysts for the preparation of high softening point, water white pure monomer hydrocarbon resins.

Catalyst preparation involved supporting Brønsted acid on acid treated clay catalysts, ("F-20" and "F-22" clay catalysts available from Engelhard Corporation, Iselin, N.J.). The clays were prepared by drying, impregnating by adding the "% Acid" of Brønsted acid listed in Table 10, and by drying again. The drying involved calcining for 2 hours by flowing dry nitrogen through a test tube containing the catalyst.

Polymerization involved a 500 milliliter three neck flask equipped with a cooling jacket overhead stirrer, a reflux condenser, gas inlet and outlet ports, a thermometer, and a dropping addition funnel. The flask was charged with 86.6 grams of alpha-methyl styrene (reagent grade, Aldrich, Milwaukee, Wis.), 36.6 grams of styrene (reagent grade, Aldrich, Milwaukee, Wis.), and 100 grams of toluene (reagent grade, Aldrich, Milwaukee, Wis.). The monomers were dried by passing through a column of activated alumina (Fischer 8–16 mesh, 0.3 grams alumina to 1 ml monomer) immediately prior to use. The toluene was dried over 3 angstrom molecular sieves prior to use. The catalyst, 3.8 grams, was added incrementally to control the reaction temperature at 0° C. The total reaction time was 3 hours after completion of the catalyst addition.

At the end of the reaction, the catalyst was filtered from the resin solution. The resin solution was rotary evaporated to a final condition by using a 190° C. bath temperature, <5 mm Hg, and 45 minutes at this condition.

The resins produced had the properties listed in Table 10.

TABLE 10

| Ex. | Brønsted Acid | % Acid | Clay | Yield | Softening Point (R&B) | Mn | Mw | Mz |
|---|---|---|---|---|---|---|---|---|
| 52 | HF | 1 wt % | F-22 | 83% | 108° C. | 796 | 1830 | 2730 |
| 53 | HF | 5 wt % | F-22 | 87% | 115° C. | 844 | 2040 | 3060 |
| 54 | HF | 1 wt % | F-20 | 84% | 113° C. | 845 | 1178 | 3782 |

TABLE 10-continued

| Ex. | Brønsted Acid | % Acid | Clay | Yield | Softening Point (R&B) | Mn | Mw | Mz |
|---|---|---|---|---|---|---|---|---|
| 55 | HF | 5 wt % | F-20 | 85% | 118° C. | 882 | 1861 | 3950 |
| 56 | H$_2$SO$_4$ | 1 wt % | F-22 | 84% | 113° C. | 824 | 1837 | 4352 |
| 57 | H$_2$SO$_4$ | 5 wt % | F-22 | 89% | 114° C. | 787 | 1776 | 4132 |
| 58 | H$_3$PO$_4$ | 1 wt % | F-22 | 96% | 91° C. | 611 | 1533 | 4473 |
| 59 | H$_3$PO$_4$ | 5 wt % | F-22 | 92% | 110° C. | 824 | 1788 | 5911 |

EXAMPLES 60–95

The following examples illustrate a range of resin properties available from the current invention using styrene and alpha-methyl styrene as the monomers and calcined acid-treated clay as the catalyst. When combined, the following examples define a half factorial designed experiment with five variables. The variables in these experiments include reaction temperature, catalyst loading, solvent level, alpha-methyl styrene:styrene ratio, and water level in the monomer feedstocks. Additional points are included to define curvature in each variable as well as replicate points to estimate experimental error. One skilled in the art can use the results from the following examples to generate a model equation for each measured response in terms of the variables studied. The responses studied in these examples include product yield, Ring and Ball softening point, and molecular weight distribution as defined by number average molecular weight (Mn), weight average molecular weight (Mw), Z average molecular weight (Mz), and polydispersity (PD) defined as Mw/Mn (PD).

A 500 milliliter three neck flask was equipped with an overhead stirrer, reflux condenser, gas inlet and outlet ports, thermometer, and a dropping addition funnel. The flask was charged with alpha-methyl styrene (reagent grade, Aldrich, Milwaukee, Wis.), styrene (reagent grade, Aldrich, Milwaukee, Wis.), and toluene (reagent grade, Aldrich, Milwaukee, Wis.) as outlined in the Table 11. The monomers and solvent were dried as follows: the monomers were dried by passing through a column of activated alumina (Fischer 8–16 mesh, 0.3 grams alumina to 1 milliliter monomer) immediately prior to use, the toluene was dried over 3 angstrom molecular sieves prior to use. Acid-treated clay, "F-22" (Engelhard Corporation, Iselin, N.J.), was treated at 200° C. at 2–5 mm Hg for 4–6 hours prior to use. The catalyst was transferred to the dropping addition funnel in a moisture free atmosphere of nitrogen. The reaction solution was cooled to 5 to 10° C. below the target reaction temperature prior to catalyst addition and the reaction was allowed to warm to the target reaction temperature as the catalyst was added. The acid-treated clay catalyst was added to the reaction from the dropping addition funnel at a rate to maintain the reaction at the target temperature while externally cooling the reaction flask with a −50° C. bath. Catalyst addition time was typically 15 minutes. The reaction solution was stirred at the reaction temperature for a total reaction time of 1 hour.

After catalyst filtration, the solvent was removed from the resin solution at 100° C. at 2–5 mm Hg. Also, the flask containing the resin oil was fitted with a distillation head with an adaptor for an inlet tube and a thermometer, and attached to a condenser and receiving flask. The resin oil was heated to 235° C. with a nitrogen purge followed by a steam purge at 235–245° C. to remove the light oil products. The steam purge was continued until less than 1 ml of resin was collected per 100 ml of steam condensate or until 1000 ml of steam condensate was collected. The steam purge was followed by a nitrogen purge at 235° C. to remove water from the remaining resin.

The reaction conditions for each example are outlined in Table 11. The level of each variable was coded as −1, 0, and 1 for low, middle, and high, respectively. Use of coded variable values facilitates generation of the model equations for each response. The coded value are included for each example.

TABLE 11

| Ex. | Catalyst Loading (wt %) | Reaction Temp. (° C.) | AMS:STY Ratio | Solvent Level (%) | H₂O Level (ppm) |
|---|---|---|---|---|---|
| 60 | 3.25 (0) | 25 (0) | 50:50 (0) | 50 (0) | 90 (0) |
| 61 | 6 (1) | 0 (−1) | 30:70 (−1) | 70 (1) | 150 (1) |
| 62 | 6 (1) | 0 (−1) | 30:70 (−1) | 30 (−1) | 30 (−1) |
| 63 | 6 (1) | 50 (1) | 70:30 (1) | 30 (−1) | 30 (−1) |
| 64 | 6 (1) | 50 (1) | 30:70 (−1) | 70 (1) | 30 (−1) |
| 65 | 3.25 (0) | 25 (0) | 50:50 (0) | 50 (0) | 90 (0) |
| 66 | 6 (1) | 50 (1) | 30:70 (−1) | 30 (−1) | 150 (1) |
| 67 | 6 (1) | 0 (−1) | 70:30 (1) | 70 (1) | 30 (−1) |
| 68 | 0.5 (−1) | 0 (−1) | 70:30 (1) | 30 (−1) | 30 (−1) |
| 69 | 0.5 (−1) | 0 (−1) | 70:30 (1) | 70 (1) | 150 (1) |
| 70 | 3.25 (0) | 25 (0) | 50:50 (0) | 50 (0) | 90 (0) |
| 71 | 0.5 (−1) | 0 (−1) | 30:70 (−1) | 70 (1) | 30 (−1) |
| 72 | 0.5 (−1) | 50 (1) | 70:30 (1) | 30 (−1) | 150 (1) |
| 73 | 0.5 (−1) | 50 (1) | 70:30 (1) | 70 (1) | 30 (−1) |
| 74 | 3.25 (0) | 25 (0) | 50:50 (0) | 50 (0) | 90 (0) |
| 75 | 6 (1) | 0 (−1) | 70:30 (1) | 30 (−1) | 150 (1) |
| 76 | 0.5 (−1) | 50 (1) | 30:70 (−1) | 30 (−1) | 30 (−1) |
| 77 | 6 (1) | 50 (1) | 70:30 (1) | 70 (1) | 150 (1) |
| 78 | 3.25 (0) | 25 (0) | 50:50 (0) | 50 (0) | 90 (0) |

The resin properties obtained for each example described in the Table 11 are marized in the Table 12.

TABLE 12

| Example | Yield (%) | Softening Point (R&B) | Molecular Weight | | | |
|---|---|---|---|---|---|---|
| | | | Mn | Mw | Mz | PD |
| 60 | 89 | 99° C. | 780 | 1150 | 1700 | 1.5 |
| 61 | 87 | 104° C. | 970 | 1580 | 2620 | 1.6 |
| 62 | 85 | 119° C. | 1320 | 2900 | 6100 | 2.2 |
| 63 | 68 | 70° C. | 530 | 670 | 860 | 1.3 |
| 64 | 82 | 82° C. | 720 | 1020 | 1460 | 1.4 |
| 65 | 86 | 96° C. | 760 | 1100 | 1620 | 1.5 |
| 66 | 89 | 91° C. | 790 | 1260 | 2170 | 1.6 |
| 67 | 88 | 108° C. | 760 | 1530 | 3940 | 2.0 |
| 68 | 59 | 140° C. | 1530 | 3350 | 6810 | 2.2 |
| 69 | 73 | 120° C. | 850 | 1530 | 3440 | 1.8 |
| 70 | 87 | 94° C. | 750 | 1130 | 1810 | 1.5 |
| 71 | 39 | 112° C. | 1010 | 1740 | 3680 | 2.1 |
| 72 | 49 | 60° C. | 510 | 610 | 1040 | 1.7 |
| 73 | 58 | 61° C. | 500 | 590 | 700 | 1.2 |
| 74 | 83 | 104° C. | 820 | 1230 | 1870 | 1.5 |
| 75 | 90 | 143° C. | 1280 | 3150 | 7710 | 2.5 |
| 76 | 61 | 95° C. | 870 | 1450 | 3200 | 1.7 |
| 77 | 69 | 59° C. | 470 | 570 | 710 | 1.2 |
| 78 | 91 | 97° C. | 770 | 1180 | 1830 | 1.5 |
| 79 | 71 | 81° C. | 700 | 970 | 1340 | 1.4 |
| 80 | 13 | 143° C. | 1580 | 2870 | 5570 | 1.8 |
| 81 | 21 | 130° C. | 1670 | 3190 | 5520 | 1.9 |
| 82 | 89 | 94° C. | 740 | 1120 | 1690 | 1.5 |
| 83 | 88 | 98° C. | 790 | 1190 | 1840 | 1.5 |
| 84 | 95 | 117° C. | 1060 | 2060 | 4340 | 1.9 |
| 85 | 89 | 98° C. | 790 | 1190 | 1790 | 1.5 |
| 86 | 85 | 86° C. | 690 | 980 | 1390 | 1.4 |
| 87 | 90 | 97° C. | 810 | 1250 | 1900 | 1.5 |
| 88 | 83 | 81° C. | 650 | 900 | 1230 | 1.4 |
| 89 | 39 | 100° C. | 750 | 1080 | 1520 | 1.4 |
| 90 | 90 | 95° C. | 760 | 1150 | 1720 | 1.5 |
| 91 | 90 | 101° C. | 850 | 1330 | 2060 | 1.6 |
| 92 | 83 | 86° C. | 610 | 830 | 1200 | 1.4 |
| 93 | 87 | 97° C. | 790 | 1160 | 1700 | 1.5 |
| 94 | 90 | 102° C. | 950 | 1600 | 2590 | 1.7 |
| 95 | 87 | 95° C. | 760 | 1120 | 1650 | 1.5 |

The data from Tables 11 and 12 was analyzed by regression analysis for each of the five responses (steam stiipped productyield, Ring and Ball softening point, Mw molecular weight, Mz molecular weight, and polydispersity). The process variables (reaction temperature (TMP), catalyst loading (CAT), solvent level (SOL), AMS:styrene ratio (A:S), and water level (H2O)) were coded to −1, 0, and 1 for the low, mid, and high levels respectively. The following regression models were obtained based on the coded variables. The proportion of the variation in the response data that is explained by the models ($R^2$(adj)) was 95–97% in all cases. This is considered to be high and an indication of a model with good predictive confidence.

Equation 1

$$\text{Resin Yield \%} = 87.7 + 15.9(\text{CAT}) + 2.63(\text{SOL}) - 6.19(\text{TMP})(\text{CAT}) - 9.14(\text{TMP})(\text{A}:\text{S}) - 4.14(\text{CAT})(\text{SOL}) - 5.16(\text{CAT})(\text{A}:\text{S}) + 4.67(\text{SOL})(\text{H2O}) - 20.6(\text{CAT})^2$$

Equation 2

$$\text{R\&B Softening Point} = 97.7 - 23.2(\text{TMP}) - 1.84(\text{CAT}) - 7.96(\text{SOL}) - 4.23(\text{A}:\text{S}) + 2.51(\text{TMP})(\text{CAT}) + 3.89(\text{TMP})(\text{SOL}) - 8.61(\text{TMP})(\text{A}:\text{S}) - 3.36(\text{TMP})(\text{H2O}) + 1.76(\text{CAT})(\text{A}:\text{S})$$

Equation 3

$$\text{Mw Molecular Weight} = 1164 - 714(\text{TMP}) - 403(\text{SOL}) - 152(\text{A}:\text{S}) + 327(\text{TMP})(\text{SOL}) - 159(\text{TMP})(\text{A}:\text{S}) + 94.3(\text{CAT})(\text{H2O}) + 443(\text{TMP})^2$$

Equation 4

$$\text{Mz Molecular Weight} = 1724 - 1737(\text{TMP}) - 889(\text{SOL}) - 124(\text{A}:\text{S}) - 137(\text{TMP})(\text{CAT}) + 576(\text{TMP})(\text{SOL}) - 564(\text{TMP})(\text{A}:\text{S}) + 252(\text{CAT})(\text{H2O}) + 259(\text{A}:\text{S})(\text{H2O}) + 1173(\text{TMP})^2 + 283(\text{A}:\text{S})^2$$

Equation 5

$$\text{Polydispersity (Mw/Mn)} = 1.49 - 0.293(\text{TMP}) - 0.138(\text{SOL}) - 0.0281(\text{H2O}) - 0.0549(\text{TMP})(\text{CAT}) - 0.0924(\text{TMP})(\text{A}:\text{S}) + 0.0704(\text{TMP})(\text{H2O}) - 0.0299(\text{CAT})(\text{SOL}) + 0.0298(\text{CAT})(\text{H2O}) - 0.0424(\text{SOL})(\text{A}:\text{S}) - 0.0625(\text{SOL})(\text{H2O}) + 0.106(\text{A}:\text{S})(\text{H2O}) + 0.173(\text{TMP})^2 + 0.0733(\text{A}:\text{S})^2$$

Figure 2:
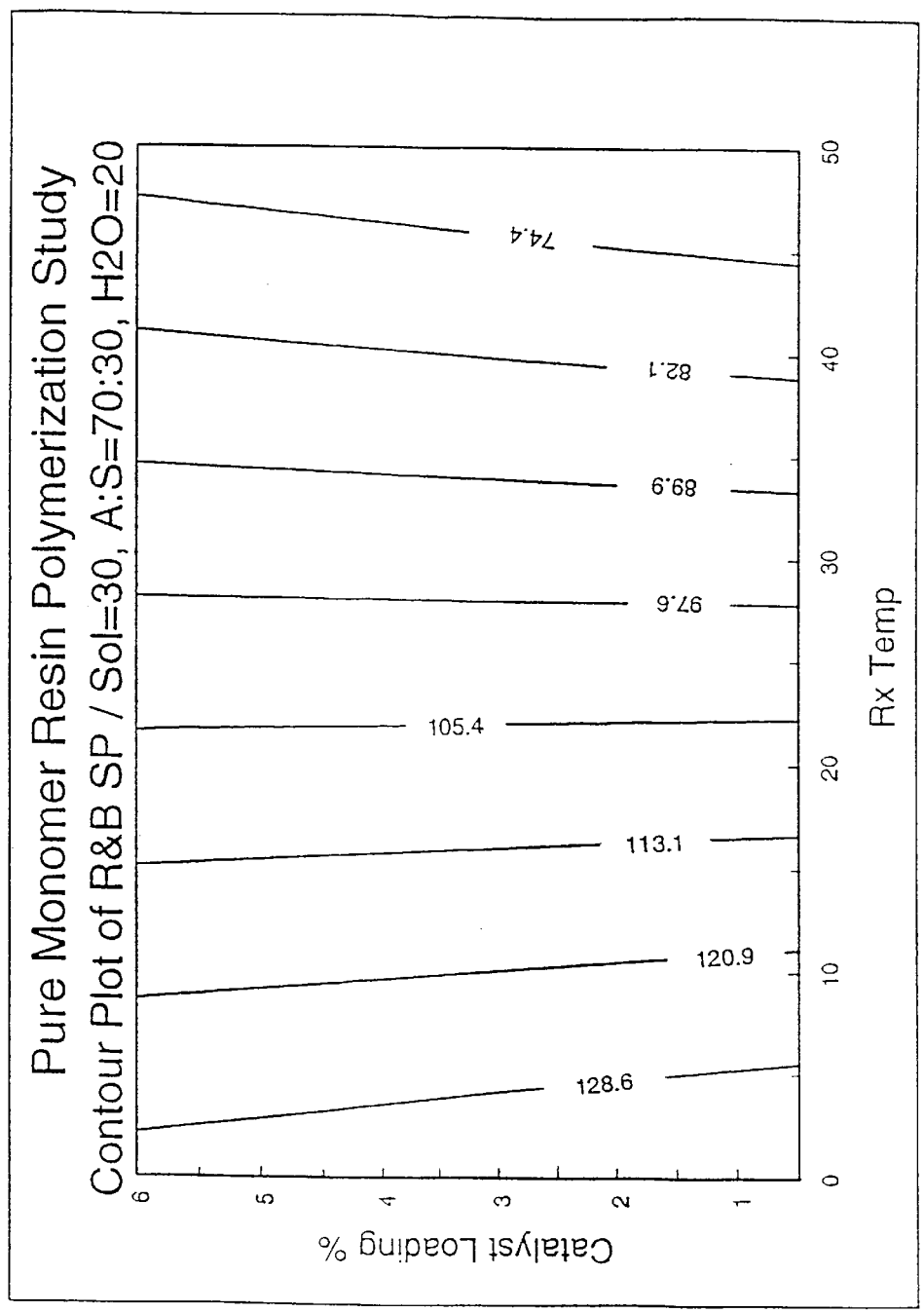
Figure 3:
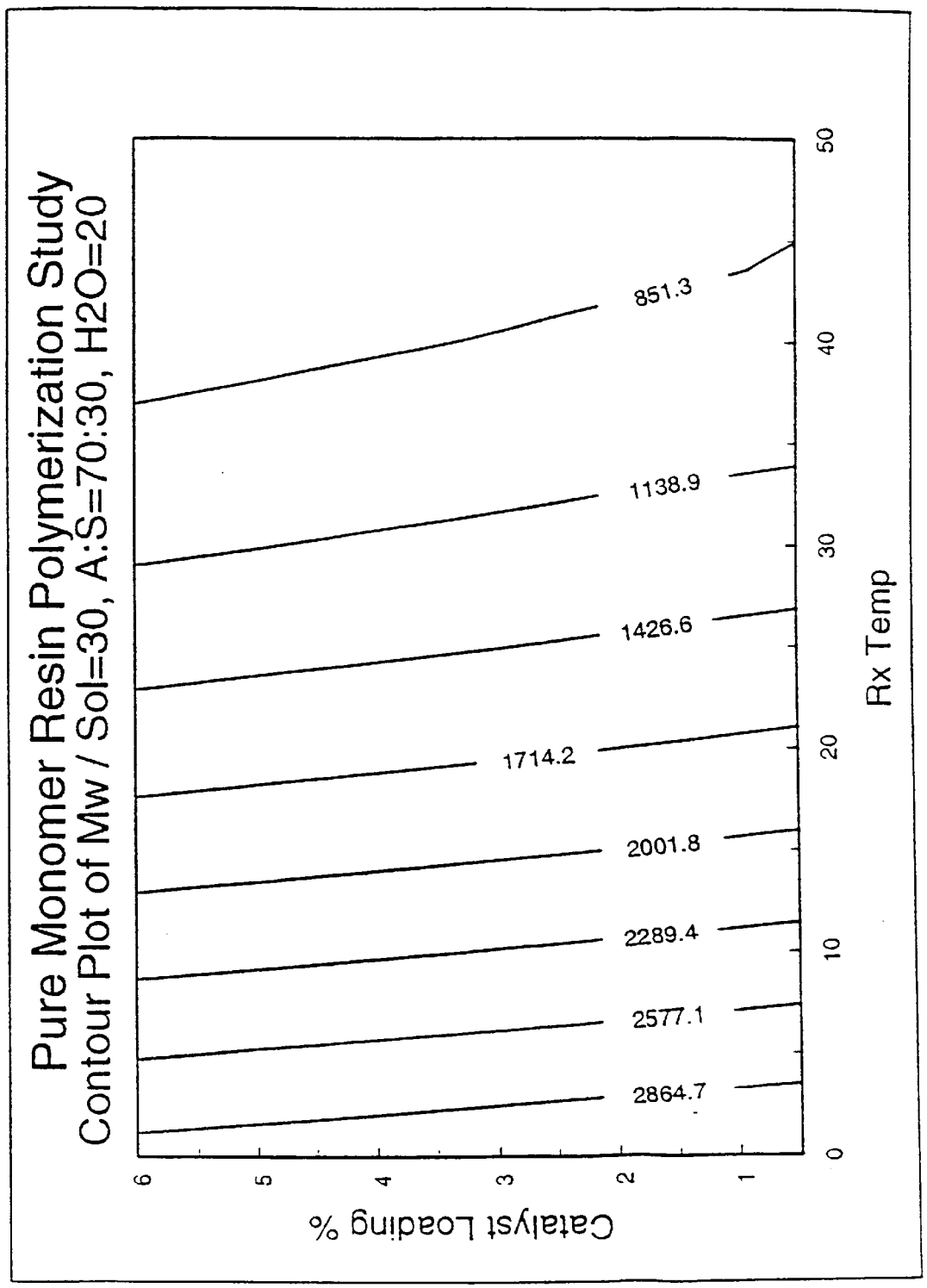
Figure 4:
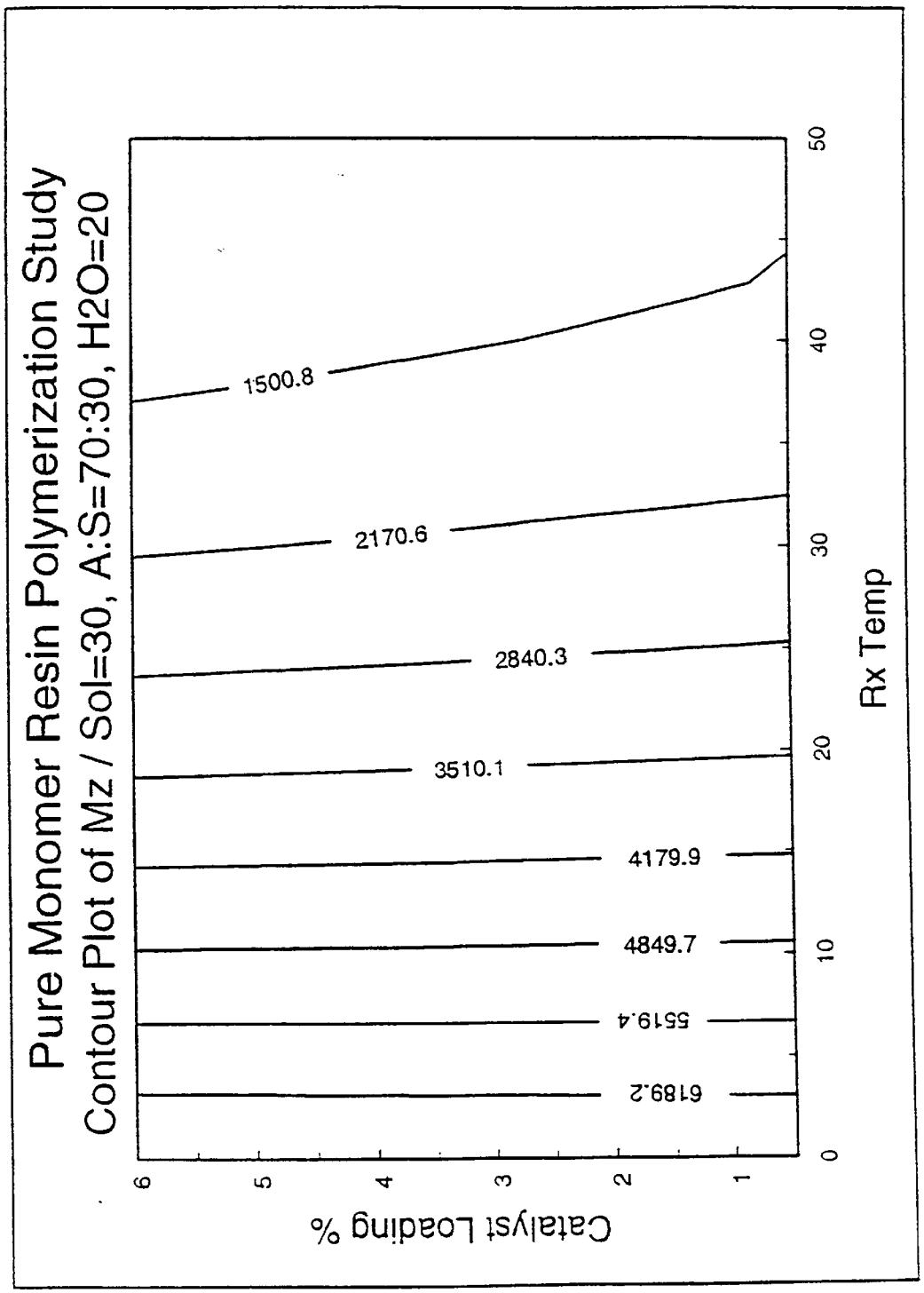

The regression equations listed above can be used to predict the properties of all resins which can be obtained for a set of reaction conditions where the control variables lie within the intervals tested. Contour plots can be generated to investigate the factor effects and make comparisons of resin properties predicted to be generated using various reaction conditions. Sample contour plots are shown in FIGS. 1–5 for each response versus catalyst loading and reaction temperature for a solvent level of 30%, an alpha-methyl styrene to styrene ratio of 70 to 30 by weight, and a water level of 20 ppm in the monomer feed. Contour plots can be generated from the regression equations for any response with respect to any combination of variables studied.

EXAMPLES 96–100

These examples illustrate the ability to predict pure monomer resin properties for a set of reaction conditions using the regression equations generated from the designed experiment described in Examples 60–95.

A 500 milliliter three neck flask was equipped with an overhead stirrer, reflux condenser, gas inlet and outlet ports, thermometer, and a dropping addition funnel. The flask was charged with alpha-methyl styrene (reagent grade, Aldrich, Milwaukee, Wis.), styrene (reagent grade, Aldrich, Milwaukee, Wis.), and toluene (reagent grade, Aldrich, Milwaukee, Wis.) as outlined in the Table 13. The monomers and solvent were dried as follows: the monomers were dried by passing through a column of activated alumina (Fischer 8–16 mesh, 0.3 grams alumina to 1 milliliter monomer) immediately prior to use, the toluene was dried over 3 angstrom molecular sieves prior to use. Acid-treated clay, "F-22" (Engelhard Corporation, Iselin, N.J.), was treated at 200° C. at 2–5 mm Hg for 4–6 hours prior to use. The catalyst was transferred to the dropping addition funnel in a moisture free atmosphere of nitrogen. The reaction solution was cooled to 5 to 10° C. below the target reaction temperature prior to catalyst addition and the reaction was allowed to warm to the target reaction temperature as the catalyst was added. The acid-treated clay catalyst was added to the reaction from the dropping addition funnel at a rate to maintain the reaction at the target temperature while externally cooling the reaction flask with a −50° C. bath. Catalyst addition time was typically 15 minutes. The reaction solution was stirred at the reaction temperature for a total reaction time of 1 hour.

After catalyst filtration, the solvent was removed from the resin solution at 100° C. at 2–5 mm Hg. Also, the flask containing the resin oil was fitted with a distillation head with an adaptor for an inlet tube and a thermometer, and attached to a condenser and receiving flask. The resin oil was heated to 235° C. with a nitrogen purge followed by a steam purge at 235–245° C. to remove light oil products. The steam purge was continued until less than 1 ml of resin was collected per 100 ml of steam condensate or until 1000 ml of steam condensate was collected. The steam purge was followed by a nitrogen purge at 235° C. to remove water from the remaining resin.

The reaction conditions for each example are outlined in Table 13.

TABLE 13

| Example | Catalyst Loading (wt %) | Reaction Temperature (° C.) | AMS:STY Ratio | Solvent Level (%) | H₂O Level (ppm) |
|---|---|---|---|---|---|
| 96 | 2.5 | 45 | 70:30 | 30 | 30 |
| 97 | 2.0 | 0 | 70:30 | 30 | 30 |
| 98 | 4.0 | 25 | 70:30 | 30 | 30 |
| 99 | 4.0 | 0 | 70:30 | 50 | 30 |
| 100 | 2.0 | 0 | 50:50 | 30 | 30 |

Each example was run in triplicate. The resin properties obtained for each example described in the Table 13 are sunmmarized in Table 14.

TABLE 14

| Example | Yield (%) | Softening Point (R&B) | Molecular Weight | | |
|---|---|---|---|---|---|
| | | | Mw | Mz | PD |
| 96 (Model) | 78 | 75° C. | 760 | 1020 | 1.36 |
| 96a | 76 | 71° C. | 700 | 910 | 1.28 |
| 96b | 73 | 70° C. | 680 | 880 | 1.27 |
| 96c | 78 | 77° C. | 750 | 990 | 1.30 |
| 97 (Model) | 86 | 135° C. | 3100 | 6550 | 2.20 |
| 97a | 71 | 135° C. | 2580 | 5430 | 2.12 |
| 97b | 88 | 130° C. | 2910 | 8680 | 2.40 |
| 97c | 90 | 135° C. | 3100 | 7450 | 2.40 |
| 98 (Model) | 92 | 101° C. | 1390 | 2490 | 1.60 |
| 98a | 87 | 101° C. | 1130 | 1930 | 1.54 |
| 98b | 84 | 99° C. | 1070 | 1830 | 1.53 |
| 98c | 83 | 104° C. | 1180 | 2170 | 1.58 |
| 99 (Model) | 100 | 121° C. | 2300 | 5110 | 2.12 |
| 99a | 91 | 116° C. | 2140 | 6420 | 2.48 |
| 99b | 90 | 129° C. | 2590 | 6890 | 2.46 |
| 99c | 93 | 127° C. | 2380 | 5880 | 2.24 |
| 100 (Model) | 74 | 131° C. | 3100 | 6150 | 2.10 |
| 100a | 75 | 132° C. | 3110 | 6310 | 2.10 |
| 100b | 77 | 136° C. | 3410 | 7410 | 2.26 |
| 100c | 79 | 136° C. | 3080 | 6350 | 2.10 |

Values for yield and Ring and Ball softening point for the replicate reactions fall within the interval where 95% of all future runs are predicted to lie. These examples illustrate the utility of the regression equations for predicting available resin properties within the defined range of variables used to generate the model.

EXAMPLE 101

This example compares the results of polymerization of a pure monomer feed by using calcined acid treated clay catalyst and calcined silica-alumina catalyst with the polymerization of a pure monomer feed by using $BF_3$, a traditional Lewis acid catalyst.

A 70:30 weight ratio of alpha-methyl styrene and styrene in toluene was reacted with 3 wt % calcined acid treated clay, "F-22" from Engelhard, at 0° C. over 3 hours. The solvent was removed from the resulting product under vacuum to yield 99% of a resin with a softening point of 130° C. and a molecular weight distribution of Mw-3210, Mn-1070, Mz-8010, and apolydispersity (PD) of 3.0. Steam distillation resulted in 87% of a product with a 142° C. softening point and a molecular weight distribution of Mw-3380, Mn-1430, Mz-7840, and a polydispersity (PD) of 2.4. A commercial product with a 50:50 weight ratio of alpha-methyl styrene and styrene catalyzed with $BF_3$ has a softening point of 140° C. and a molecular weight distribution of Mw-4800, Mn-1450, Mz-9590, and a polydispersity (PD) of 3.3.

EXAMPLE 102

This example involves polymerization of a pure monomer feed by using silica-alumina catalyst.

A 70:30 weight ratio of alpha-methyl styrene and styrene in toluene was reacted with 3 wt % activated silica-alumina, SAB-30 from UOP, at 0 ° C. over 3 hours. The solvent was removed from the resulting product under vacuum to yield 99% of a resin with a softening point of 84° C. and a molecular weight distribution of Mw-1760, Mn-610, Mz-4590 and a polydispersity (PD) of 2.9. The activity of silica-alumina for the preparation of pure monomer resins is not limited to SAB-30. Other silica-alumina samples with varying ratios of silicon to aluminum would be expected to show activity toward the polymerization of pure monomer relative to their acid strengths and number of acid sites.

EXAMPLES 103–106

These examples show the effect of acid-treated clay catalyst calcination on the activity for polymerization of piperylene concentrate, a C5 feed.

A 500 milliliter three neck flask was equipped with an overhead stirrer, reflux condenser, gas inlet and outlet ports, a thermometer and a dropping addition funnel. The flask was charged with 60 grams toluene (reagent grade, Aldrich, Milwaukee, Wis.) and an acid-treated clay catalyst, "F-22" (Engelhard Corporation, Iselin, N.J.), calcined as described in the Table 15. The catalyst slurry was heated to 50° C. Piperylene concentrate ("Naphtha Petroleum 3 Piperylenes" Lyondell Petrochemical Company, Houston, Tex.), 140 grams, was added to the nitrogen purged reaction flask via the dropping addition fimnnel over 15 minutes maintaining a 50° C. reaction temperature and stirring at 50° C. for a total reaction time of up to one hour. The monomers and solvent were dried over 4 angstrom molecular sieves prior to use.

After completion of the reaction time, the resin solution was vacuum filtered from the acid-treated clay catalyst at room temperature. The reaction flask and catalyst filter cake were rinsed with approximately 100 milliliters of toluene.

After catalyst filtration, the resin oil flask was fitted with a distillation head with an adaptor for an inlet tube and a thermometer, and attached to a condenser and receiving flask. The resin oil was heated to 235° C. with a nitrogen purge followed by a steam purge at 235–245° C. to remove light oil products. The steam purge was continued until less than 1 ml of resin was collected per 100 ml of steam condensate or until 1000 ml of steam condensate was collected. The steam purge was followed by a nitrogen purge at 235° C. to remove water from the remaining resin.

The resins produced had the properties listed in Table 15. Examples 104–106 are in accordance with the present invention, whereas Comparative Example 103 is for comparison purposes.

TABLE 15

| Example | Catalyst Preparation | Yield | Softening Point (R&B) | Molecular Weight | | |
|---|---|---|---|---|---|---|
| | | | | Mn | Mw | Mz |
| 103 | 10 wt %, As Received | 36% | oil | 980 | 1290 | 2220 |
| 104 | 10 wt %, 100° C./1 hr | 6% | 42° C. | 1430 | 2550 | 5980 |
| 105 | 14 wt %, 250° C./8 hr | 18% | — | 1340 | 2130 | 4300 |
| 106 | 14 wt %, 400° C./8 hr | 29% | 32° C. | 1210 | 1810 | 3590 |

These examples demonstrate the effect of the use of different catalyst calcination conditions on the yield as well as on the physical properties of the resultant resins. These examples demonstrate that controlling calcination conditions of the catalyst can be used to tailor the production of desired resin products.

EXAMPLES 107 and 108

These examples illustrate the effect of alternate monomer streams on the polymerization of piperylene, a C5 feed, with acid-treated clay catalysts.

Procedures are essentially the same as those outlined for Examples 103–106, except where noted. Example 107 was run using 68 grams of 90% piperylene (Technical grade, Aldrich, Milwaukee, Wis.) as the monomer feed and 100 grams of toluene solvent. The "F-22" acid-treated clay catalyst (Engelhard Corporation, Iselin, N.J.), calcined at 200° C. for 4 hours, was used at a 14.6 wt % loading based on monomer. The reaction product was collected by heating to 175° C. under a nitrogen purge. Example 108 was run using 68 grams of 90% piperylene (Technical grade, Aldrich, Milwaukee, Wis.) and 18 grams of 2-methyl-2-butene (99%, Aldrich, Milwaukee, Wis.) as the monomer feed and 75 grams of toluene solvent. The "F-22" acid-treated clay catalyst (Engelhard Corporation, Iselin, N.J.), calcined at 200° C. for 4 hours, was used at a 14.6 wt % loading based on monomer. The reaction product was collected using procedures outlined in Examples 103–106.

The resins produced had the properties listed in Table 16.

TABLE 16

| Example | Yield | Molecular Weight | | |
|---|---|---|---|---|
| | | Mn | Mw | Mz |
| 107 | 17% | 680 | 1890 | 8250 |
| 108 | 15% | 1430 | 2070 | 3600 |

EXAMPLES 109 and 110

The following examples illustrate the effect of an incremental catalyst addition method and reaction temperature on the polymerization of piperylene concentrate, a C5 feed, with acid-treated clay catalysts.

A 500 milliliter three neck flask was equipped with an overhead stirrer, reflux condenser, gas inlet and outlet ports, a thermometer, dropping addition funnel, and a dropping addition funnel. The flask was charged with 60 grams of toluene (reagent grade, Aldrich, Milwaukee, Wis.) and an acid-treated clay catalyst "F-13" (Engelhard Corporation, Iselin, N.J.) as described in the Table 17. The catalysts were calcined under vacuum ( 2–5 mm Hg). The catalyst charge was 14 wt % with half of the catalyst charged to the reaction flask prior to monomer addition, one quarter of the total catalyst charge was added after half of the monomer was added, and the remaining catalyst was added at the end of the monomer addition. The catalyst slurry in the reaction flask was heated to 50° C. Piperylene concentrate ("Naphtha Petroleum 3 Piperylenes" Lyondell Petrochemical Company, Houston, Tex.), 140 grams, was added to the nitrogen purged reaction flask via the dropping addition funnel over 15 minutes maintaining the reaction temperature at 50° C. and stirring at 50° C. for a total reaction time of three hours. Example 110 was heated to reflux during this 3 hour hold period. The monomers and solvent were dried over 4 angstrom molecular sieves prior to use.

After completion of the reaction time, the resin solutions were vacuum filtered from the acid-treated clay catalyst at room temperature. The reaction flask and catalyst filter cake were rinsed with approximately 100 milliliters of toluene.

After catalyst filtration, the resin oil flask was fitted with a distillation head with an adaptor for an inlet tube and a thermometer, and attached to a condenser and receiving flask. The resin oil was heated to 235° C. with a nitrogen purge followed by a steam purge at 235–245° C. to remove light oil products. The steam purge was continued until less than 1 ml of resin was collected per 100 ml of steam condensate or until 1000 ml of steam condensate was collected. The steam purge was followed by a nitrogen purge at 235° C. to remove water from the remaining resin.

The resins produced had the properties listed in Table 17.

TABLE 17

| Example | Catalyst | Yield | Softening Point (R&B) | Molecular Weight | | |
|---|---|---|---|---|---|---|
| | | | | Mn | Mw | Mz |
| 109 | F-13 200° C./2 hr | 8% | 45° C. | 1670 | 2610 | 4390 |
| 110 | F-13 200° C./4 hr | 10% | 44° C. | 1540 | 2480 | 4360 |

EXAMPLE 111

This example illustrates the effect of reverse addition of catalyst to monomer on the polymerization of piperylene concentrate, a C5 feed, with acid-treated clays.

A 500 milliliter three neck flask was equipped with an overhead stirrer, reflux condenser, gas inlet and outlet ports, thermometer, and a dropping addition funnel. The nitrogen purged flask was charged with 60 grams of toluene (reagent grade, Aldrich, Milwaukee, Wis.) and 140 grams of piperylene concentrate ("Naphtha Petroleum 3 Piperylenes" Lyondell Petrochemical Company, Houston, Tex.) via syringe. The monomers and solvent were dried over 4 angstrom molecular sieves prior to use. The catalyst, "F-13" acid-treated clay (Engelhard Corporation, Iselin, N.J.) was calcined at 200° C. under vacuum (2–5 mm Hg) for 4 hours and added under an atmosphere of nitrogen to a dropping addition funnel and connected to the reaction flask. The catalyst was added to the monomer solution at 50° C. over 20 minutes and the reaction held at 50° C. for an additional 3 hours.

After completion of the reaction time, the resin solution was vacuum filtered from the acid-treated clay catalyst at room temperature. The reaction flask and catalyst filter cake were rinsed with approximately 100 milliliters of toluene.

After catalyst filtration, the resin oil flask was fitted with a distillation head with an adaptor for an inlet tube and a thermometer, and attached to a condenser and receiving flask. The resin oil was heated to 235° C. with a nitrogen purge followed by a steam purge at 235–245° C. to remove light oil products. The steam purge was continued until less than 1 ml of resin was collected per 100 ml of steam condensate or until 1000 ml of steam condensate was collected. The steam purge was followed by a nitrogen purge at 235° C. to remove water from the remaining resin.

The resin produced had the following properties.

| | |
|---|---|
| Yield | 7% |
| Softening Point(R&B) | 41° C. |
| Molecular Weight | |
| Mn | 1890 |
| Mw | 3310 |
| Mz | 7240 |

EXAMPLE 112

This example illustrates the effect of two stage catalysis with acid-treated clay followed by aluminum trichloride for the polymerization of piperylene concentrate, a C5 feed.

A 500 milliliter three neck flask was equipped with an overhead stirrer, reflux condenser, gas inlet and outlet ports, a thermometer and a dropping addition fimnel. The flask was charged with 60 grams of toluene (reagent grade, Aldrich, Milwaukee, Wis.) and 7 wt % of the acid-treated clay catalyst "F-22" (Engelhard Corporation, Iselin, N.J.) which had been calcined at 200° C. under vacuum (2–5 mm Hg) for 6 hours. The catalyst slurry was heated to 50° C. Piperylene concentrate ("Naphtha Petroleum 3 Piperylenes" Lyondell Petrochemical Company, Houston, Tex.), 140 grams, was added to the nitrogen purged reaction flask via the dropping addition funnel over 15 minutes maintaining the 50° C. reaction temperature and stirring at 50° C. for one hour. The monomers and solvent were dried over 4 angstrom molecular sieves prior to use.

After completion of the reaction time, the resin solution was filtered from the acid-treated clay catalyst under an atmosphere of nitrogen and recharged over 15 minutes to a reaction flask containing 60 grams of toluene and 1.1 wt % aluminum chloride based on total monomer feed maintaining a 50° C. reaction temperature. The reaction solution was stirred at 50° C. for an additional 45 minutes. The reaction solution was quenched using 4 milliliters of 28% ammonium hydroxide in 100 milliliters water. The resin solution was vacuum filtered from the salts. The reaction flask and catalyst filter cake were rinsed with approximately 100 milliliters of toluene.

After catalyst filtration, the resin oil flask was fitted with a distillation head with an adaptor for an inlet tube and a thermometer, and attached to a condenser and receiving flask. The resin oil was heated to 235° C. with a nitrogen purge followed by a steam purge at 235–245° C. to remove light oil products. The steam purge was continued until less than 1 ml of resin was collected per 100 ml of steam condensate or until 1000 ml of steam condensate was collected. The steam purge was followed by a nitrogen purge at 235° C. to remove water from the remaining resin.

The resin produced had the following properties.

| | |
|---|---|
| Yield | 57% |
| Softening Point(R&B) | 56° C. |
| Molecular Weight | |
| Mn | 1300 |
| Mw | 2040 |
| Mz | 3590 |

EXAMPLES 113–121

These examples illustrate the effect of catalyst loading, reaction temperature, solvent, and solvent level on the acid-treated clay catalyzed polymerization of piperylene concentrate, a C5 feed.

A 500 milliliter three neck flask was equipped with an overhead stirrer, reflux condenser, gas inlet and outlet ports, a thermometer and a dropping addition funnel. The flask was charged with 60 grams of solvent, either toluene ("tol") or methylcyclohexane ("mch") (both reagent grade, Aldrich, Milwaukee, Wis.) and an acid-treated clay catalyst, "F-22" (Engelhard Corporation, Iselin, N.J.), calcined at 200° C. under vacuum (2–5 mm Hg) for 4 hours. The catalyst slurry was heated to the desired reaction temperature. Piperylene concentrate ("Naphtha Petroleum 3 Piperylenes" Lyondell Petrochemical Company, Houston, Tex.), 140 grams, was added to the nitrogen purged reaction flask via the dropping addition funnel over 15 minutes maintaining the desired reaction temperature with cooling or heating as needed. The reaction solution was stirred at temperature for one hour after monomer addition was complete. The monomers and solvent were dried over 4 angstrom molecular sieves prior to use.

After completion of the reaction time, the resin solution was vacuum filtered from reated clay catalyst at room temperature. The reaction flask and catalyst filter cake ed with approximately 100 milliliters of toluene.

After catalyst filtration, volatile components and solvents were removed on a rotary evaporator 50° C., 5 mm Hg. Also, if sufficient product remained, the resin oil flask was fitted with a distillation head with an adaptor for an inlet tube and a thermometer, and attached to a condenser and receiving flask. The resin oil was heated to 235° C. with a nitrogen purge followed by a steam purge at 235–245° C. to remove light oil products. The steam purge was continued until less than 1 ml of resin was collected per 100 ml of steam condensate or until 1000 ml of steam condensate was collected. The steam purge was followed by a nitrogen purge at 235° C. to remove water from the remaining resin.

The resins produced had the properties listed in Table 18.

Netherlands) and "Dow Resin Oil 60-L" (Dow Chemical Company Terneuzen, The Netherlands), was added to the dropping addition funnel. The monomers and solvent were dried as follows: the C9 monomer feed was dried by storing a solution over activated alumina (Fischer 8–16 mesh) for several hours prior to use to reduce the water content to approximately 190 ppm, the toluene was dried over 3 angstrom molecular sieves. The reaction solution was heated to a 50° C. reaction temperature. The monomer solution was added to the reaction flask from the dropping addition funnel at a rate to maintain the desired reaction temperature with external cooling. Monomer addition time was approximately 15 minutes. The reaction solution was stirred at the desired reaction temperature for a total reaction time of 2 hours.

After completion of the reaction time, the resin solution was vacuum filtered from the acid-treated clay catalyst at room temperature. The reaction flask and catalyst filter cake were rinsed with approximately 100 milliliters of toluene.

TABLE 18

| Ex. | Catalyst Loading | Reaction Temp. | Solvent Level - tol:mch | Yield | Softening Point (R&B) | Molecular Weight | | |
|---|---|---|---|---|---|---|---|---|
| | | | | | | Mn | Mw | Mz |
| 113 | 12.5 wt % | 30° C. | 50%-50:50 | 11% | 43° C. | 1640 | 2910 | 6210 |
| 114 | 5 wt % | 10° C. | 30%-0:100 | 2%[1] | — | 210 | 2510 | 9130 |
| 115 | 5 wt % | 50° C. | 70%-0:100 | 3%[1] | — | 570 | 1820 | 6600 |
| 116 | 5 wt % | 50° C. | 30%-100:0 | 2% | — | 1630 | 2610 | 5280 |
| 117 | 5 wt % | 10° C. | 70%-100:0 | 10%[1] | — | 650 | 1660 | 3750 |
| 118 | 20 wt % | 10° C. | 70%-0:100 | 6%[1] | — | 780 | 2650 | 7910 |
| 119 | 20 wt % | 50° C. | 30%-0:100 | 6% | 52° C. | 1680 | 3140 | 7380 |
| 120 | 20 wt % | 50° C. | 70%-100:0 | 32% | 39° C. | 1050 | 1510 | 2560 |
| 121 | 20 wt % | 10° C. | 30%-100:0 | 26% | 40° C. | 1560 | 2620 | 4750 |

[1]Samples were not steam stripped.

EXAMPLES 122–127

These examples illustrate the addition of monomer to a slurry of the catalyst in solvent and the effect of catalyst loading on the resulting softening point and molecular weight of C9 hydrocarbon resins prepared with acid-treated clay catalysts. Resin properties can be controlled through the use of alternate reaction conditions.

A 500 milliliter three neck flask was equipped with an overhead stirrer, reflux condenser, gas inlet and outlet ports, thermometer, and a dropping addition funnel. The flask was charged with 50 grams of toluene (reagent grade, Aldrich, Milwaukee, Wis.) and the desired level of acid-treated clay catalyst, "F-22" (Engelhard Corporation, Iselin, N.J.). The clay was treated at 200° C. at 2–5 mm Hg for 4–6 hours prior to use. The C9 monomer feed, 100 grams of either "LRO-90" (Lyondell Petrochemicals, Houston, Tex.) or a 1:1 mixture of "DSM C9 Resinfeed Classic" (DSM Geleen, The The solvent was removed from the resin solution at 100° C. at 2–5 mm Hg.

After catalyst filtration, the resin oil flask was fitted with a distillation head with an adaptor for an inlet tube and a thermometer, and attached to a condenser with a receiving flask. The resin oil was heated to 235° C. with a nitrogen purge followed by a steam purge at 235–245° C. to remove light oil products. The steam purge was continued until less than 1 ml of resin was collected per 100 ml of steam condensate or until 1000 ml of steam condensate was collected. The steam purge was followed by a nitrogen purge at 235° C. to remove water from the remaining resin.

The resins produced had the properties in Table 19.

TABLE 19

| Ex. | Monomer | Catalyst Loading | Yield | Softening Point (R&B) | Molecular Weight | | | |
|---|---|---|---|---|---|---|---|---|
| | | | | | Mn | Mw | Mz | PD |
| 122 | LRO-90 | 10 wt % | 31% | 132° C. | 760 | 1060 | 1540 | 1.40 |
| 123 | LRO-90 | 15 wt % | 39% | 122° C. | 670 | 930 | 1300 | 1.38 |
| 124 | LRO-90 | 20 wt % | 41% | 115° C. | 610 | 810 | 1110 | 1.33 |
| 125 | DSM/RO60 | 10 wt % | 28% | 129° C. | 750 | 1040 | 1500 | 1.40 |
| 126 | DSM/RO60 | 15 wt % | 42% | 123° C. | 650 | 910 | 1310 | 1.40 |
| 127 | DSM/RO60 | 20 wt % | 44% | 121° C. | 650 | 880 | 1240 | 1.37 |

EXAMPLES 128–133

These examples illustrate the addition of the monomer to a slurry of the catalyst in solvent and the effect of catalyst loading on the resulting softening point and molecular weight of C9 hydrocatbon resins prepared with an amorphous silica-alumina catalyst. Resin properties can be controlled through the use of alternate reaction conditions.

A 500 milliliter three neck flask was equipped with an overhead stirrer, reflux condenser, gas inlet and outlet ports, thermometer, and a dropping addition fimnel. The flask was charged with 50 grams of toluene (reagent grade, Aldrich, Milwaukee, Wis.) and the desired level of ground amorphous silica-alumina catalyst, "SAB-30" (UOP, DesPlaines, Ill.).

The silica-alumina was treated at 400° C. at 2–5 mm Hg for 4–6 hours prior to use. The C9 monomer feed, 100 grams of either "LRO-90" (Lyondell Petrochemicals, Houston, Tex.) or a 1:1 mixture of "DSM C9 Resinfeed Classic" (DSM Geleen, The Netherlands) and "Dow Resin Oil 60-L" (Dow Chemical Company Temeuzen, The Netherlands), was added to the dropping addition funnel. The monomers and solvent were dried as follows: the C9 monomer feed was dried by storing a solution over activated alumina (Filcher 8–16 mesh) for several hours prior to use to reduce the water content to approximately 190 ppm, the toluene was dried over 3 angstrom molecular sieves prior to use. The reaction solution was heated to a 50° C. reaction temperature. The monomer solution was added to the reaction flask from the dropping addition funnel at a rate to maintain the desired reaction temperature with external cooling. Monomer addition time was approximately 15 minutes. The reaction solution was stirred at the desired reaction temperature for a total reaction time of 2 hours.

After completion of the reaction time, the resin solution was vacuum filtered from the acid-treated clay catalyst at room temperature. The reaction flask and catalyst filter cake were rinsed with approximately 100 milliliters of toluene.

After catalyst filtration, the solvent was removed from the resin solution at 100° C. at 2–5 mm Hg. Light oils were removed from the resin products by steam distillation as follows: a single neck flask containing the resin was fitted with a distillation head with an adaptor for an inlet tube and a thermometer and attached to a condenser with a receiving flask. The resin oil was heated to 235° C. with a nitrogen purge followed by a steam purge at 235–245° C. to remove light oil products. The steam purge was continued until less than 1 ml of resin was collected per 100 ml of steam condensate or until 1000 ml of steam condensate was collected. The steam purge was followed by a nitrogen purge at 235° C. to remove water from the remaining resin.

The resins produced had the properties listed in Table 20.

TABLE 20

| Ex. | Monomer | Catalyst Loading | Yield | Softening Point (R&B) | Molecular Weight | | | |
|---|---|---|---|---|---|---|---|---|
| | | | | | Mn | Mw | Mz | PD |
| 128 | LRO-90 | 10 wt % | 33% | 126° C. | 700 | 1000 | 1500 | 1.42 |
| 129 | LRO-90 | 15 wt % | 38% | 124° C. | 680 | 950 | 1360 | 1.40 |
| 130 | LRO-90 | 20 wt % | 31% | 121° C. | 640 | 880 | 1220 | 1.36 |
| 131 | DSM/RO60 | 10 wt % | 40% | 128° C. | 710 | 1020 | 1500 | 1.43 |
| 132 | DSM/RO60 | 15 wt % | 44% | 122° C. | 660 | 970 | 1430 | 1.46 |
| 133 | DSM/RO60 | 20 wt % | 41% | 121° C. | 650 | 900 | 1280 | 1.40 |

EXAMPLES 134–137

These examples illustrate the reuse of solid acid catalysts for the polymerization of C9 monomer feed streams to prepare hydrocarbon resins.

Catalysts used in Examples 124, 127, 130, and 133 were recovered at the end of each reaction. The catalysts were placed in a soxlet extraction unit and residual resin was extracted from the solid catalysts with toluene for approximately 7 hours. Toluene was allowed to evaporate from the solid catalysts which were then dried under vacuum for 24 hours. The catalysts were then calcined at 120° C. for approximately 7 hours prior to use.

Fifteen weight percent of each recovered and regenerated solid acid catalyst was used as the catalyst charge for the reuse experiments. The C9 monomer feed was "LRO-90" (Lyondell Petrochemicals, Houston, Tex.) or a 1:1 mixture of "DSM C9 Resinfeed Classic" (DSM, Geleen, The Netherlands) and Dow "Resin Oil 60-L" (Dow, Terneuzen, The Netherlands). The reaction apparatus and procedures were essentially the same as those outlined in Examples 122–133, except where noted.

The resins produced from the regenerated catalysts have the properties listed in Table 21.

TABLE 21

| Ex. | Monomer | Catalyst | Yield | Softening Point (R&B) | Molecular Weight | | | |
|---|---|---|---|---|---|---|---|---|
| | | | | | Mn | Mw | Mz | PD |
| 134 | LRO-90 | F-22 | 36% | 132° C. | 750 | 1100 | 1700 | 1.5 |
| 135 | LRO-90 | SAB-30 | 30% | 118° C. | 650 | 900 | 1310 | 1.4 |
| 136 | DSM/RO60 | F-22 | 43% | 125° C. | 670 | 990 | 1480 | 1.5 |
| 137 | DSM/RO60 | SAB-30 | 33% | 127° C. | 700 | 970 | 1390 | 1.4 |

COMPARATIVE EXAMPLES 138 and 139

These comparative examples illustrate the effect of using acid-treated clay or amorphous silica-alumina without calcination as a solid acid catalyst for the preparation of hydrocarbon resins from C9 unsaturated aromatic hydrocarbon feed stocks.

Fifteen weight percent of catalyst, either "F-22" (Engelhard Corporation, Iselin, N.J.) or "SAB-30" (UOP, DesPlaines, Ill.), was used. Both catalysts were used as received with no treatment to reduce freely-associated water prior to the reaction. The C9 monomer feed used was "LRO-90" from Lyondell Petrochemicals, Houston, Tex. The reaction apparatus and procedures were essentially the same as those outlined in Examples 122–133, except where noted.

The resins prepared using thesecatalysts are summarized in Table 22.

TABLE 22

| Comparative Example | Catalyst | Yield | Softening Point (R&B) | Molecular Weight | | | |
|---|---|---|---|---|---|---|---|
| | | | | Mn | Mw | Mz | PD |
| 138 | F-22 | 33% | 128° C. | 760 | 1010 | 1390 | 1.3 |
| 139 | SAB-30 | 4% | Oil | 130 | 450 | 3900 | 3.4 |

EXAMPLES 140–147

These examples illustrate the use of a variety of acid-treated clays as solid acid catalysts for the preparation of hydrocarbon resins from C9 unsaturated aromatic hydrocarbon feed stocks.

A 500 milliliter three neck flask was equipped with an overhead stirrer, reflux condenser, gas inlet and outlet ports, thermometer, and a dropping addition funnel. The flask was charged with 50 grams of toluene (reagent grade, Aldrich, Milwaukee, Wis.) and 12.5 wt % of clay catalyst, "F-22", "F-105", and "F-20X" (Engelhard Corporation, Iselin, N.J.) or "K10", "KSF", "KS", "KO", or "KSF/O" (Sud Chemie/United Catalyst Inc., Louisville, Ky.). The clay was treated at 200° C. at 2–5 mm Hg for 4–6 hours prior to use. The C9 monomer feed, 100 grams of "LRO-90" (from Lyondell Petrochemicals, Houston, Tex.) was added to the dropping additional funnel. The monomers and solvent were dried as follows: the C9 monomer feed was dried by passing through a column of activated alumina (Filcher 8–16 mesh, 0.3 grams of alumina to 1 milliliter of monomer) immediately prior to use, the toluene was dried over 3 angstrom molecular sieves prior to use. The reaction solution was heated to a 60° C. reaction temperature. The monomer solution was added to the reaction flask from the dropping addition funnel at a rate to maintain the desired reaction temperature with external cooling. Monomer addition time was approximately 15 minutes. The reaction solution was stirred at the desired reaction temperature for a total reaction time of 2 hours.

After completion of the reaction time, the resin solution was vacuum filtered from the acid-treated clay catalyst at room temperature. The reaction flask and catalyst filter cake were rinsed with approximately 100 milliliters of toluene.

After catalyst filtration, the solvent was removed from the resin solution at 100° C. at 2–5 mm Hg. Light oils were removed from the resin products by steam distillation as follows: a single neck flask containing the resin was fitted with a distillation head with an adaptor for an inlet tube and a thermometer and attached to a condenser with a receiving flask. The resin oil was heated to 235° C. with a nitrogen purge followed by a steam purge at 235–245° C. to remove light oil products. The steam purge was continued until less than 1 ml of resin was collected per 100 ml of steam condensate or until 1000 ml of steam condensate was collected. The steam purge was followed by a nitrogen purge at 235° C. to ater from the remaining resin.

The resins produced had the properties listed in Table 23.

TABLE 23

| Example | Catalyst | Yield | Softening Point (R&B) | Molecular Weight | | | |
|---|---|---|---|---|---|---|---|
| | | | | Mn | Mw | Mz | PD |
| 140 | F-22 | 33% | 123° C. | 690 | 940 | 1340 | 1.4 |
| 141 | K 10 | 15% | 117° C. | 650 | 920 | 1390 | 1.4 |
| 142 | KSF | none | — | — | — | — | — |
| 143 | KS | 28% | 120° C. | 670 | 920 | 1340 | 1.4 |
| 144 | KO | 23% | 112° C. | 680 | 1100 | 4210 | 1.6 |
| 145 | KSF/O | 9% | 121° C. | 670 | 890 | 1280 | 1.3 |
| 146 | F-105 | 27% | 129° C. | 760 | 1130 | 1750 | 1.5 |
| 147 | F-20X | 44% | 116° C. | 630 | 1170 | 2740 | 1.8 |

EXAMPLES 148–161

The following examples illustrate a range of resin properties available from the current invention using a C9 unsaturated aromatic hydrocarbon feed stock as the monomer and dried amorphous silica-alumina or acid-treated clay as the catalyst. When combined, the following examples define a 3×3 factorial designed experiment for a reaction where monomer is added to a catalyst slurry in solvent. The variables in these experiments include reaction temperature and catalyst loading with the amorphous silica-alumina catalyst. Additional center points have been included using the acid-treated clay catalyst for comparison. Replicate center points were run to estimate experimental error. One skilled in the art can use the results from the following examples to generate a model equation for each measured response in terms of the variables studied. The responses studied in these examples include product yield, Ring and Ball softening point, and molecular weight distribution as defined by weight average molecular weight (Mw), Z average molecular weight (Mz), and polydispersity defined as Mw/Mn (PD).

A 500 milliliter three neck flask was equipped with an overhead stirrer, reflux condenser, gas inlet and outlet ports, thermometer, and a dropping addition funnel. The flask was charged with 50 grams of toluene (reagent grade, Aldrich, Milwaukee, Wis.) and the desired level of amorphous silica-alumina catalyst "SAB-30" (UOP, DesPlaines, Ill.) which was ground and passed through a 100 mesh sieve, or acid-treated clay catalyst, "F-22" (Engelhard Corporation, Iselin, N.J.). The silica-alumina was treated at 400° C. at 2–5 mm Hg for 4–6 hours prior to use. The clay was treated at 200° C. at 2–5 mm Hg for 4–6 hours prior to use. The C9 monomer feed, 100 grams of "LRO-90" (Lyondell Petrochemicals, Houston, Tex.) was added to the dropping addition funnel. The monomers and solvent were dried as follows: the C9 monomer feed was dried by passing through a column of activated alumina (Fischer 8–16 mesh, 0.3 grams of alumina to 1 milliliter of monomer) immediately prior to use, the toluene was dried over 3 angstrom molecular sieves prior to use. The reaction solution was heated to the desired reaction temperature. The monomer solution was added to the reaction flask from the dropping addition funnel at a rate to maintain the desired reaction temperature with external cooling. Monomer additional time was approximately 15 minutes. The reaction solution was stirred at the desired reaction temperature for a total reaction time of 2 hours.

After completion of the reaction time, the resin solution was vacuum filtered from the solid catalyst at room temperature. The reaction flask and catalyst filter cake were rinsed with approximately 100 milliliters of toluene.

After catalyst filtration, the solvent was removed from the resin solution at 100° C. at 2–5 mm Hg. Light oils were removed from the resin products by steam distillation as follows: a single neck flask containing the resin was fitted with a distillation head with an adaptor for an inlet tube and a thermometer, and attached to a condenser with a receiving flask. The resin oil was heated to 235° C. with a nitrogen purge followed by a steam purge at 235–245° C. to remove light oil products. The steam purge was continued until less than 1 ml of resin was collected per 100 ml of steam condensate or until 1000 ml of steam condensate was collected. The steam purge was followed by a nitrogen purge at 235° C. to remove water from the remaining resin.

The reaction conditions for each example are outlined in Table 24. The level of each variable was coded as −1, 0, and 1 for low, middle, and high, respectively. Use of coded variable values facilitates generation of the model equations for each response. The coded values are included for each example.

TABLE 24

| Example | Catalyst | Catalyst Loading (wt %) | Reaction Temperature (° C.) |
|---|---|---|---|
| 148 | SAB-30 | 12.5 (0) | 60 (0) |
| 149 | F-22 | 12.5 (0) | 60 (0) |
| 150 | SAB-30 | 5 (−1) | 100 (1) |
| 151 | SAB-30 | 20 (1) | 60 (0) |
| 152 | SAB-30 | 5 (−1) | 20 (−1) |
| 153 | SAB-30 | 12.5 (0) | 100 (1) |
| 154 | SAB-30 | 12.5 (0) | 60 (0) |
| 155 | F-22 | 12.5 (0) | 60 (0) |
| 156 | SAB-30 | 20 (1) | 100 (1) |
| 157 | SAB-30 | 12.5 (0) | 20 (−1) |
| 158 | SAB-30 | 5 (−1) | 60 (0) |
| 159 | SAB-30 | 20 (1) | 20 (−1) |
| 160 | SAB-30 | 12.5 (0) | 60 (1) |
| 161 | F-22 | 12.5 (0) | 60 (1) |

The resin properties obtained for each example described in the Table 24 are summarized in Table 25.

TABLE 25

| Example | Yield (%) | Softening Point (R&B) | Molecular Weight | | | |
|---|---|---|---|---|---|---|
| | | | Mn | Mw | Mz | PD |
| 148 | 34 | 119° C. | 640 | 890 | 1290 | 1.4 |
| 149 | 38 | 104° C. | 680 | 950 | 1480 | 1.4 |
| 150 | 24 | 123° C. | 530 | 720 | 1400 | 1.4 |
| 151 | 31 | 100° C. | 540 | 720 | 1060 | 1.3 |
| 152 | 16 | 148° C. | 960 | 1530 | 2650 | 1.6 |
| 153 | 22 | 99° C. | 490 | 600 | 750 | 1.2 |
| 154 | 33 | 115° C. | 610 | 830 | 1180 | 1.4 |
| 155 | 32 | 116° C. | 620 | 870 | 1340 | 1.4 |
| 156 | 23 | 86° C. | 430 | 530 | 930 | 1.2 |
| 157 | 33 | 139° C. | 840 | 1250 | 2020 | 1.5 |
| 158 | 11 | 129° C. | 750 | 1030 | 1730 | 1.4 |
| 159 | 42 | 130° C. | 750 | 1070 | 1600 | 1.4 |
| 160 | 32 | 116° C. | 610 | 840 | 1270 | 1.4 |
| 161 | 34 | 122° C. | 670 | 940 | 1450 | 1.4 |

The data from Tables 24 and 25 was analyzed by regression analysis for each of the five responses (steam stripped product yield, Ring and Ball softening point, Mw molecular weight, Mz molecular weight, and polydispersity (Mw/Mn)). The process variables (reaction temperature (TMP) and catalyst loading (CAT)) were coded to −1, 0, and 1 for the low, mid, and high levels respectively. The following regression models were obtained based on the coded variables.

Equation 6

$$\text{Resin Yield \%} = 29.7 + 7.88(\text{CAT}) - 3.5(\text{TMP}) - 5.54(\text{CAT})^2 - 6.52(\text{CAT})(\text{TMP})$$

$$s = 4.24 \quad R^2(\text{adj}) = 76\%$$

Equation 7

$$\text{R \& B Softening Point} = 119 - 13.1(\text{CAT}) - 18.2(\text{TMP}) - 4.75(\text{CAT})(\text{TMP})$$

$$s = 4.145 \quad R^2(\text{adj}) = 94.4\%$$

Equation 8

$$\text{Mw Molecular Weight} = 853 - 156(\text{CAT}) - 333(\text{TMP}) + 36.3(\text{CAT})^2 + 73(\text{TMP})^2 + 67.5(\text{CAT})(\text{TMP})$$

$$s = 24.39 \quad R^2(\text{adj}) = 99.3\%$$

Equation 9

$$\text{Mz Molecular Weight} = 1207 - 363(\text{CAT}) - 532(\text{TMP}) + 212(\text{CAT})^2 + 209(\text{TMP})^2 + 145(\text{CAT})(\text{TMP})$$

$$s = 88.15 \quad R^2(\text{adj}) = 97\%$$

Equation 10

$$\text{Polydispersity (Mw/Mn)} = 1.38 - 0.0523(\text{CAT}) - 0.117(\text{TMP})$$

$$s = 0.362 \quad R^2(\text{adj}) = 87.2\%$$

Figure 6:
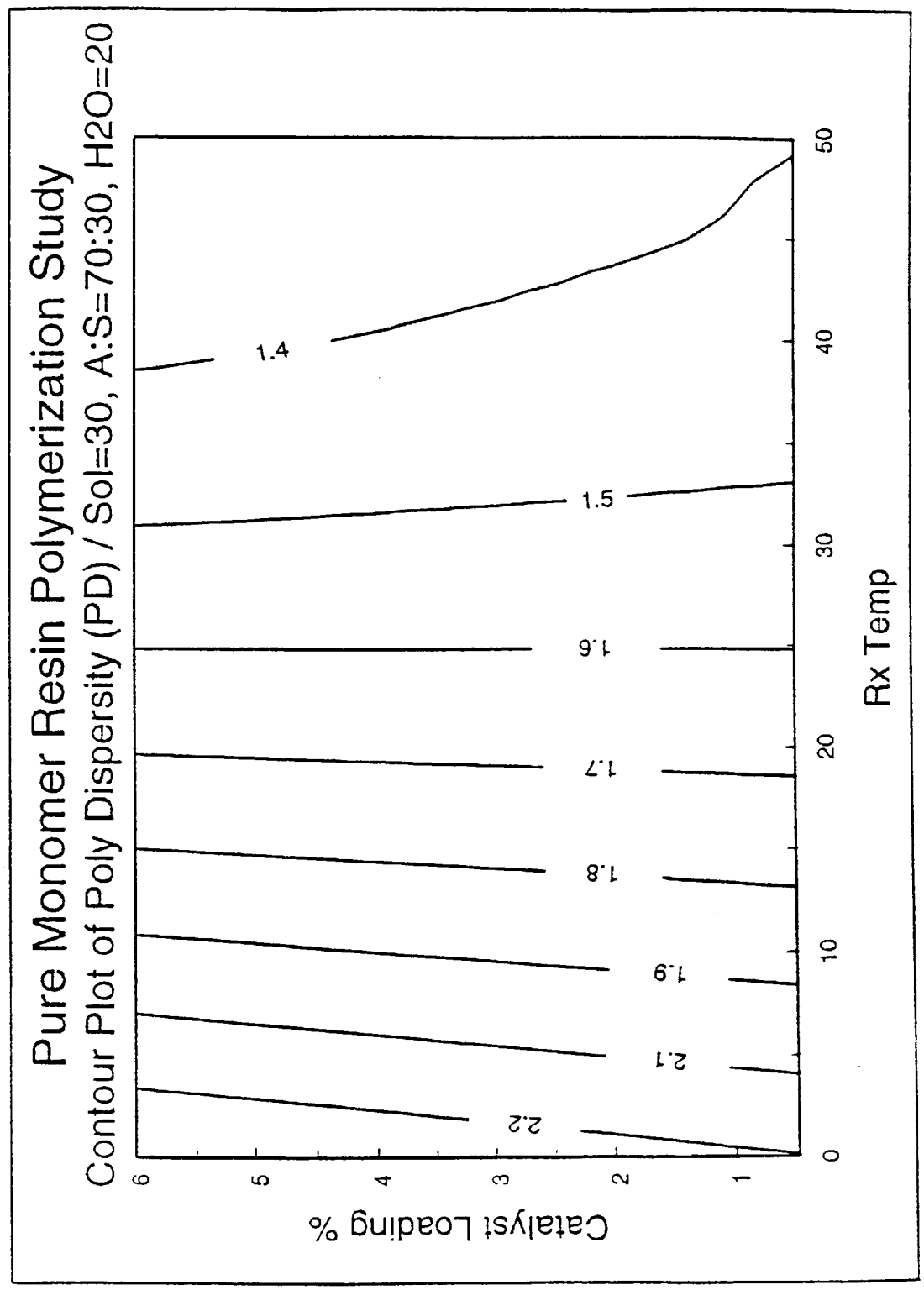
FIGS. 6–15 depict contour plots generated from regression analysis of various C9 resin polymerizations.
Figure 6:
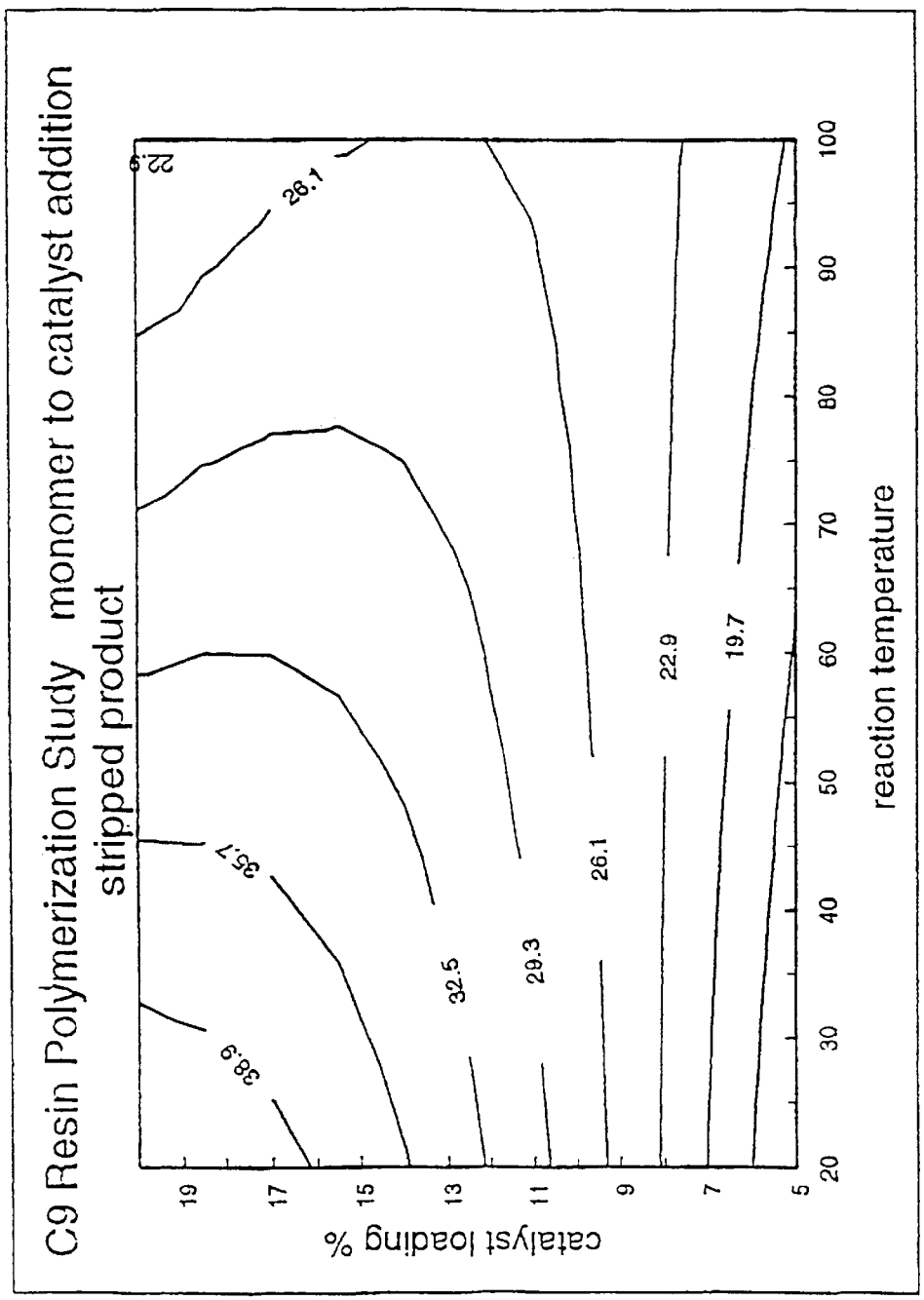
Figure 7:
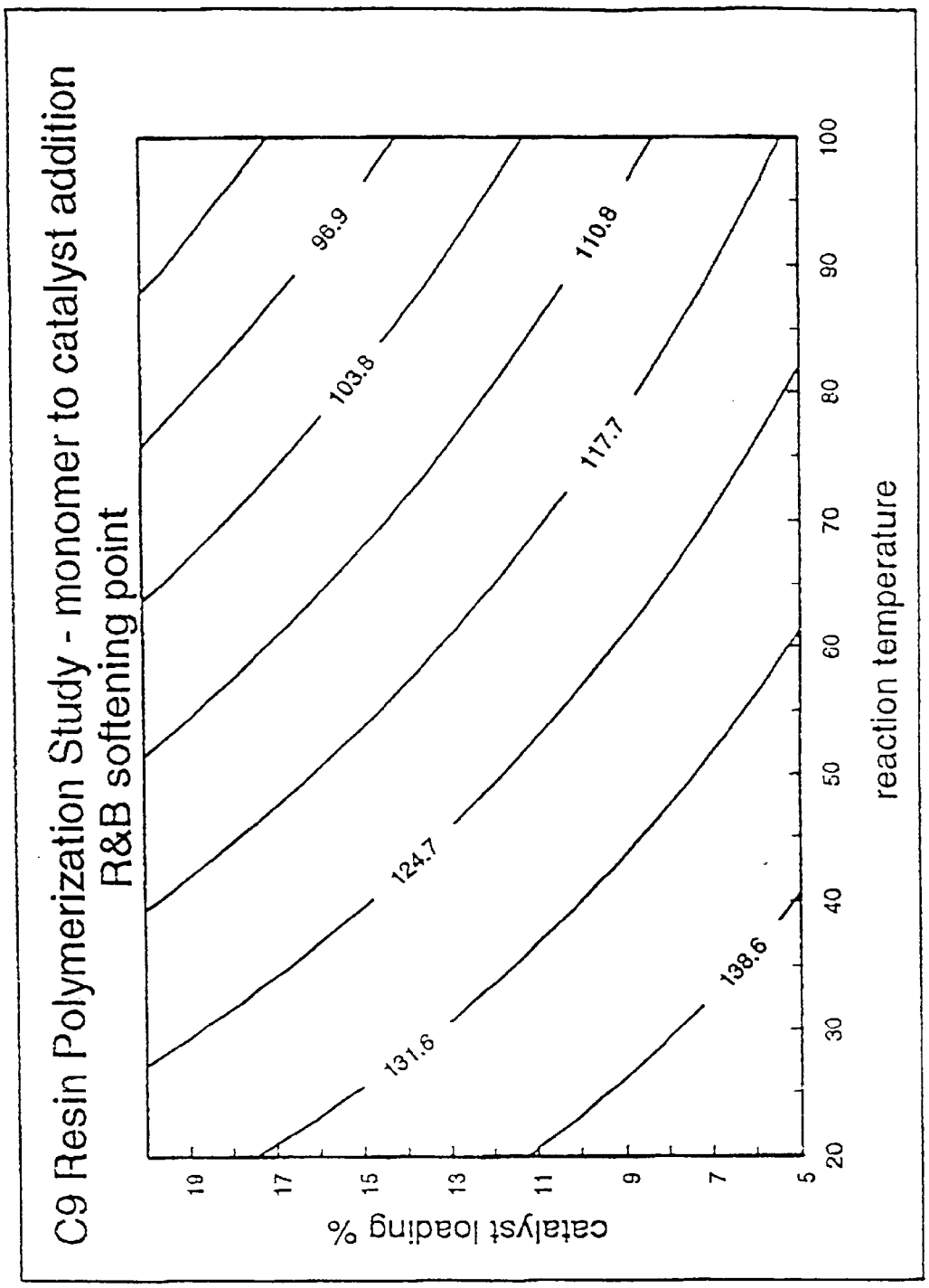
Figure 8:
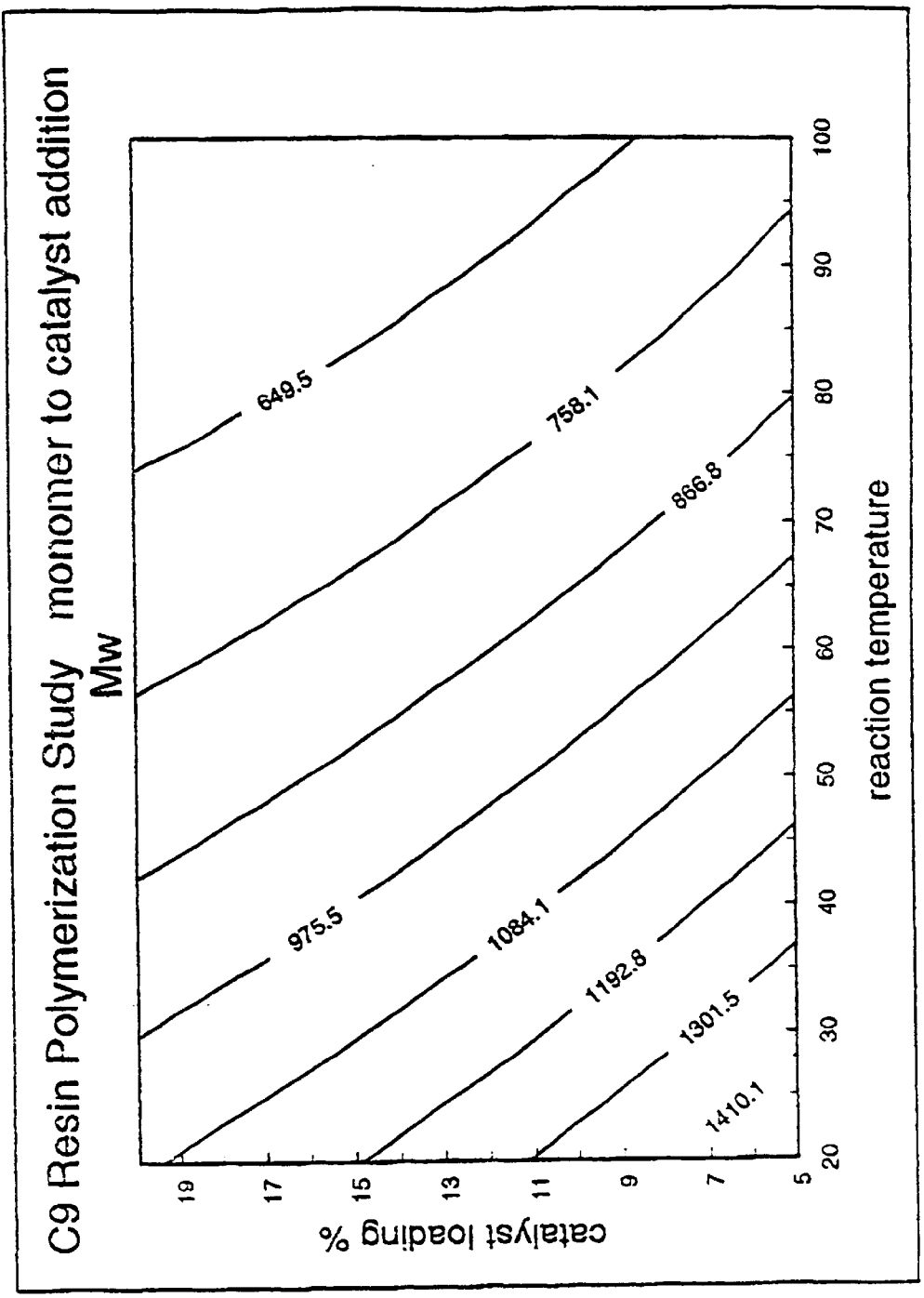
Figure 9:
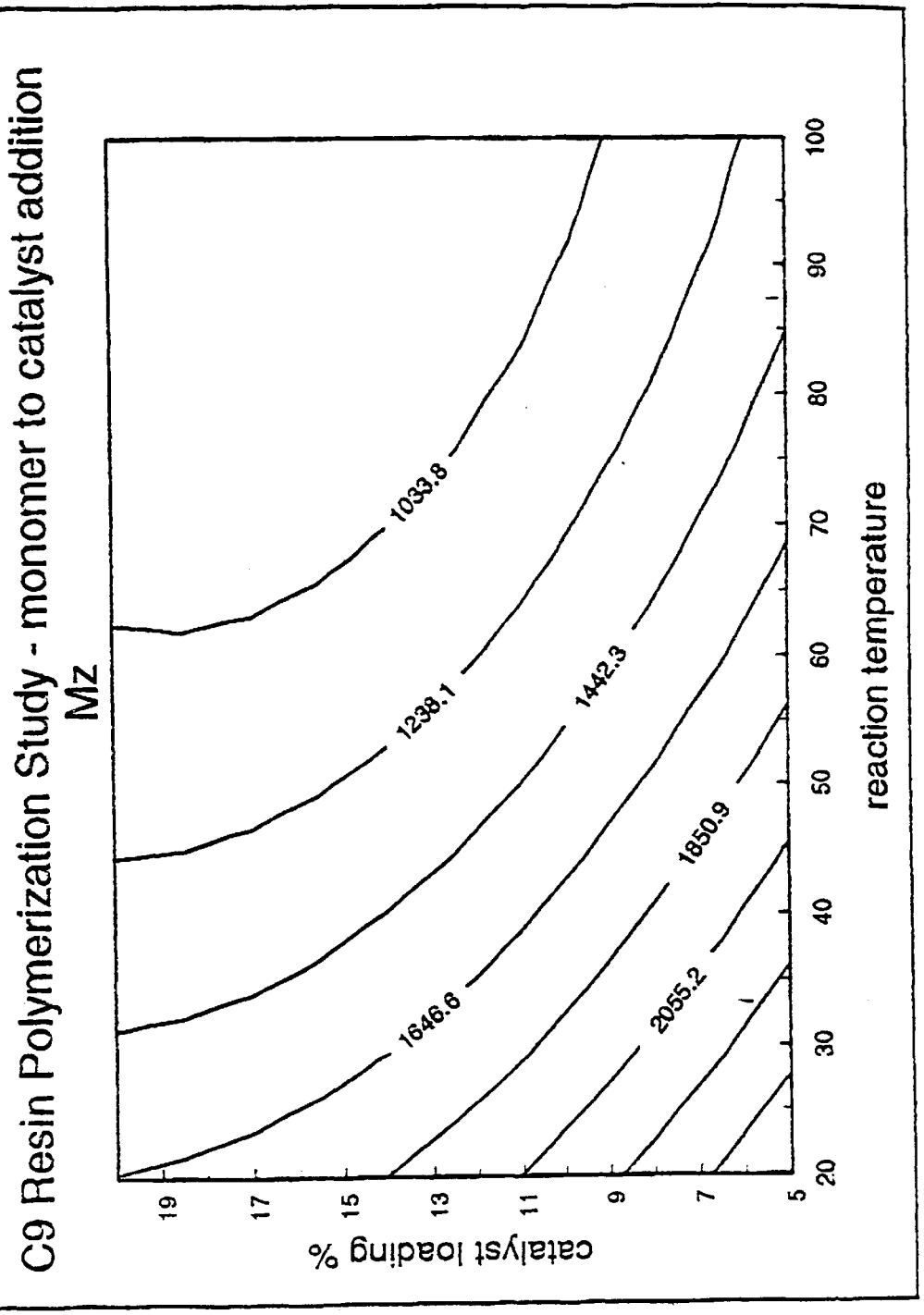
Figure 10:
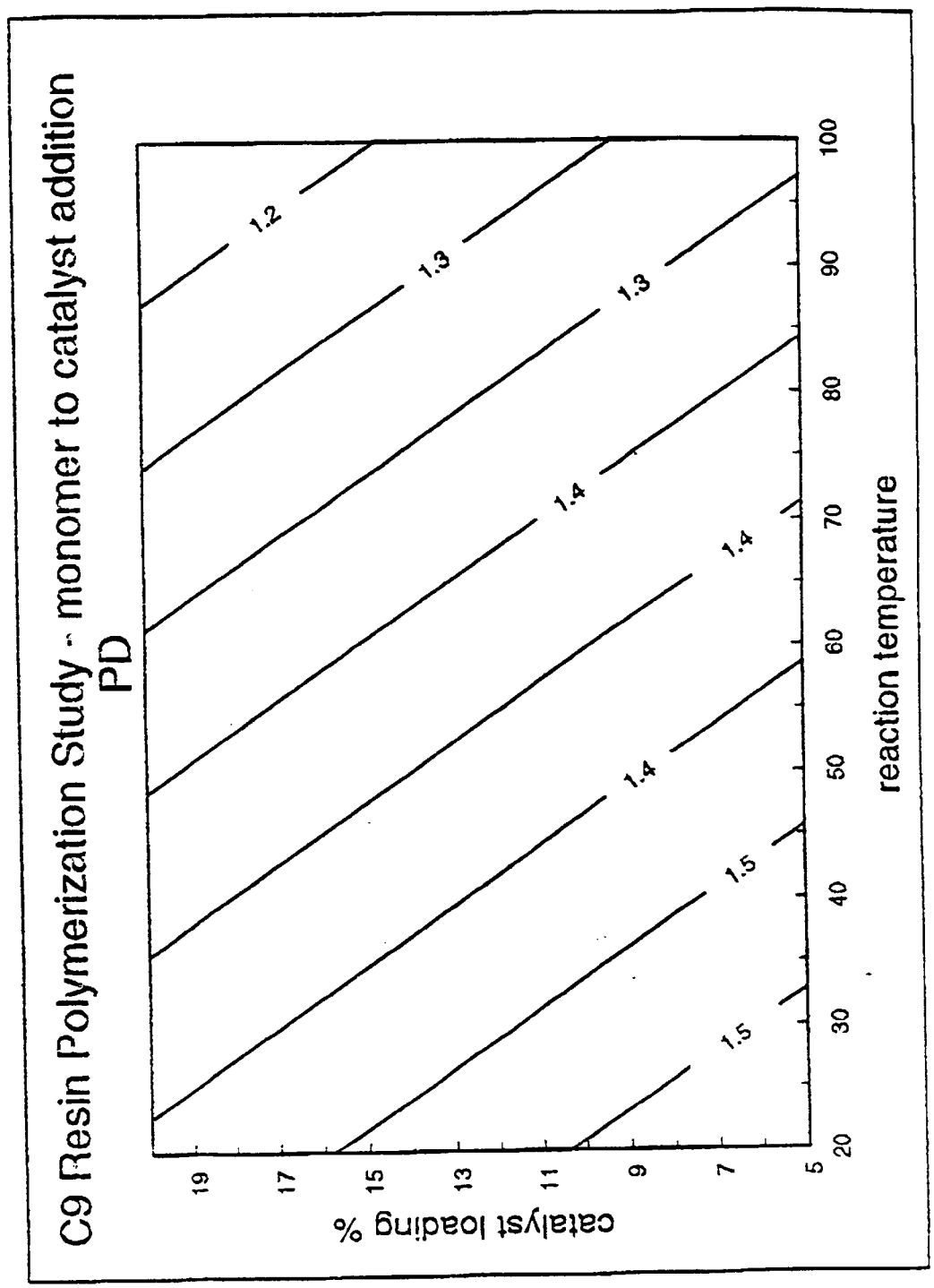

The regression equations listed above can be used to predict the properties of all resins which can be obtained for a set of reaction conditions where the control variables lie within the intervals tested. Contour plots can be generated to investigate the factor effects and make comparisons of resin properties predicted to be generated using various reaction conditions. Sample contour plots are shown in FIGS. 6–10 for each response versus catalyst loading and reaction temperature.

EXAMPLES 162–164

These examples illustrate the ability to predict C9 resin properties for a set of reaction conditions using the regression equations generated from the designed experiment described in Examples 148–161. Reaction procedures were essentially the same as those described for Examples 148–161, except where noted, with specific conditions for each example outlined in Table 26. All reactions were performed using the amorphous silica-alumina "SAB-30" as the catalyst.

TABLE 26

| Example | Catalyst Loading (wt %) | Reaction Temp. (° C.) |
|---|---|---|
| 162 | 20 wt % | 40° C. |
| 163 | 20 wt % | 70° C. |
| 164 | 12 wt % | 20° C. |

Each example was run in triplicate. The resin properties obtained for each example described in the Table 26 are summarized in Table 27.

TABLE 27

| Example | Yield (%) | Softening Point (R&B) | Molecular Weight | | |
|---|---|---|---|---|---|
| | | | Mw | Mz | PD |
| 162 (Model) | 37 | 117° C. | 880 | 1300 | 1.4 |
| 162a | 35 | 131° C. | 1100 | 1660 | 1.5 |
| 162b | 33 | 128° C. | 1090 | 1910 | 1.5 |
| 162c | 32 | 129° C. | 1070 | 1590 | 1.4 |
| 163 (Model) | 30 | 100° C. | 670 | 970 | 1.3 |
| 163a | 28 | 106° C. | 750 | 1060 | 1.4 |
| 163b | 26 | 109° C. | 790 | 1410 | 1.4 |
| 163c | 28 | 123° C. | 800 | 1100 | 1.3 |
| 164 (Model) | 32 | 138° C. | 1270 | 1980 | 1.5 |
| 164a | 18 | 149° C. | 1580 | 2770 | 1.6 |
| 164b | 19 | 154° C. | 1650 | 2750 | 1.6 |
| 164c | 24 | 150° C. | 1550 | 2590 | 1.7 |

Values for yield and Ring and Ball softening point for the replicate reactions fall within the interval where 95% of all future runs are predicted to lie. These examples illustrate the utility of the regression equations for predicting available resin properties within the defined range of variables used to generate the model.

EXAMPLES 165–178

The following examples illustrate a range of resin properties available from the current invention using a C9 unsaturated aromatic hydrocarbon feed stock as the monomer and dried amorphous silica-alumina or acid-treated clay as the catalysts. When combined, the following examples serve to define a 3×3 factorial designed experiment for a reaction where the catalyst is added as a powder to the monomer in solvent. The variables in these experiments include reaction temperature and catalyst loading with the amorphous silica-alumina catalyst. Additional center points have been included using the acid-treated clay catalyst for comparison. Replicate center points were run to estimate experimental error. One skilled in the art can use the results from the following examples to generate a model equation for each measured response in terms of the variables studied. The responses studied in these examples include product yield, Ring and Ball softening point, and molecular weight distribution as defined by weight average molecular weight (Mw), Z average molecular weight (Mz), and polydispersity defined as Mw/Mn (PD).

A 500 milliliter three neck flask was equipped with an overhead stirrer, reflux condenser, gas inlet and outlet ports, thermometer, and a dropping addition funnel. The flask was charged with 100 grams of C9 monomer feed, "LRO-90" (Lyondell Petrochemicals, Houston, Tex.) and 50 grams of toluene (reagent grade, Aldrich, Milwaukee, Wis.). The monomers and solvent were dried as follows: the C9 based monomers were dried by passing through a column of activated alumina (Fischer 8–16 mesh, 0.3 grams of alumina to 1 milliliter of monomer) immediately prior to use, the toluene was dried over 3 angstrom molecular sieves prior to use. Amorphous silica-alumina ("SAB-30", UOP, DesPlaines, Ill.) ground and passed through a 100 mesh sieve was treated at 400° C. at 2–5 mm Hg for 4–6 hours prior to use. Acid-treated clay, "F-22" (Engelhard Corporation, Iselin, N.J.), was treated at 200° C. at 2–5 mm Hg for 4–6 hours prior to use. The catalyst was transferred to the solid addition funnel in a moisture free atmosphere of nitrogen. The reaction solution was cooled to 5 to 10° C. below the target reaction temperature prior to catalyst addition and the reaction was allowed to warm to the target reaction temperature as the catalyst was added. The powdered catalysts were added to the reaction from the dropping addition funnel at a rate to maintain the reaction at the target temperature while externally cooling the reaction flask with a −50° C. bath. Catalyst addition time was typically 15 minutes. The reaction solution was stirred at the reaction temperature for a total reaction time of 2 hours.

After catalyst filtration, the solvent was removed from the resin solution at 100° C. at 2–5 mm Hg. The flask containing the resin oil was fitted with a distillation head with an adaptor for an inlet tube and a thermometer, and attached to a condenser with a receiving flask. The resin oil was heated to 235° C. with a nitrogen purge followed by a steam purge at 235–245° C. to remove light oil products. The steam purge was continued until less than 1 ml resin was collected per 100 ml of steam condensate or until 1000 ml of steam condensate was collected. The steam purge was followed by a nitrogen purge at 235° C. to remove water from the remaining resin.

The reaction conditions for each example are outlined in Table 28. The level of each variable was coded as −1, 0, and 1 for low, middle, and high, respectively. Use of coded variable values facilitates generation of the model equations for each response. The coded included for each example.

TABLE 28

| Example | Catalyst | Catalyst Loading (wt %) | Reaction Temperature (° C.) |
|---|---|---|---|
| 165 | SAB-30 | 12.5 (0) | 60 (0) |
| 166 | F-22 | 12.5 (0) | 60 (0) |
| 167 | SAB-30 | 5 (−1) | 100 (1) |
| 168 | SAB-30 | 20 (1) | 60 (0) |
| 169 | SAB-30 | 5 (−1) | 20 (−1) |
| 170 | SAB-30 | 12.5 (0) | 100 (1) |
| 171 | SAB-30 | 12.5 (0) | 60 (0) |
| 172 | F-22 | 12.5 (0) | 60 (0) |
| 173 | SAB-30 | 20 (1) | 100 (1) |
| 174 | SAB-30 | 12.5 (0) | 20 (−1) |
| 175 | SAB-30 | 5 (−1) | 60 (0) |
| 176 | SAB-30 | 20 (1) | 20 (−1) |
| 177 | SAB-30 | 12.5 (0) | 60 (1) |
| 178 | F-22 | 12.5 (0) | 60 (1) |

The resin properties obtained for each example described in the Table 28 are in Table 29.

TABLE 29

| Example | Yield (%) | Softening Point (R&B) | Molecular Weight | | | |
|---|---|---|---|---|---|---|
| | | | Mn | Mw | Mz | PD |
| 165 | 34 | 125° C. | 700 | 1020 | 1560 | 1.5 |
| 166 | 42 | 129° C. | 750 | 1120 | 1760 | 1.5 |
| 167 | 24 | 110° C. | 580 | 860 | 1990 | 1.5 |
| 168 | 37 | 121° C. | 670 | 970 | 1480 | 1.4 |
| 169 | 9 | 139° C. | 910 | 1600 | 3360 | 1.8 |
| 170 | 30 | 105° C. | 550 | 780 | 1490 | 1.4 |
| 171 | 35 | 124° C. | 700 | 1020 | 1870 | 1.5 |
| 172 | 43 | 130° C. | 750 | 1130 | 1860 | 1.5 |
| 173 | 33 | 110° C. | 570 | 780 | 1260 | 1.4 |
| 174 | 28 | 144° C. | 950 | 1520 | 2630 | 1.6 |
| 175 | 14 | 135° C. | 800 | 1140 | 2050 | 1.4 |
| 176 | 42 | 140° C. | 880 | 1380 | 2270 | 1.6 |
| 177 | 34 | 123° C. | 690 | 1010 | 1610 | 1.5 |
| 178 | 42 | 131° C. | 770 | 1140 | 1800 | 1.5 |

The data from Table 28 and 29 was analyzed by regression analysis for each of the five responses (steam stripped product yield, Ring and Ball softening point, Mw molecular weight, Mz molecular weight, and polydispersity (PD=Mw/Mn)). The process variables (reaction temperature (TMP) and catalyst loading (CAT)) were coded to −1, 0, and 1 for the low, mid, and high levels respectively. The following regression models were obtained based on the coded variables.

Equation 11

$$\text{Resin Yield \%} = 32.1 + 11.2(\text{CAT}) - 5.73(\text{CAT})^2 - 6.44(\text{CAT})(\text{TMP})$$

$$s = 2.655 \quad R^2(\text{adj}) = 95\%$$

Equation 12

$$\text{R\&B Softening Point} = 125 - 16.3(\text{TMP})$$

$$s = 4.113 \quad R^2(\text{adj}) = 90\%$$

Equation 13

$$\text{Logarithm}(Mw) = 6.94 - 0.0678(\text{CAT}) - 0.31(\text{TMP}) + 0.0638(\text{TMP})^2$$

$$s = 0.02534 \quad R^2(\text{adj}) = 99\%$$

Equation 14

$$\text{Logarithm}(Mz) = 7.44 - 0.196(\text{CAT}) - 0.28(\text{TMP}) + 0.188(\text{TMP})^2$$

$$s = 0.06434 \quad R^2(\text{adj}) = 95\%$$

Equation 15

$$\text{Polydisperity }(Mw/Mn) = 1.45 - 0.0517(\text{CAT}) - 0.102(\text{TMP}) + 0.0817(\text{TMP})^2$$

$$s = 0.04512 \quad R^2(\text{adj}) = 81.6\%$$

Figure 11:
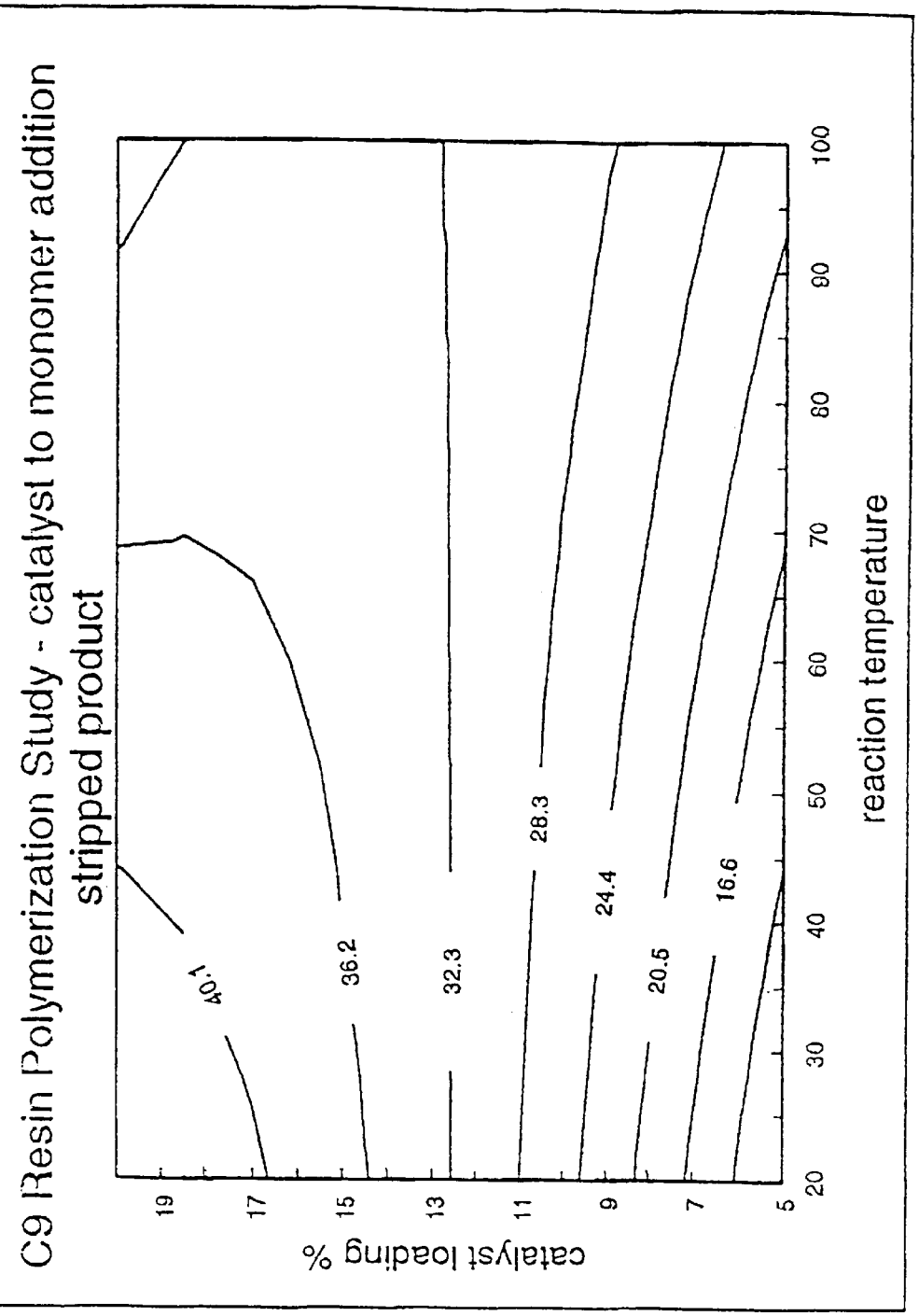
Figure 12:
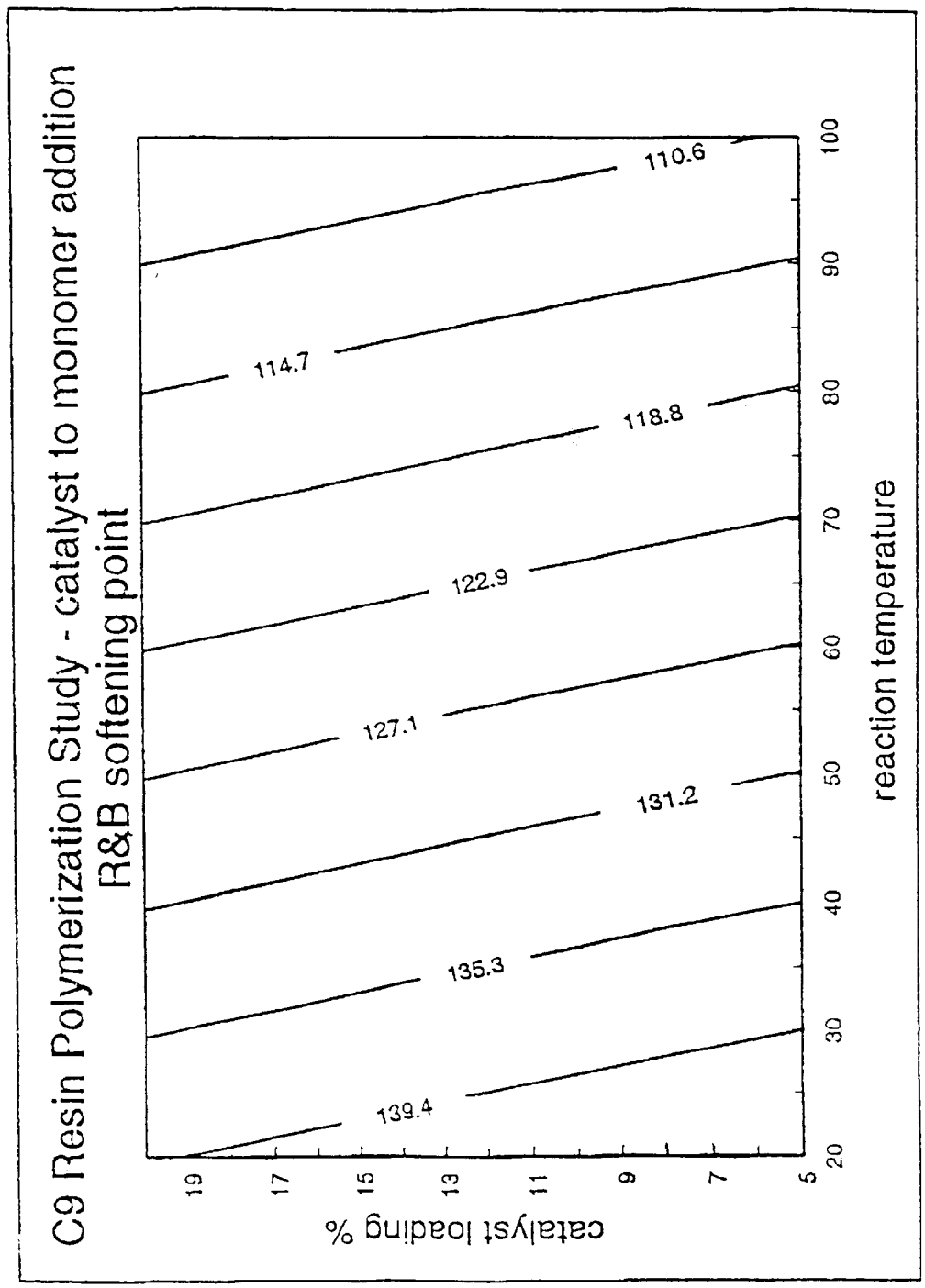
Figure 13:
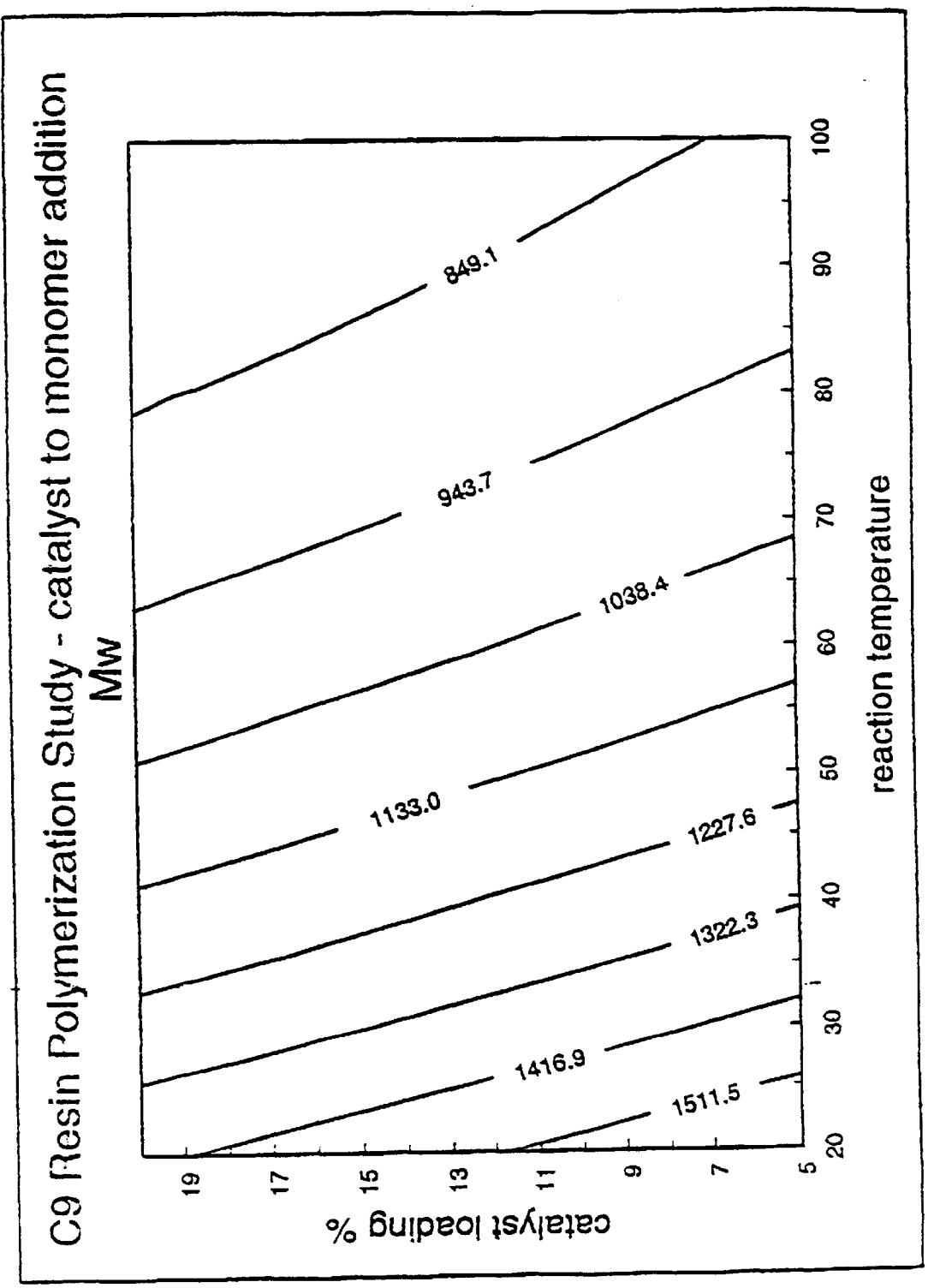
Figure 14:
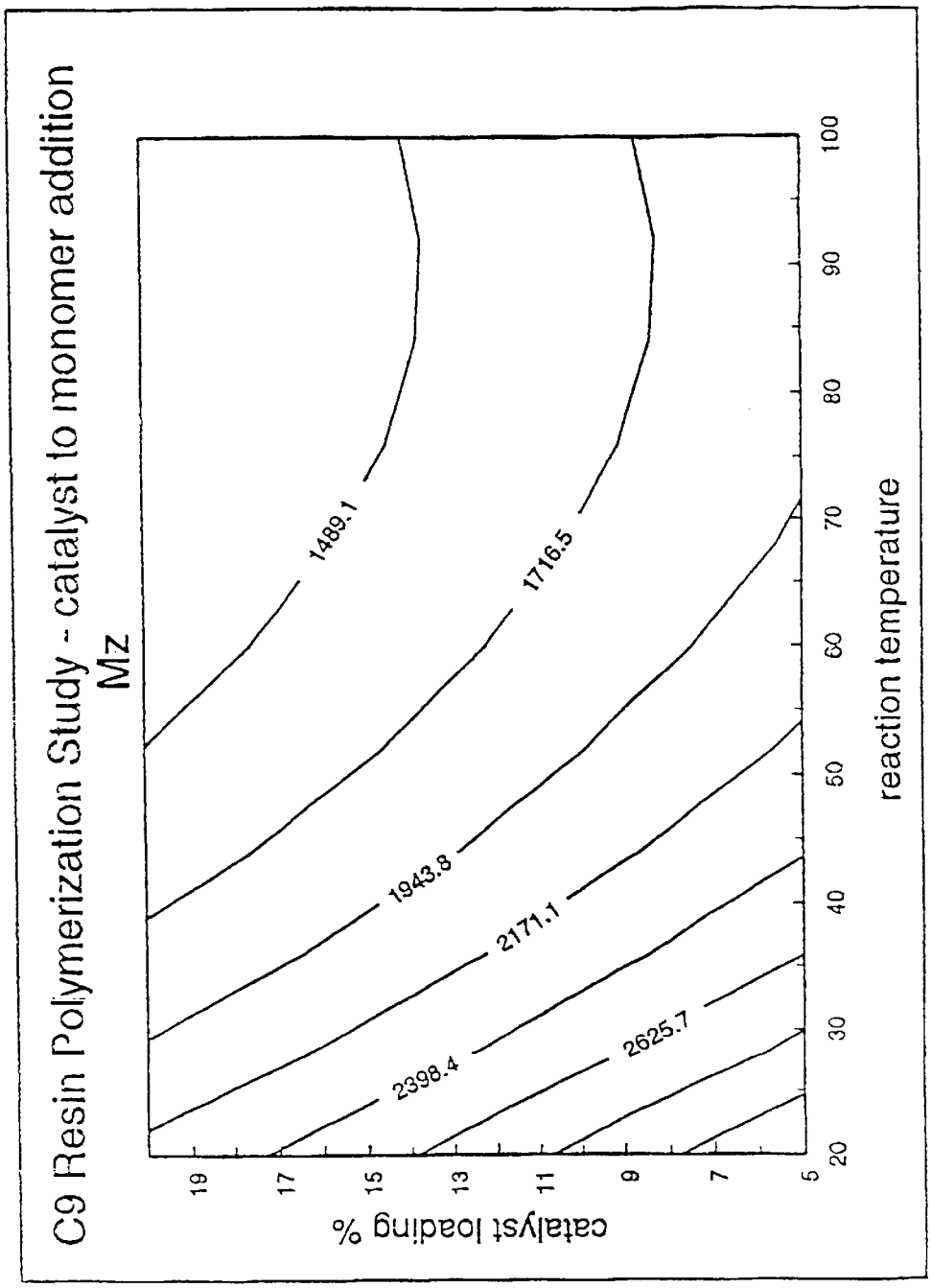
Figure 15:
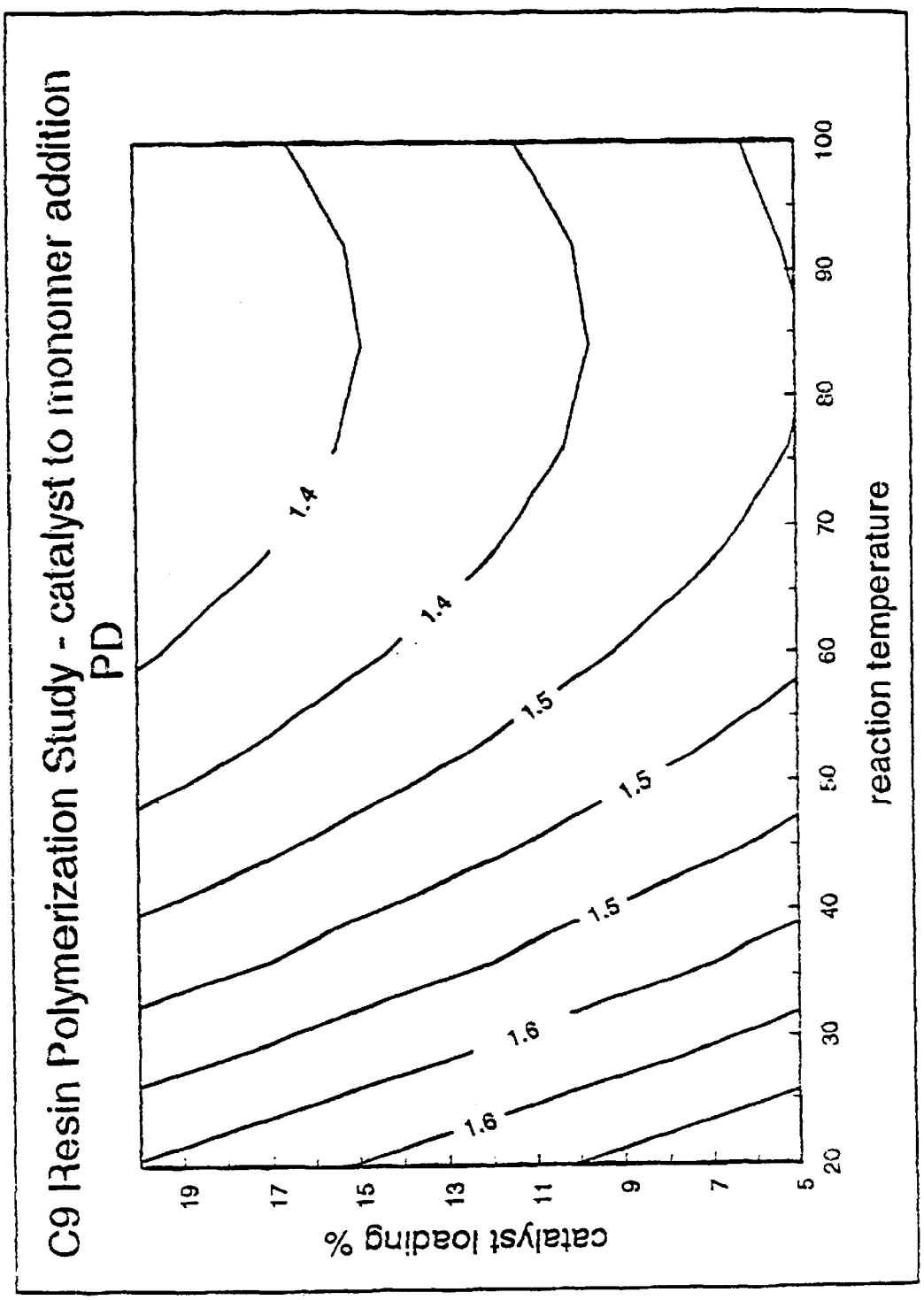

The regression equations listed above can be used to predict the properties of all resins which can be obtained for a set of reaction conditions where the control variables lie within the intervals tested. Contour plots can be generated to investigate the factor effects and make comparisons of resin properties predicted to be generated using various reaction conditions. Sample contour plots are shown in FIGS. 11–15 for each response versus catalyst loading and reaction temperature.

EXAMPLES 179–181

These examples illustrate the ability to predict resin properties for a set of reaction conditions using the regression equations generated from the designed experiment described in Examples 165–178. Reaction procedures are essentially the same as those described for Examples 165–178, except where noted, with specific conditions for each example outlined in Table 30. All reactions were performed using "SAB-30", an amorphous silica-alumina, as the catalyst.

TABLE 30

| Example | Catalyst Loading (wt %) | Reaction Temp. (° C.) |
|---|---|---|
| 179 | 17 wt % | 70° C. |
| 180 | 17 wt % | 100° C. |
| 181 | 19 wt % | 20° C. |

Each example was run in triplicate. The resin properties obtained for each example described in Table 30 are summarized in Table 31.

TABLE 31

| Example | Yield (%) | Softening Point (R&B) | Molecular Weight Mw | Mz | PD |
|---|---|---|---|---|---|
| 179 (Model) | 36 | 121° C. | 920 | 1430 | 1.4 |
| 179a | 32 | 119° C. | 970 | 1490 | 1.5 |
| 179b | 35 | 121° C. | 980 | 1540 | 1.4 |
| 179c | 29 | 121° C. | 980 | 1460 | 1.4 |
| 180 (Model) | 33 | 109° C. | 770 | 1380 | 1.4 |
| 180a | 30 | 107° C. | 770 | 1060 | 1.3 |
| 180b | 30 | 102° C. | 740 | 1210 | 1.4 |
| 180c | 29 | 112° C. | 800 | 1120 | 1.4 |
| 181 (Model) | 43 | 141° C. | 1410 | 2290 | 1.6 |
| 181a | 29 | 145° C. | 1610 | 5860 | 1.7 |
| 181b | 34 | 147° C. | 1590 | 2670 | 1.6 |
| 181c | 36 | 142° C. | 1510 | 2570 | 1.7 |

Values for yield and Ring and Ball softening point for the replicate reactions fall within the interval where 95% of all future runs are predicted to lie. These examples illustrate the utility of the regression equations for predicting available resin properties within the defined range of variables used to generate the model.

EXAMPLE 182

This example involves polymerization of a pure monomer hydrocarbon resin followed by hydrogenation of the resin.

Polymerization of the Resin

In a jacketed one gallon reactor, 38 grams of an acid-treated clay and 1000 grams of toluene were added. The clay was an Engelhard, "F-22", which had been calcined in a tube furnace at 200° C. for 2 hours. Dry nitrogen was flowed over the clay bed during the calcination process. The clay/toluene mixture was cooled at 0° C. A mixture of 866 grams of alpha-methyl styrene and 366 grams of styrene were pumped into the 1 gallon reactor at a rate such that the temperature was controlled to 0° C.±5° C. The time for pumping in the monomer was 100 minutes. The reactor was held at 0° C. for an additional 3 hours. After filtering the catalyst from the reaction mixture, an aliquot of the mixture was rotary evaporated, with an end condition of 3 mm Hg and 190° C. to produce a resin product. The yield of resin was 94% based on the added monomers. The softening point was 97.9° C. and molecular weight was 701, Mn; 1060, Mw; and 1580, Mz, with a PD of 1.51.

Hydrogenation of the Resin

The hydrogenation was carried out in a 1-liter high pressure reactor outfitted for pressure hydrogenations.

To the reactor was added a solution of 287 grams of the resin and 287 grams of Odorless Mineral Spirits and 6.0 grams of "Ni-5256P", a nickel catalyst produced by the Engelhard Corporation. The solution was saturated with hydrogen before the reaction solution was heated. When a temperature of 190° C. was reached, the hydrogenation pressure was increased to 1200 psig. Within the first fifteen minutes the reaction exothermed to 259° C. The reaction was held at 250° C. and 1200 psig±50 psig for 3 hours. After cooling, the catalyst was filtered from the product solution. The reaction solution was rotary evaporated, with an end condition of 3 mm Hg and 190° C. to produce a resin product. The resultant product has a softening point of 103.7° C. and molecular weight was 665, Mn; 925, Mw; and 1271, Mz, with a PD of 1.39.

While the invention has been described in connection with certain preferred embodiments so that aspects thereof may be more fully understood and appreciated, it is not intended to limit the invention to these particular embodiments. On the contrary, it is intended to cover all alternatives, modifications and equivalents as may be included within the scope of the invention as defined by the appended claims.

What is claimed is:

1. A process for making a hydrocarbon resin, comprising polymerizing a feed stream comprising C5 monomers in the presence of a solid acid catalyst to produce a hydrocarbon resin, wherein substantially all freely-associated water has been removed from the solid acid catalyst, and wherein the solid acid catalyst comprises as an active catalyst at least one member selected from the group consisting of acid activated clay, silica-alumina, amorphous silica-alumina, Brønsted acid on silica, Brønsted acid on silica-alumina, zeolites, mesoporous silica-alumina, Brønsted acid on mesoporous silica, and Brønsted acid on mesoporous silica-alumina, wherein water removal from the solid acid catalyst comprises calcining the solid acid catalyst at a temperature of about 100° C. to 400° C. to form the active catalyst, wherein the hydrocarbon resin has a number average molecular weight (Mn) of about 400 to 2000, a weight average molecular weight (Mw) of about 500 to 3500, a Z average molecular weight (Mz) of about 700 to 15,000, and a polydispersity (pID) as measured by Mw/Mn between about 1.2 and 5, where Mn, Mw, and Mz are determined by size exclusion chromatography (SEC).

2. The process of claim 1, wherein the solid acid catalyst comprises acid activated clay.

3. The process of claim 2, wherein the acid activated clay comprises naturally occurring clay mineral comprising at least one member selected from the group consisting of kaolinite, bentonite, attapulgite, montmorillonite, clarit, Fuller's earth, hectorite, and beidellite.

4. The process of claim 2, wherein the acid activated clay comprises synthetic clay comprising at least one member selected from the group consisting of saponite and hydrotalcite.

5. The process of claim 2, wherein the acid activated clay comprises modified clay comprising at least one member selected from the group consisting of aluminum oxide pillared clay, cerium modified alumina pillared clay, and metal oxide pillared clay.

6. The process of claim 2, wherein the acid activated clay comprises Bronsted acid on clay, and wherein the Brønsted acid comprises at least one member selected from the group consisting of hydrofluoric acid, sulfuric acid, nitric acid, phosphoric acid, and hydrochloric acid.

7. The process of claim 1, wherein the solid acid catalyst comprises amorphous silica-alumina.

8. The process of claim 1, wherein the solid acid catalyst comprises Brønsted acid on silica, and wherein the Brønsted acid comprises at least one member selected from the group consisting of hydrofluoric acid, sulfuric acid, nitric acid, phosphoric acid, and hydrochloric acid.

9. The process of claim 1, wherein the solid acid catalyst comprises Brønsted acid on silica-alumina, and wherein the Brønsted acid comprises at least one member selected from the group consisting of hydrofluoric acid, sulfuric acid, nitric acid, phosphoric acid, and hydrochloric acid.

10. The process of claim 1, wherein the solid acid catalyst comprises zeolite comprising at least one member selected from the group consisting of zeolite Y, zeolite β, MFI, MEL, NaX, NaY, faujasite, and mordenite.

11. The process of claim 1, wherein the solid acid catalyst comprises mesoporous silica-alumina.

12. The process of claim 1, wherein the solid acid catalyst comprises Brønsted acid on mesoporous silica, and wherein the Brønsted acid comprises at least one member selected from the group consisting of hydrofluoric acid, sulfuricacid, nitric acid, phosphoric acid, and hydrochloric acid.

13. The process of claim 1, wherein the solid acid catalyst comprises Brønsted acid on mesoporous silica-alumina, and wherein the Brønsted acid comprises at least one member selected from the group consisting of hydrofluoric acid, sulfuric acid, nitric acid, phosphoric acid, and hydrochloric acid.

14. The process of claim 1, wherein the feed stream comprises at least one member selected from the group consisting of 2-methyl-2-butene, 1-pentene, 2methyl-1-pentene, 2-methyl-2-pentene, 2-pentene, cyclopentene, cyclohexene, 1,3-pentadiene, 1,4-pentadiene, isoperene, 1,3-hexadiene, 1,4-hexadiene, and cyclopentadiene.

15. The process of claim 1, wherein the feed stream further comprises C9 monomers compriising at least one member selected from the group consisting of styrene, vinyl toluene, indene, dicyclopentadiene, and alkylated derivatives thereof.

16. The process of claim 1, wherein the feed stream is contacted with about 0.5 wt % to 30 wt % of the solid acid catalyst based on monomer weight in a batch reactor.

17. The process of claim 1, wherein the solid acid catalyst is added to the feed stream.

18. The process of claim 1, wherein the feed stream is added to a slurry of the solid acid catalyst in solvent.

19. The process of claim 1, wherein the feed stream is polymerized at a reaction temperature between abour −50° C. and 150° C.

20. A process for making a hydrocarbon resin, comprising polymerizing a feed stream comprising pure monomer in the presence of a solid acid catalyst to produce a hydrocarbon, resin, wherein substantially all freely-associated water has been removed from the solid acid catalyst, and wherein the solid acid catalyst comprises as an active catalyst at least one member selected from the group consisting of modified clays, Brønsted acid on clay, amorphous silica-alumina, Brønsted acid on silica, Brønsted acid on silica-alumina, zeolites, mesoporous silica-alumina, Brønsted acid on mesoporous silica, and Brønsted acid on mesoporous silica-alumina, wherein water removal from the solid acid catalyst comprises calcining the solid acid catalyst at a temperature of about 100° C. to 400° C. to form the active catalyst, wherein the hydrocarbon resin has a number average molecular weight (Mn) ranging from about 400 to 2000, a weight average molecular weight (Mw) ranging from about 500 to 5000, a Z average molecular weight (Mz) ranging from about 500 to 10,000, and a polydispersity (PD) as measured by Mw/Mn between about 1.2 and 3.5, where Mn, Mw, and Mz are determined by size exclusion chromatography (SEC), and wherein the solid acid catalyst has a $pK_a<0$.

21. The process of claim 20, wherein the solid acid catalyst comprises modified clay comprising a least one member selected from the group consisting of aluminum oxide pollared clays, cerilum modified alumina pillared clays, and metal oxide pillared clays.

22. The process of claim 20, therein the solid acid catalyst comprises Brønsted acid on clay, and wherein the Brønsted acid comprises at least one member selected from the group consisting of hydrofluoric acid, aulfuric acid, nitric acid, phosphoric acid, and hydrochloric acid.

23. The process of claim 20, wherein the solid acid catalyst comprises amorphous silica-alumina.

24. The process of claim 20, wherein the pure monomer comprises at least one member selected from the group consisting of styrene, alpha-methyl styrene, beta-methyl styrene, 4-methyl styrene, an vinyl toluene fractions.

25. The process of claim 20, wherein the feed stream is contacted with about 0.1 wt % to 15 wt % of the solid acid catalyst based on monomer weight in a batch reactor.

26. The process of claim 20, wherein the solid acid catalyst is added to the feed stream.

27. The process of claim 20, wherein the feed stream is added to a slurry of the solid acid catalyst in solvent.

28. The process of claim 20, wherein the feed stream is polymerized at a reaction temperature between about −50° C. and 100° C.

29. The process of claim 1, wherein the active catalyst result in a yield of greater than about 10%, based on monomer.

30. The process of claim 1, wherein the active catalyst results in a yield of greater than about 30%, based on monomer.

31. The process of claim 20, wherein the active catalyst results in a yield of greater than about 10%, based on monomer.

32. The process of claim 20, wherein the active catalyst results in a yield of greater than about 30%, based on monomer.

33. The process of claim 20, wherein the active catalyst comprises amorphous silica-alumina, wherein the pure monomer comprises at least one member selected from the group consisting of styrene, alpha-methyl styrene, beta-methyl styrene, 4-methyl styrene, and vinyl toluene fractions, and wherein the feed stream is polymerized at a reaction temperature between about −50° C. and 150° C.

34. The process of claim 1, wherein the active catalyst comprises amorphous silica-alumina, wherein the C5 monomers comprise at least one member selected from the group consisting of isobutylene, 2-methyl-2-butene, 1-pentene, 2-methyl-1-pentene, 2-methyl-2-pentene, 2-pentene, cyclopentene, cyclohexene, 1,3-pentadiene, 1,4-pentadiene, isoprene, 1,3-hexadiene, 1,4-hexadiene, and cyclopentadiene, and wherein the feed stream is polymerized at a reaction temperature between about −50° C. and 150° C.

35. A process for making a hydrocarbon resin, comprising polymerizing a feed stream comprising C9 monomers in the presence of a solid acid catalyst to produce a hydrocarbon resin, wherein substantially all freely-associated water has been removed from the solid acid catalyst, and wherein the solid acid catalyst comprises as an active catalyst at least one member selected from the group consisting of acid activated clay, silica-alumina, amorphous silica-alumina, Brønsted acid on silica, Brønsted acid on silica-alumina, zeolites, mesoporous silica-alumina, Brønsted acid on mesoporous silica, and Brønsted acid on mesoporous silica-alumina, wherein water removal from the solid acid catalyst comprises calcining the solid acid catalyst at a temperature of about 100° C. to 400° C. to form the active catalyst, wherein the hydrocarbon resin has a number average molecular weight (Mn) of about 400 to 1200, a weight average molecular weight (Mw) of about 500 to 2000, a Z average molecular weight (Mz) of about 700 to 6000, and a polydispersity (PD) as measured by Mw/Mn between about 1.2 and 3.5, where Mn and Mw are determined by size exclusion chromatography (SEC), and wherein the solid acid catalyst has a $pK_a$<0.

36. The process of claim 35, wherein the active catalyst comprises amorphous silica-alumina, wherein the C9 monomers comprise at least one member selected from the group consisting of styrene, vinyl toluene, indene, dicyclopentadiene, and alkylated derivatives thereof, and wherein the feed stream is polymerized at a reaction temperature between about −50° C. and 150° C.

37. A process for making a hydrocarbon resin, comprising polymerizing a feed stream comprising at least one member selected from the group consisting of C5 monomers and C9 monomers in the presence of a solid acid catalyst to produce a hydrocarbon resin, wherein substantially all freely-associated water has been removed from the solid acid catalyst by calcining the solid acid catalyst at a temperature of about 100° C. to 400° C., and wherein the solid acid catalyst comprises as an active catalyst at least one member selected from the group consisting of acid activated clay, silica-alumina, amorphous silica-alumina, Brønsted acid on silica, Brønsted acid on silica-alumina, zeolites, mesoporous silica-alumina, Brønsted acid on mesoporous silica, and Brønsted acid on mesoporous silica-alumina, wherein the active catalyst results in a yield of greater than about 10%, based on monomer, wherein the hydrocarbon resin has a number average molecular weight (Mn) of about 200 to 3000, and a polydispersity (PD) as measured by Mw/Mn between about 1.2 and 5 for C5 monomers and about 1.2 and 3.5 for C9 monomers, where Mn and Mw are determined by size exclusion chromatography (SEC), and wherein the solid acid catalyst has a $pK_a$<0.

38. The process of claim 37, wherein the active catalyst results in a yield of greater than about 30%, based on monomer.

39. A process for making a hydrocarbon resin, comprising polymerizing a feed stream comprising pure monomer in the presence of a solid acid catalyst to produce a hydrocarbon resin, wherein substantially all freely-associated water has been removed from the solid acid catalyst by calcining the solid acid catalyst at a temperature of about 100° C. to 400° C., and wherein the solid acid catalyst comprises as an active catalyst at least one member selected from the group consisting of modified clays, Brønsted acid on clay, amorphous silica-alumina, Brønsted acid on silica, Brønsted acid on silica-alumina, zeolites, mesoporous silica-alumina, Brønsted acid on mesoporous silica, and Brønsted acid on mesoporous silica-alumina, wherein the active catalyst results in a yield of greater than about 10%, based on monomer, wherein the hydrocarbon resin has a number average molecular weight (Mn) of about 200 to 3000, and a polydispersity (PD) as measured by Mw/Mn between about 1.2 and 3.5, where Mn and Mw are determined by size exclusion chromatography (SEC), and wherein the solid acid catalyst has a $pK_a$<0.

40. The process of claim 39, wherein the active catalyst results in a yield of greater than about 30%, based on monomer.

41. The process of claim 1, wherein the active catalyst results in a yield of greater than about 20%, based on monomer.

42. The process of claim 20, wherein the active catalyst results in a yield of greater than about 50%, based on monomer.

43. The process of claim 37, wherein the active catalyst results in a yield of greater than about 20%, based on monomer, and wherein the monomer comprises C5 monomers.

44. The process of claim 37, wherein the active catalyst results in a yield of greater than about 205%, based on monomer, and wherein the monomer comprises C9 monomers.

45. The process of claim 39, wherein the active catalyst results in yield of greater than about 50%, based on monomer.

46. The process of claim 35, wherein the solid acid catalyst comprises acid activated clay.

47. The process of claim 46, wherein the acid activated clay comprises naturally occurring clay mineral comprising at least one member selected from the group consisting of kaolinite, bentonite, attapulgite, montmorillonite, clarit, Fuller's earth, hectorite, and beidellite.

48. The process of claim 46, wherein the acid activated clay comprises synthetic clay comprising at least one member selected from the group consisting of saponite and hydrotalcite.

49. The process of claim 46, wherein the acid activated clay comprises modified clay comprising at least one member selected from the group consisting of aluminum oxide pillared clay, cerium modified alumina pillared clay, and metal oxide pillared clay.

50. The process of claim 46, wherein the acid activated clay comprises Brønsted acid on clay, and wherein the Brønsted acid comprises at least one member selected from the group consisting of hydrofluoric acid, sulfuric acid, nitric acid, phosphoric acid, and hydrochloric acid.

51. The process of claim 35, wherein the solid acid catalyst comprises amorphous silica-alumina.

52. The process of claim 35, wherein the solid acid catalyst comprises Brønsted acid on silica, and wherein the Brønsted acid comprises at least one member selected from the group consisting of hydrofluoric acid, sulfuric acid, nitric acid, phosphoric acid, and hydrochloric acid.

53. The process of claim 35, wherein the solid acid catalyst comprises Brønsted acid on silica-alumina, and wherein the Brønsted acid comprises at least one member selected from the group consisting of hydrofluoric acid, sulfuric acid, nitric acid, phosphoric acid, and hydrochloric acid.

54. The process of claim 35, wherein the solid acid catalyst comprises zeolite comprising at least one member selected from the group consisting of zeolite Y, zeolite β, MFI, MEL, NaX, NaY, faujasite, and mordenite.

55. The process of claim 35, wherein the solid acid catalyst comprises mesoporous silica-alumina.

56. The process of claim 35, wherein the solid acid catalyst comprises Brønsted acid on mesoporous silica, and wherein the Brønsted acid comprises at least one member selected from the group consisting of hydrofluoric acid, sulfuric acid, nitric acid, phosphoric acid, and hydrochloric acid.

57. The process of claim 35, wherein the solid acid catalyst comprises Brønsted acid on mesoporous silica, and wherein the Brønsted acid comprises at least one member selected from the from the group consisting of hydrofluoric acid, sulfuric acid, nitric acid, phosphoric acid, and hydrochloric acid.

58. The process of claim 35, wherein the feed stream further comprises C5 monomers comprising at least one member selected from the group consisting of 2-methyl-2-butene, 1-pentene, 2-methyl-1-pentene, 2-methyl-2-pentene, 2-pentene, cyclopentene, cyclohexene, 1,3-pentadiene, 1,4-pentadiene, isoprene, 1,3-hexadiene, 1,4-hexadiene, and cyclopentadiene.

59. The process of claim 35, wherein the C9 monomers comprise at least one member selected from the group consisting of styrene, vinyl toluene, indene, dicyclopentadiene, and alkylated derivatives thereof.

60. The process of claim 35, wherein the feed stream is contacted with about 0.5 wt % to 30 wt % of the solid acid catalyst based on monomer weight in a batch reactor.

61. The process of claim 35, wherein the solid acid catalyst is added to the feed stream.

62. The process of claim 35, wherein the feed stream is added to a slurry of the solid acid catalyst in solvent.

63. The process of claim 35, wherein the feed stream is polymerized at a reaction temperature between about −50° C. and 150° C.

64. The process of claim 35, wherein the active catalyst results in a yield of greater than about 20%, based on monomer.

65. The process of claim 1, wherein the feed stream further comprises dicyclopentadiene.

66. The process of claim 1, wherein the feed stream further comprises isobutylene.

67. The process of claim 1, wherein water removal from the solid acid catalyst comprises calcining for about 1 to 4 hours.

68. The process of claim 20, wherein water removal from the solid acid catalyst comprises calcining for about 1 to 4 hours.

69. The process of claim 37, wherein water removal from the solid acid catalyst comprises calcining for about 1 to 4 hours.

70. The process of claim 39, wherein water removal from the solid acid catalyst comprises calcining for about 1 to 4 hours.

71. The process of claim 35, wherein water removal from the solid acid catalyst comprises calcining for about 1 to 4 hours.

* * * * *

UNITED STATES PATENT AND TRADEMARK OFFICE
CERTIFICATE OF CORRECTION

PATENT NO. : 6,310,154 B1
DATED : October 30, 2001
INVENTOR(S) : Babcock et al.

It is certified that error appears in the above-identified patent and that said Letters Patent is hereby corrected as shown below:

Column 45,
Line 23, "(pID)" should read -- (PD) --

Column 46,
Line 13, "isoperene" should read -- isoprene --
Line 15, "comprising" should read -- comprising --
Line 27, "abour" should read -- about --
Line 55, "pollared" should read -- pillared --
Line 55, "cerilum" should read -- cerium --
Line 57, "therein" should read -- wherein --
Line 60, "aulfuric" should read -- sulfuric --
Line 67, "an" should read -- and --

Column 47,
Line 12, "result" should read -- results --

Column 48,
Line 60, "205%" should read -- 20% --

Column 49,
Line 44, "silica" should read -- silica-alumina --

Signed and Sealed this

Sixteenth Day of April, 2002

Attest:

*Attesting Officer*

JAMES E. ROGAN
*Director of the United States Patent and Trademark Office*